United States Patent
Meidad

(10) Patent No.: US 11,919,655 B2
(45) Date of Patent: Mar. 5, 2024

(54) SYSTEM AND METHOD FOR REFUELING AIR VEHICLES

(71) Applicant: ISRAEL AEROSPACE INDUSTRIES LTD., Lod (IL)

(72) Inventor: Ido Meidad, Modiin (IL)

(73) Assignee: ISRAEL AEROSPACE INDUSTRIES LTD., Lod (IL)

(*) Notice: Subject to any disclaimer, the term of this patent is extended or adjusted under 35 U.S.C. 154(b) by 341 days.

(21) Appl. No.: 16/621,573

(22) PCT Filed: Jun. 17, 2018

(86) PCT No.: PCT/IL2018/050669
§ 371 (c)(1),
(2) Date: Dec. 11, 2019

(87) PCT Pub. No.: WO2018/235071
PCT Pub. Date: Dec. 27, 2018

(65) Prior Publication Data
US 2021/0147095 A1 May 20, 2021

(30) Foreign Application Priority Data
Jun. 18, 2017 (IL) .......................... 253015

(51) Int. Cl.
*B64D 39/02* (2006.01)
*B64C 39/02* (2023.01)
*B64U 50/34* (2023.01)

(52) U.S. Cl.
CPC ............ *B64D 39/02* (2013.01); *B64C 39/024* (2013.01); *B64U 50/34* (2023.01)

(58) Field of Classification Search
CPC .. B64D 39/02; B64D 39/06; B64C 2201/063; B64C 39/024
See application file for complete search history.

(56) References Cited

U.S. PATENT DOCUMENTS

| | | | |
|---|---|---|---|
| 2,582,609 A | 1/1952 | Steele | |
| 2,879,017 A | 3/1959 | Smith | |

(Continued)

FOREIGN PATENT DOCUMENTS

| | | |
|---|---|---|
| DE | 1188374 B | 3/1965 |
| DE | 10013751 A1 | 10/2001 |

(Continued)

OTHER PUBLICATIONS

International Search Report and Written Opinion from International Application No. PCT/IL2018/050669 dated Sep. 16, 2018.

(Continued)

*Primary Examiner* — Christopher D Hutchens
(74) *Attorney, Agent, or Firm* — Dorsey & Whitney LLP

(57) ABSTRACT

A method for controlling maneuver of a refueling device, that includes: a refueling device is attached by a hose to a component of an aircraft. That component maintains a reference force on the hose. The desired position and current position of the refueling device are obtained. A determination is made, based on the current and desired positions of the refueling device, whether to extend or retract the hose. Depending on the determination, a command is sent for adjusting force generating arrangements that are attached to the refueling device. This causes the component to detect a changed force and to maintain the reference force on the hose. The distance between the fueling device and the aircraft is thereby changed.

20 Claims, 18 Drawing Sheets

(56) References Cited

U.S. PATENT DOCUMENTS

| | | |
|---|---|---|
| 2,941,761 A | 6/1960 | Cox et al. |
| 2,954,190 A | 9/1960 | Le |
| 3,038,632 A | 6/1962 | Brown et al. |
| 3,059,895 A | 10/1962 | Brown |
| 3,091,419 A | 5/1963 | Mosher |
| 3,144,954 A | 8/1964 | Brown et al. |
| 3,391,817 A | 7/1968 | Francis |
| 3,547,402 A | 12/1970 | Millar |
| 3,587,618 A | 6/1971 | Kenyon |
| 3,691,730 A | 9/1972 | Hickey et al. |
| 3,693,915 A | 9/1972 | Ulanovsky |
| 3,710,549 A | 1/1973 | Nichols et al. |
| 3,747,873 A | 7/1973 | Layer et al. |
| 3,788,040 A | 1/1974 | Bragg et al. |
| 3,830,307 A | 8/1974 | Bragg et al. |
| 3,948,626 A | 4/1976 | Bragg |
| 3,954,123 A | 5/1976 | Duckworth, Jr. |
| 4,014,481 A | 3/1977 | Daikeler et al. |
| 4,072,283 A | 2/1978 | Weiland |
| 4,098,427 A | 7/1978 | Duckworth, Jr. |
| 4,126,162 A | 11/1978 | Clark et al. |
| 4,129,270 A | 12/1978 | Robinson et al. |
| 4,157,976 A | 6/1979 | Jones et al. |
| 4,189,059 A | 2/1980 | Shaw |
| 4,228,246 A | 10/1980 | Taub et al. |
| 4,231,536 A | 11/1980 | Ishimitsu et al. |
| 4,282,909 A | 8/1981 | Clark et al. |
| 4,294,203 A | 10/1981 | Jones |
| 4,295,617 A | 10/1981 | Oswell et al. |
| 4,366,669 A | 1/1983 | Jones |
| 4,377,243 A | 3/1983 | Shaw et al. |
| D274,548 S | 7/1984 | Shaw |
| 4,467,937 A | 8/1984 | Shaw |
| D275,512 S | 9/1984 | Shaw |
| D275,984 S | 10/1984 | Shaw |
| 4,586,683 A | 5/1986 | Kerker |
| 4,607,313 A | 8/1986 | Shaw et al. |
| 4,806,167 A | 2/1989 | Raythatha |
| 4,830,673 A | 5/1989 | Jones et al. |
| 4,879,856 A | 11/1989 | Jones et al. |
| 5,167,340 A | 12/1992 | Shaw |
| 5,246,131 A | 9/1993 | Shaw et al. |
| 5,258,931 A | 11/1993 | Hassler, Jr. |
| 5,326,052 A | 7/1994 | Krispin et al. |
| 5,499,784 A | 3/1996 | Crabere et al. |
| 5,541,405 A | 7/1996 | Hassler, Jr. et al. |
| 5,781,151 A | 7/1998 | Stratton |
| 5,785,276 A | 7/1998 | Ruzicka |
| 5,906,336 A | 5/1999 | Eckstein |
| 6,141,546 A | 10/2000 | Thomas et al. |
| 6,192,245 B1 | 2/2001 | Jones et al. |
| D439,876 S | 4/2001 | Simonov et al. |
| 6,348,087 B1 | 2/2002 | Aslin |
| 6,604,711 B1 | 8/2003 | Stevens et al. |
| 6,644,594 B1 | 11/2003 | Hunn et al. |
| 6,729,359 B2 | 5/2004 | Jones |
| 6,739,359 B2 | 5/2004 | Jones et al. |
| 6,819,982 B2 | 11/2004 | Doane |
| 6,824,105 B2 | 11/2004 | Edwards |
| 6,966,525 B1 | 11/2005 | Schroeder |
| 6,994,294 B2 | 2/2006 | Saggio et al. |
| 6,997,013 B2 | 2/2006 | Jones |
| 6,997,434 B2 | 2/2006 | Scott |
| 7,007,894 B1 | 3/2006 | Takacs et al. |
| 7,013,905 B2 | 3/2006 | Jones et al. |
| 7,021,586 B2 | 4/2006 | Bolling |
| 7,028,947 B2 | 4/2006 | Burns |
| 7,048,231 B2 | 5/2006 | Jones |
| 7,082,906 B2 | 8/2006 | Jones et al. |
| 7,097,139 B2 | 8/2006 | Schroeder |
| 7,137,597 B2 | 11/2006 | Schuster et al. |
| 7,137,598 B2 | 11/2006 | Von |
| 7,172,156 B1 | 2/2007 | Jones |
| 7,172,157 B2 | 2/2007 | Jones |
| 7,185,854 B2 | 3/2007 | Von et al. |
| 7,198,229 B2 | 4/2007 | Schroeder |
| 7,219,510 B2 | 5/2007 | Jones |
| 7,246,774 B2 | 7/2007 | Von et al. |
| 7,275,718 B2 | 10/2007 | Saggio, III et al. |
| 7,281,687 B2 | 10/2007 | Schroeder |
| 7,464,736 B2 | 12/2008 | Jones et al. |
| 7,481,237 B2 | 1/2009 | Jones et al. |
| 7,516,920 B2 | 4/2009 | Schroeder |
| 7,562,847 B2 | 7/2009 | Jones |
| 7,798,449 B2 | 9/2010 | Small et al. |
| 8,056,860 B2 | 11/2011 | Small et al. |
| 8,817,981 B2 | 8/2014 | Fiske |
| 8,821,657 B2 | 9/2014 | Matschullat |
| 8,822,750 B2 | 9/2014 | Costa et al. |
| 9,150,311 B2 | 10/2015 | Rix |
| 9,457,912 B2 | 10/2016 | Rix |
| 9,573,696 B2 | 2/2017 | Rix |
| 9,731,835 B2* | 8/2017 | Epsinosa Sanchez ... B64D 39/00 |
| 2002/0074455 A1* | 6/2002 | Ollar ................ B64D 39/02 |
| | | 244/135 A |
| 2003/0136874 A1 | 7/2003 | Gjerdrum |
| 2004/0050998 A1 | 3/2004 | Edwards |
| 2004/0102876 A1 | 5/2004 | Doane |
| 2005/0166983 A1 | 8/2005 | Shaw et al. |
| 2005/0224657 A1 | 10/2005 | Bolling |
| 2005/0284424 A1 | 12/2005 | Jones et al. |
| 2006/0000949 A1 | 1/2006 | Schroeder |
| 2006/0043241 A1 | 3/2006 | Schuster et al. |
| 2006/0060709 A1 | 3/2006 | Thal |
| 2006/0060710 A1 | 3/2006 | Takacs et al. |
| 2006/0065785 A1 | 3/2006 | Enig et al. |
| 2006/0106203 A1 | 5/2006 | Winter et al. |
| 2006/0292018 A1 | 12/2006 | Jones |
| 2007/0023570 A1 | 2/2007 | Bernard |
| 2007/0084968 A1 | 4/2007 | Thal et al. |
| 2007/0108339 A1 | 5/2007 | Plotkin |
| 2008/0234884 A1 | 9/2008 | Von |
| 2010/0001124 A1 | 1/2010 | Feldmann |
| 2010/0025536 A1 | 2/2010 | Schroeder |
| 2010/0274444 A1* | 10/2010 | Williamson ........ B64D 39/00 |
| | | 701/29.8 |
| 2010/0321011 A1 | 12/2010 | Small et al. |
| 2011/0001011 A1* | 1/2011 | Degiorgis .......... B64D 39/00 |
| | | 244/135 A |
| 2011/0180666 A1 | 7/2011 | Speer et al. |
| 2013/0168497 A1 | 7/2013 | Rix |
| 2013/0168498 A1* | 7/2013 | Rix .................... G05D 1/101 |
| | | 244/135 A |
| 2014/0306063 A1* | 10/2014 | Kusnitz ............. B64D 39/06 |
| | | 244/135 A |
| 2014/0346279 A1* | 11/2014 | Foo .................... B64D 39/02 |
| | | 244/135 A |
| 2015/0251769 A1* | 9/2015 | De la Fuente Lopez ........... |
| | | B64D 39/06 |
| | | 244/135 A |
| 2019/0031347 A1* | 1/2019 | Duan ................. G05B 6/02 |

FOREIGN PATENT DOCUMENTS

| | | |
|---|---|---|
| DE | 102008038178 A1 | 3/2010 |
| EP | 1094001 A2 | 4/2001 |
| EP | 2045186 A1 | 4/2009 |
| EP | 2915751 A1 | 9/2015 |
| EP | 3040280 A1 | 7/2016 |
| GB | 781059 A | 8/1957 |
| GB | 1085040 A | 9/1967 |
| GB | 2237251 A | 5/1991 |
| GB | 2303418 A | 2/1997 |
| GB | 2304498 A | 3/1997 |
| GB | 2313740 A | 12/1997 |
| GB | 2318252 A | 4/1998 |
| GB | 2320646 A | 6/1998 |
| GB | 2347068 A | 8/2000 |
| GB | 2364207 A | 1/2002 |
| WO | 9001199 A1 | 2/1990 |
| WO | 2006073468 A2 | 7/2006 |

(56) References Cited

FOREIGN PATENT DOCUMENTS

| WO | 2013102903 A2 | 7/2013 |
|---|---|---|
| WO | 2013102906 A2 | 7/2013 |

OTHER PUBLICATIONS

"High Resolution Miniaturized Infrared Engine", Opgal.com, http://www.opgal.com/products.php?actions=show&id=51 last accessed Jun. 25, 2012, Nov. 29, 2010, 2 pages.
"Miniature 3D Time-of-Flight Range Camera", Mesa-Imaging.ch, http://www.mesa-imaging.ch/prodview4k.php last accessed Jun. 27, 2012, Nov. 29, 2010, 1 page.
"Miricle High Resolution Miniature Infrared Thermal Imagers", Thermoteknix.com, http://www.thermoteknix.com/brochures/miricle/high_resolution_miniature_infrared_thermal_imagers/miricle_lo_res.pdf, Nov. 29, 2010, 3 pages.
"Photon HRC Camera Core", Flir.com, http://www.flir.com/uploadedFiles/PhotonHRC.pdf, Nov. 29, 2010, 2 pages.
"PMD Vision CamCube 3.0", PMDtec.com, http://www.pmdtec.com/products-services/pmdvisionr-cameras/pmdvisionr-camcube-30/ last accessed Jun. 25, 2012, Jun. 15, 2009, 2 pages.
Klass, "Towed Decoys, Flares Displayed", Electronic Warfare, Dec. 5, 2017, 1 page.

\* cited by examiner

SYSTEM AND METHOD FOR REFUELING AIR VEHICLES

TECHNOLOGICAL FIELD

The presently disclosed subject matter relates to systems and methods for refueling air vehicles, especially aircraft, in particular for refueling aircraft during flight.

BACKGROUND

Airborne refueling (also referred to interchangeably herein as air refueling, in-flight refueling, air to air refueling (AAR), aerial refueling, fueling, tanking, and the like) refers to the process of transferring fuel from a tanker aircraft to a receiver aircraft during flight.

Two types of airborne refueling systems are currently in use for refueling airborne military aircraft:
- the so-called "hose and drogue" system, used by the US Navy and many non-US air forces;
- the so-called "boom and receptacle" or "flying boom" system, used by the US Air Force, and also used by Israel, Turkey and the Netherlands.

In the hose and drogue system, the refueling aircraft is provided with one or more non-rigid refueling lines, at the end of each of which there is a drogue which functions as a stabilizer and includes a receptacle, while the receiver aircraft is fitted with a probe that is configured for engaging with the receptacle. In use, the drogue is not actively controlled, but rather aligns itself freely in the airflow aft of the tanker. The pilot of the receiver aircraft controls the flight path thereof to ensure engaging contact between the probe and the receptacle. Thereafter, the receiver aircraft is refueled via the refueling line and probe.

In the boom and receptacle system, the tanker includes a so-called "flying boom", which is a rigid tube that telescopes outwardly and is gimbaled to the rear of the tanker aircraft, and is otherwise retracted into the tanker fuselage when not in use. The boom carries a fuel line and comprises a fuel transfer nozzle at the end thereof, and the boom is equipped with adjustable flight control surfaces. Once the tanker and receiver aircraft are in close proximity and flying in formation, with the receiver aircraft at a position behind the tanker within an air refueling envelope (referring, for example, to safe limits of travel for the boom with respect to the receiver aircraft and within which contact between the receiving aircraft and the boom is safe), a dedicated operator in the tanker controls the position of the boom via the control surfaces, and inserts the end of the boom including the nozzle into a receptacle provided on an upper part of the receiving aircraft, ensuring proper mating between the nozzle and receptacle, after which fuel transfer can begin. During refueling, and while the boom is engaged with the receptacle, the pilot of the receiver aircraft must continue to fly within the air refueling envelope, and if the receiver aircraft approaches these limits the operator in the tanker requires the receiver aircraft pilot to correct the position thereof, and if necessary the boom is disconnected to prevent accidents. All current tankers of this type carry a single boom and can refuel a single receiver aircraft of this type at a time.

In addition, there are some tankers that comprise a flying boom system and at least one hose and drogue system as well, and are commonly known as Multi-Point Refueling Systems (MPRS). In some cases a hose and drogue system is provided at the aircraft tail, and thus only this system or the flying boom system may be used at any one time. In other cases, two under-wing hose and drogue pods, known as Wing Air Refueling Pods (WARPs), can be provided, one under each wing, in addition to the flying boom system.

The subject matter of the current application is in the same technological field as publications WO 2013/102906 A2 (Publication date 11 Jul. 2013) and WO 2013/102903 A2 (Publication date 11 Jul. 2013), submitted by the same applicants. Both applications are incorporated hereby by reference in their entirety.

U.S. Pat. No. 7,562,847 discloses an autonomous in-flight refueling hose end unit including a first end configured to be coupled to a fuel hose of a tanker aircraft and a second end configured to be coupled to receiver aircraft and adjustable control surfaces, and a flight control computer autonomously controls the control surfaces to fly the refueling hose end into contact with the receiver aircraft.

In GB 2,237,251 an in flight refueling apparatus mountable on a tanker aircraft has a probe receptor coupled with a fuel line and is arranged to be deployed outboard of the aircraft, and can be provided on a drogue or a boom. In one mode, the apparatus is arranged to provide a parameter which is representative of the deviation of the path of the receptor from a predetermined initial path for actuating control means for changing automatically the position of the receptor relative to the initial path. In another mode, a parameter which is representative of the relative angular position of the receptor with respect to the probe of an approaching refueling aircraft for actuating control means for changing automatically the relative angular position to achieve alignment of receptor and probe.

Additional references considered to be relevant as background to the presently disclosed subject matter are listed below: US 2007/108339, US 2007/084968. US 2006/065785, US 2006/043241, US 2006/060710, US 2006/060709, US 2005/224657, US 2004/102876, U.S. Pat. Nos. 7,097,139, 6,966,525, 6,994,294, 6,644,594, 5,906,336, 5,785,276, 5,499,784, 5,326,052, 4,282,909, 4,126,162, 4,072,283, 3,948,626, 3,091,419, 3,059,895, 2,954,190, 2,582,609, USD 439,876, DE 100 13 751.

Acknowledgement of the above references herein is not to be inferred as meaning that these are in any way relevant to the patentability of the presently disclosed subject matter.

The references cited above teach background information that may be applicable to the presently disclosed subject matter. Therefore the full contents of these publications are incorporated by reference herein where appropriate for appropriate teachings of additional or alternative details, features and/or technical background.

SUMMARY OF THE INVENTION

In accordance with a first aspect of the presently disclosed subject matter, there is presented a method of controlling maneuver of a refueling device, comprising:
  (a) providing a refueling device that is attached by means of a non-rigid hose to a component of an aircraft; the component is configured to selectively maintain a reference force on the hose, and a controller, associated with the refueling device, and comprising a processing circuitry to perform the following:
  (b) obtaining a desired position of the refueling device;
  (c) obtaining a current position of the refueling device;
  (d) determining, based on at least the current position and the desired position of the refueling device, whether to extend or retract the hose;
  (e) sending a command for adjusting the state of one or more force generating arrangements that are attached to the refueling device, causing the component of an aircraft to detect a changed force on the hose and to maintain the reference force on the hose, thereby changing the distance between the refueling device and the aircraft;

(f) repeatedly performing (b) to (e) until the difference between the current position and the desired position of the refueling device is within a defined threshold.

In accordance with an embodiment of the presently disclosed subject matter, there is presented a method, wherein the command further comprises:

in response to the determination being to extend the hose, a command for adjusting the state of one or more force generating arrangements, so as to increase the force on the hose, thereby causing the component of an aircraft to detect the increased force and to extend the hose so as to maintain the reference force on the hose, thereby increasing the distance between the refueling device and the aircraft;

in response to the determination being to retract the hose, a command for adjusting the state of one or more force generating arrangements, so as to decrease the force on the hose, thereby causing the component of an aircraft to detect the decreased force and to retract the hose so as to maintain the reference force on the hose, thereby decreasing the distance between the refueling device and the aircraft.

In accordance with an embodiment of the presently disclosed subject matter, there is presented a method further comprising:

in response to an indication of an update in the desired position, performing (b) to (f) of the first aspect of the presently disclosed subject matter in respect of the updated desired position.

In accordance with an embodiment of the presently disclosed subject matter, there is presented a method, further comprising:

performing (b) to (f) of the presently disclosed subject matter, for at least one of the following desired positions: an at least one waiting point position, an updated waiting point position, a position of a receptacle located on a receiver aircraft, an updated position of the receptacle, a safe disengagement position, an updated safe disengagement position and an at least one post-disengagement waiting point position.

In accordance with an embodiment of the presently disclosed subject matter, there is further presented a method performed for one or more additional receiver aircraft, whereby one or more receiver aircraft can be refueled.

In accordance with an embodiment of the presently disclosed subject matter, there is presented a method further comprising:

i. in response to an indication that the component changed to a response mode, whereby the component is configured to maintain the reference force on the hose, obtaining at least one waiting point position at which the refueling device will await arrival of at least one receiver aircraft;

ii. in respect of each one of the at least one waiting point positions:
  A. setting the waiting point position to constitute the desired position of the refueling device;
  B. performing (b) to (f) of the presently disclosed subject matter in respect of the waiting point position, and in case of an indication of an update in the waiting point position, setting the updated waiting point position to constitute the desired position of the refueling device and performing (b) to (f) in respect of the updated waiting point position, iii. in response to an indication that one of at least one receiver aircraft meets an engagement area specification condition, obtaining the position of a receptacle located on the receiver aircraft, setting the position of the receptacle to constitute the desired position of the refueling device, and performing (b) to (f) in respect of the position of the receptacle, and in case of an indication of an update in the position of the receptacle, setting the updated position of the receptacle to constitute the desired position of the refueling device and performing (b) to (f) in respect of the updated position of the receptacle, for the purpose of reaching and then engaging the receptacle;

iv. in response to an indication of engagement of the refueling device and the receptacle, obtaining a safe disengagement position, and setting the safe disengagement position to constitute the desired position of the refueling device;

v. performing (b) to (f) in respect of the safe disengagement position, and in case of an indication of an update in the safe disengagement position, setting the updated safe disengagement position to constitute the desired position of the refueling device and performing (b) to (f) in respect of the updated safe disengagement position; and vi. in response to an indication of disengagement of the refueling device and the receptacle, performing, for each next receiver aircraft of at least one receiver aircraft:
  A. obtaining at least one post-disengagement waiting point position;
  B. performing (ii) to (v), wherein each one of the at least one post-disengagement waiting point position constitutes each one of the at least one waiting point positions;

whereby one or more receiver aircraft can be refueled.

In accordance with an embodiment of the presently disclosed subject matter, there is further presented a method wherein the receptacle is a fuel receptacle.

In accordance with an embodiment of the presently disclosed subject matter, there is yet further presented a method wherein the safe disengagement position is the current position of the refueling device adjusted by an offset.

In accordance with an embodiment of the presently disclosed subject matter, there is yet further presented a method wherein the determining whether to extend or retract the hose, is based also on at least one of the current velocity of the refueling device and the current acceleration of the refueling device.

In accordance with an embodiment of the presently disclosed subject matter, there is yet further presented a method, wherein the adjusting the state of the force generating arrangements is performed while factoring at least one of the current velocity of the refueling device and the current acceleration of the refueling device.

In accordance with an embodiment of the presently disclosed subject matter, there is yet further presented a method, wherein the desired position and current position are distances from the component of an aircraft.

In accordance with an embodiment of the presently disclosed subject matter, there is yet further presented a method, wherein the distances are in the direction fore and aft.

In accordance with an embodiment of the presently disclosed subject matter, there is yet further presented a method wherein the distances are between the refueling device and the point where the hose exits one of the components of the aircraft or the aircraft.

In accordance with an embodiment of the presently disclosed subject matter, there is yet further presented a method wherein the component of an aircraft is a hose winding component capable of being attached to at least one of: the aircraft and a pod which is attached to the aircraft.

In accordance with an embodiment of the presently disclosed subject matter, there is yet further presented a method wherein the hose winding component is a Host Drum Unit (HDU).

In accordance with an embodiment of the presently disclosed subject matter, there is yet further presented a method wherein the aircraft is a tanker aircraft, the hose is a fuel hose, the refueling device includes a fuel delivery nozzle and the refueling device is capable of engaging and refueling the receiver aircraft.

In accordance with an embodiment of the presently disclosed subject matter, there is yet further presented a method wherein the receiver aircraft is a combat aircraft.

In accordance with an embodiment of the presently disclosed subject matter, there is yet further presented a method wherein the refueling device is unmanned.

In accordance with an embodiment of the presently disclosed subject matter, there is yet further presented a method wherein the refueling device does not include an independent means of propulsion.

In accordance with an embodiment of the presently disclosed subject matter, there is yet further presented a method wherein the method is performed autonomously by the refueling device.

In accordance with a second aspect of the presently disclosed subject matter, there is yet further presented a system capable of controlling maneuver of a refueling device, comprising: a controller, associated with the refueling device; wherein the refueling device is capable of being attached by means of a non-rigid hose to a component of an aircraft, wherein the component is configured to maintain a reference force on the hose; the controller comprising a processing circuitry and configured to:
  (a) obtain a desired position of the refueling device;
  (b) obtain a current position of the refueling device;
  (c) determine, based on at least the current position and the desired position of the refueling device, whether to extend or retract the hose;
  (d) send a command for adjusting the state of one or more force generating arrangements that are attached to the refueling device, causing the component of an aircraft to detect a changed force on the hose and to maintain the reference force on the hose, thereby changing the distance between the refueling device and the aircraft;
  (e) repeatedly perform (a) to (d) until the difference between the current position and the desired position of said refueling device is within a defined threshold.

In accordance with an embodiment of the presently disclosed subject matter, there is yet further presented a system, wherein the command further comprises: in response to the determination being to extend the hose, a command for adjusting the state of one or more force generating arrangements, so as to increase the force on the hose, thereby causing the component of an aircraft to detect the increased force and to extend the hose so as to maintain the reference force on the hose, thereby increasing the distance between the refueling device and the aircraft;

in response to the determination being to retract the hose, a command for adjusting the state of one or more force generating arrangements, so as to decrease the force on the hose, thereby causing the component of an aircraft to detect the decreased force and to retract the hose so as to maintain the reference force on the hose, thereby decreasing the distance between the refueling device and the aircraft.

In accordance with an embodiment of the presently disclosed subject matter, there is yet further presented a system, wherein the controller is further configured to: in response to an indication of an update in the desired position, perform (a) to (e) of the second aspect of the presently disclosed subject matter in respect of the updated desired position.

In accordance with an embodiment of the presently disclosed subject matter, there is yet further presented a system, wherein the controller is further configured to: repeatedly perform said (a) to (e) of the second aspect of the presently disclosed subject matter, for at least one of the following desired positions: an at least one waiting point position, an updated waiting point position, a position of a receptacle located on a receiver aircraft, an updated position of the receptacle, a safe disengagement position, an updated safe disengagement position and an at least one post-disengagement waiting point position.

In accordance with an embodiment of the presently disclosed subject matter, there is yet further presented a system, wherein the controller is further configured to:
  i. in response to an indication that the component changed to a response mode, whereby the component is configured to maintain the reference force on the hose, obtain at least one waiting point position at which the refueling device will await arrival of at least one receiver aircraft;
  ii. in respect of each one of the at least one waiting point positions:
    A. set the waiting point position to constitute the desired position of the refueling device;
    B. perform (a) to (e) of the second aspect of the presently disclosed subject matter in respect of the waiting point position, and in case of an indication of an update in the waiting point position, set the updated waiting point position to constitute the desired position of the refueling device and perform (a) to (e) in respect of the updated waiting point position,
  iii. in response to an indication that one of at least one receiver aircraft meets an engagement area specification condition, obtain the position of a receptacle located on the receiver aircraft, set the position of the receptacle to constitute the desired position of the refueling device, and perform (a) to (e) in respect of the position of the receptacle, and in case of an indication of an update in the position of the receptacle, set the updated position of the receptacle to constitute the desired position of the refueling device and perform (a) to (e) in respect of the updated position of the receptacle, for the purpose of reaching and then engaging the receptacle;
  iv. in response to an indication of engagement of the refueling device and the receptacle, obtain a safe disengagement position, and set the safe disengagement position to constitute the desired position of the refueling device;
  v. performing (a) to (e) in respect of the safe disengagement position, and in case of an indication of an update in the safe disengagement position, set the updated safe disengagement position to constitute the desired position of the refueling device and perform (a) to (e) in respect of the updated safe disengagement position; and vi. in response to the indication of disengagement of the refueling device and the receptacle, perform, for each next receiver aircraft of at least one receiver aircraft;
   A. obtain at least one post-disengagement waiting point position;
   B. perform (ii) to (v), wherein each one of the at least one post-disengagement waiting point position constitutes each one of the at least one waiting point positions;
whereby one or more receiver aircraft can be refueled.

In accordance with an embodiment of the presently disclosed subject matter, there is yet further presented a system further comprising at least one of:
   i) a response mode control module, configured to automatically perform steps (a) to (e) of the second aspect of the presently disclosed subject matter while the refueling device is not engaged with the receptacle;
   ii) an engaged-response mode control module, configured to automatically perform (a) to (e) while the refueling device is engaged with the receptacle;
   iii) a sensor control module, configured to operate position sensors;
   iv) an actuators interface module, configured to send the command for adjusting the state of one or more force generating arrangements.

In accordance with an embodiment of the presently disclosed subject matter, there is presented a system further comprising an engagement/disengagement control module, configured to provide at least one of: an engagement command to the refueling device for causing the refueling device to engage with the receptacle, and a disengagement command to the refueling device for causing the refueling device to disengage from the receptacle.

In accordance with an embodiment of the presently disclosed subject matter, there is yet further presented a system wherein the determination is provided by one of a Proportional Integral (PI) Controller and a Proportional Integral Derivative (PID) controller, comprised in the processing circuitry.

In accordance with an embodiment of the presently disclosed subject matter, there is yet further presented a system wherein the controller receives as input at least one of: the desired position of the refueling device; the current position of the refueling device; a rate of movement of the refueling device; an acceleration of the refueling device; an indication of engagement state; and an indication of current component winding mode.

In accordance with an embodiment of the presently disclosed subject matter, there is yet further presented a system wherein the desired position and current position are distances from the component of an aircraft.

In accordance with an embodiment of the presently disclosed subject matter, there is yet further presented a system wherein the distances are in the direction fore and aft.

In accordance with an embodiment of the presently disclosed subject matter, there is yet further presented a system wherein the distances are between the refueling device and the point where the hose exits one of the components of the aircraft or the tanker aircraft.

In accordance with an embodiment of the presently disclosed subject matter, there is yet further presented a system wherein the component of an aircraft is a hose winding component capable of being attached to at least one of: the aircraft and a pod which is attached to the aircraft.

In accordance with an embodiment of the presently disclosed subject matter, there is yet further presented a system wherein the hose winding component is a Host Drum Unit (HDU).

In accordance with an embodiment of the presently disclosed subject matter, there is yet further presented a system wherein the aircraft is a tanker aircraft, the hose is a fuel hose, the refueling device includes a fuel delivery nozzle and the refueling device is capable of engaging and refueling the receiver aircraft.

In accordance with an embodiment of the presently disclosed subject matter, there is yet further presented a spatial control system, comprising: the controller and at least one of a data store coupled to the controller; one or more position sensors coupled to the controller; one or more engagement sensors coupled to the controller; one or more external data sources coupled to the controller; one or more force generating arrangements; actuators for the one or more force generating arrangements coupled to the controller and coupled to the one or more force generating arrangements; one or more other adjustable control surfaces; and one or more actuators for the one or more other adjustable control surfaces coupled to the controller and coupled to the one or more other adjustable control surfaces.

In accordance with an embodiment of the presently disclosed subject matter, there is yet further presented a refueling device for use in in-flight refueling operation, comprising: a selectively steerable body configured for being towed by the aircraft via a hose at least during in-flight refueling, and comprising force generating arrangements configured to enable a change in the force on the hose; and the controller.

In accordance with a third aspect of the presently disclosed subject matter, there is yet further presented a non-transitory program storage device readable by a computer tangibly embodying computer readable instructions executable by the computer to perform a method for controlling maneuver of a refueling device that is attachable by means of a non-rigid hose to a component of an aircraft, wherein the component is configured to selectively maintain a reference force on the hose; the method comprising:
   (a) obtaining a desired position of the refueling device;
   (b) obtaining a current position of the refueling device;
   (c) determining, based on at least the current position and the desired position of the refueling device, whether to extend or retract the hose;
   (d) sending a command for adjusting the state of one or more force generating arrangements that are attached to the refueling device, causing the component of an aircraft to detect a changed force on the hose and to maintain the reference force on the hose, thereby changing the distance between the refueling device and the aircraft;
   (e) repeatedly performing (a) to (d) until the difference between the current position and the desired position of said refueling device is within a defined threshold.

In accordance with an embodiment of the presently disclosed subject matter, there is yet further presented a non-transitory program storage device, wherein the command further comprises:
   in response to the determination being to extend the hose, a command for adjusting the state of one or more force generating arrangements, so as to increase the force on the hose, thereby causing the component of an aircraft to detect the increased force and to extend the hose so as to maintain the reference force on the hose, thereby increasing the distance between the refueling device and the aircraft;

in response to the determination being to retract the hose, a command for adjusting the state of one or more force generating arrangements, so as to decrease the force on the hose, thereby causing the component of an aircraft to detect the decreased force and to retract the hose so as to maintain the reference force on the hose, thereby decreasing the distance between the refueling device and the aircraft.

BRIEF DESCRIPTION OF THE DRAWINGS

In order to understand the presently disclosed subject matter and to see how it can be carried out in practice, examples will now be described, by way of non-limiting example only, with reference to the accompanying drawings, in which:

FIGS. 11a to 1b illustrate a generalized example scenario of refueling device control while engaged with a receiver aircraft, in accordance with certain embodiments of the presently disclosed subject matter.

DETAILED DESCRIPTION OF THE DRAWINGS

Figure 1A:
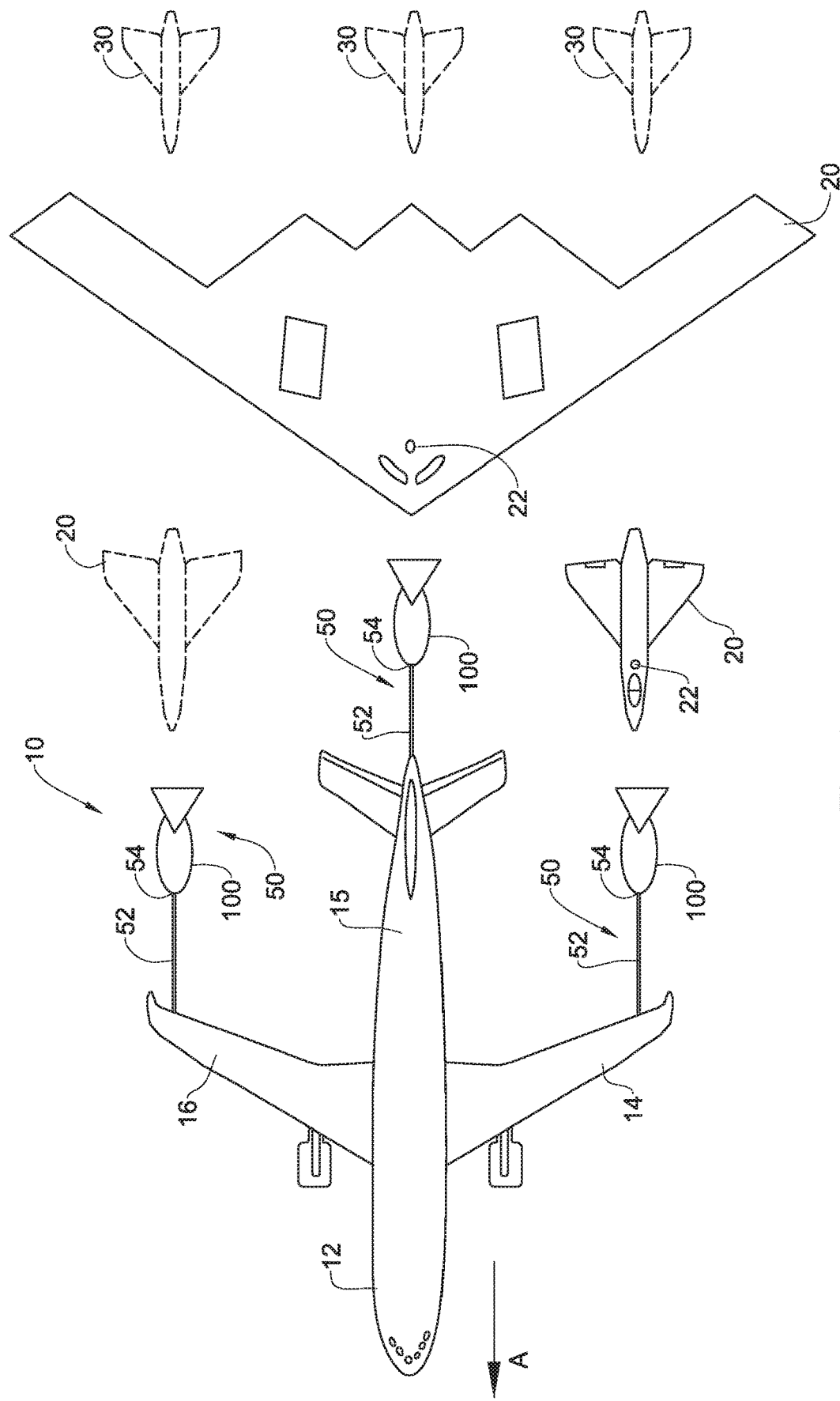
FIGS. 1a and 1b are top and side views of an example of a tanker system that includes a refueling device, in accordance with certain embodiments of the presently disclosed subject matter.

In the drawings and descriptions set forth, identical reference numerals indicate those components that are common to different embodiments or configurations.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components, circuits and protocols have not been described in detail so as not to obscure the presently disclosed subject matter.

Unless specifically stated otherwise, as apparent from the following discussions, it is appreciated that throughout the specification discussions utilizing terms such as "maneuvering", "steering", "aligning", "determining", "calculating". "providing", "causing", "activating", "receiving", "acquiring", "comparing", "obtaining". "updating", "changing", "processing" or the like, include action(s) and/or processes of a computer that manipulate and/or transform data into other data, said data represented as physical quantities. e.g. such as electronic or mechanical quantities, and/or said data representing the physical objects. The term "computer" should be expansively construed to cover any kind of hardware-based electronic device with data processing capabilities, including, by way of non-limiting example, a personal computer, a server, a computing system, a communication device, a processor or processing unit (e.g. digital signal processor (DSP), a microcontroller, a microprocessor, a field programmable gate array (FPGA), an application specific integrated circuit (ASIC), etc.), any other electronic computing device, including, by way of non-limiting example, the processing circuitry therein, such as for example the processing circuitry 350 (further detailed herein with regard to FIG. 3b) and the PID Controller processing circuitry 8000 (further detailed herein with regard to FIG. 8b), disclosed in the present application.

The operations in accordance with the teachings herein may be performed by a computer specially constructed for the desired purposes, or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

The terms "non-transitory memory" and "non-transitory storage medium" used herein should be expansively construed to cover any volatile or non-volatile computer memory suitable to the presently disclosed subject matter.

As used herein, the phrase "for example," "such as", "for instance" and variants thereof describe non-limiting embodiments of the presently disclosed subject matter. Reference in the specification to "one case", "some cases", "other cases", "one example", "some examples", "other examples" or variants thereof means that a particular described method, procedure, component, structure, feature or characteristic described in connection with the embodiment(s) is included in at least one embodiment of the presently disclosed subject matter, but not necessarily in all embodiments. The appearance of the same term does not necessarily refer to the same embodiment(s) or example(s).

Usage of conditional language, such as "may", "might", or variants thereof should be construed as conveying that one or more examples of the subject matter may include, while one or more other examples of the subject matter may not necessarily include, certain methods, procedures, components and features. Thus such conditional language is not generally intended to imply that a particular described method, procedure, component or circuit is necessarily included in all examples of the subject matter. Moreover, the usage of non-conditional language does not necessarily imply that a particular described method, procedure, component or circuit is necessarily included in all examples of the subject matter.

It is appreciated that certain embodiments, methods, procedures, components or features of the presently disclosed subject matter, which are, for clarity, described in the context of separate embodiments or examples, may also be provided in combination in a single embodiment or examples. Conversely, various embodiments, methods, procedures, components or features of the presently disclosed subject matter, which are, for brevity, described in the context of a single embodiment, may also be provided separately or in any suitable sub-combination.

It should also be noted that each of the figures herein, and the text discussion of each figure, describe one aspect of the presently disclosed subject matter in an informative manner only, by way of non-limiting example, for clarity of explanation only. It will be understood that that the teachings of the presently disclosed subject matter are not bound by what is described with reference to any of the figures or described in other documents referenced in this application.

Bearing this in mind, attention is now drawn to FIG. 1a, illustrating an example of a tanker system, in accordance with certain embodiments of the presently disclosed subject matter. A tanker system according to one example of the presently disclosed subject matter, generally designated 10, comprises a tanker aircraft 12 (also referred to interchangeably herein as first aircraft or as a tanker) comprising one or more in-flight refueling systems 50. In this example, the tanker aircraft 12 has three such in-flight refueling systems 50, one comprised on each one of the pot wing 14 and starboard wing 16, and a third one comprised on the rear portion of the fuselage 15, and the tanker aircraft 12 is configured for in-flight concurrent refueling of up to three receiver aircraft 20. In alternative variations of this example, the tanker aircraft 12 may have at least one, or two, or more than three in-flight refueling systems 50, arranged in any suitable configuration with respect to the tanker aircraft 12.

By way of non-limiting example, the tanker aircraft may be an Unmanned Aerial Vehicle (UAV), and/or at least one of the receiver aircraft 20 may be a UAV.

Each in-flight refueling system 50 may comprise an elongate, non-rigid, fuel delivery hose 52 (also referred to interchangeably herein simply as a hose), reversibly extendible from the tanker aircraft 12. A first end (not shown) of the hose 52 is connected to a refueling fuel tank (not shown) carried by the tanker aircraft 12. For example, such a refueling fuel tank can be an internal fuel tank of the tanker aircraft 12, for example the tanker aircraft's own fuel tanks, or a special fuel reservoir mounted internally in the tanker aircraft 12 for example in the fuselage, or externally and carried in fuel pods, for example.

Figure 1B:
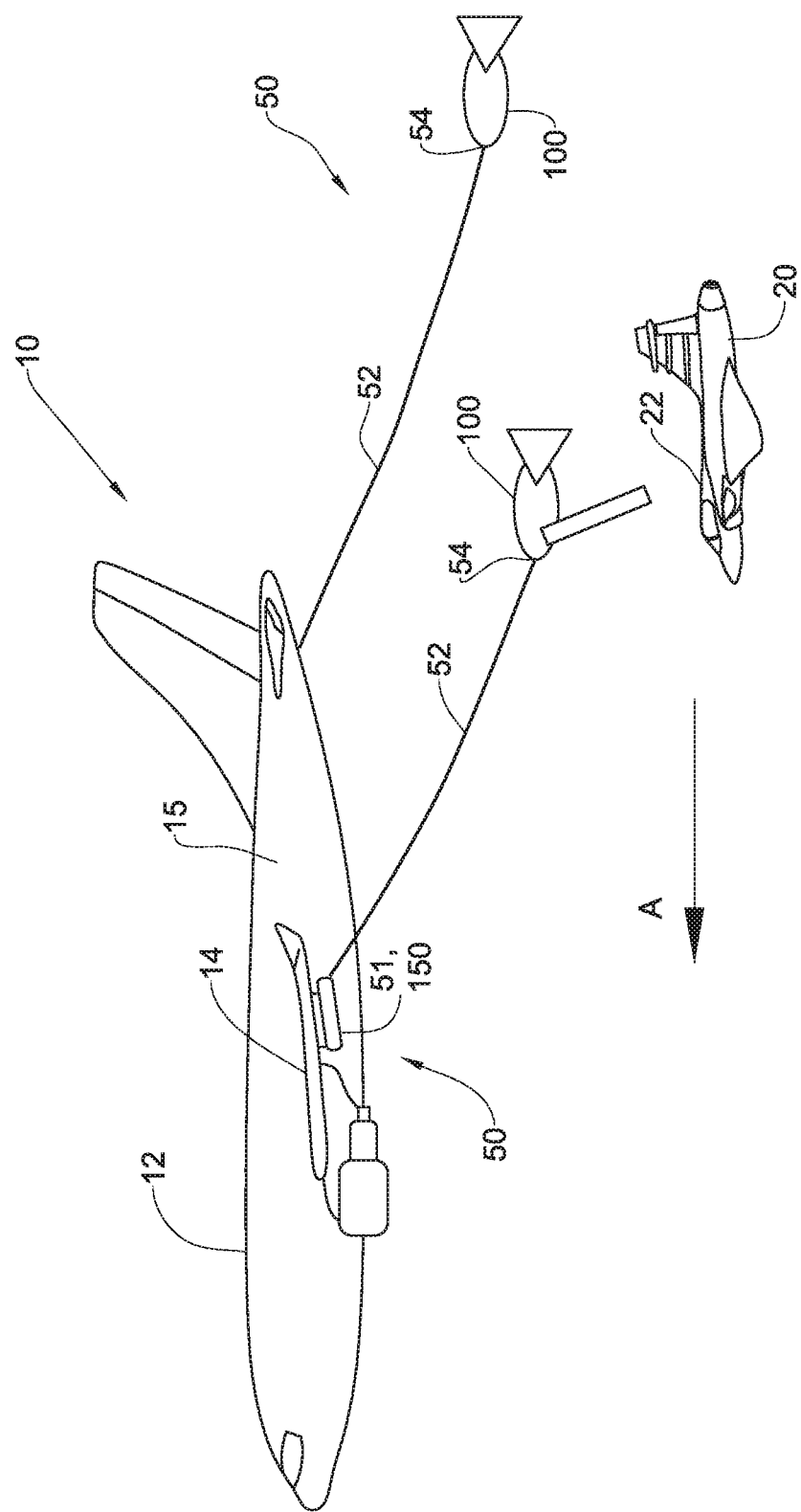

Attention is now drawn to FIG. 1b, showing a side view of the tanker system 10, in accordance with certain exemplary embodiments of the presently disclosed subject matter. The fuel hose 52 is flexible, and may be attached to and can be retracted into a component, 150, e.g. a roll up drum, suitably provided in the tanker aircraft 12. The hose 52 can be selectively deployed therefrom when required. In some embodiments, this component or drum is called a drum unit, Hose Drum Unit, or Hose and Drogue Unit (HDU) 150. This component in some embodiments is capable of being attached to or stored in or located within a pod 51. Such pods may be mounted on wings of the tanker 12 in certain embodiments, and in such a case may be referred to as Wing Air Refueling Pods (WARPs). In some embodiments, the component may be capable of being attached or mounted directly onto the tanker aircraft 12. The second (aft) end 54 of hose 52 may be operatively connected or coupled to a respective refueling device 100, an aerodynamic body that is towed in a forward direction A by the tanker aircraft 12 via the hose, when the hose is extended and the tanker aircraft is in flight. Thus, the refueling device 100 is capable of being attached to the HDU component 150 by means of hose 52. The refueling device may be towed by the tanker aircraft at least during in-flight refueling.

In the example depicted in FIG. 1a, one in-flight refueling system 50 is centrally-located and mounted with respect to the rear fuselage of the tanker aircraft 12, and each of the other two in-flight refueling systems 50 is comprised in a respective pod 51 that is attached to the underside of the respective wing. Other configurations are of course possible.

FIG. 1a also shows second aircraft 20 approaching the first aircraft 12, in order to connect to the refueling device 100, so as to refuel, according to some embodiments of the current subject matter. These second aircraft are also referred to interchangeably herein as receiver aircraft. In the example shown in the figure, two such receiver aircraft 20 are approaching tanker aircraft 12. Note, as shown in the example depiction of FIG. 1a, that the receiver aircraft 20 may be of various types and sizes. In some embodiments, the receiver aircraft may be combat aircraft of various types (fighters, bombers, reconnaissance aircraft, drones etc.). In some embodiments, there is at least one receptacle 22, which may be a fuel receptacle, on a receiver aircraft. The refueling device may be capable of engaging and refueling. The refueling device 100 and the fuel receptacle 22 may connect or engage or mate, and this can enable transfer of fuel from tanker aircraft 12 to receiver aircraft 20 via fuel receptacle 22.

In the example of FIG. 1a, no receiver aircraft has approached the refueling device 100 on starboard wing 16. This absence of a receiver aircraft is noted in the figure by the reference 20 composed of dashed lines. The figure further shows several other receiver aircraft 30, waiting for a refueling process to be completed for receiver aircraft 20, and thus, in their turn, approach the tanker aircraft 12 and undergo a refueling process. In the example of FIG. 1*a*, there are three such waiting receiver aircraft 30.

The refueling device 100 is also referred to interchangeably herein as fueling device, a device, or a boomless. The latter term may refer, for example, to device 100 enabling refueling using a hose rather than a flying boom. Refueling device 100 may be referred to interchangeably herein also as a drone, a refueling drone or a fueling drone, or as an Unmanned Aerial Vehicle (UAV), although it is understood that it could be a manned vehicle. Device 100 may also referred to interchangeably herein as a non-aircraft-fixed in-flight refueling device, and similarly system 50 may be referred to as a non-aircraft-fixed in-flight refueling system. In some example embodiments, refueling device 100 may move, and adjust its control surfaces, automatically in response to commands from external sources, while in some cases (when all the necessary components are fitted within the refueling device 100) it may do so autonomously, or based on a combination of autonomous determinations and external indications. Refueling device 100 includes a selectively steerable body, as further detailed herein.

Note that throughout the description and the claims, reference is made interchangeably to the terms position, spatial relationship and spatial disposition. These terms or the like can relate to spatial distances, spatial angles (including orientations and attitudes), or any other spatial reference that is used for characterizing a spatial relationship between two objects, e.g. between any two of the following: the tanker aircraft 12 and the component 150, the receiver aircraft 20 (and a fuel receptacle 22 thereof), the refueling device 100 and the boom member 230B.

Figure 2:
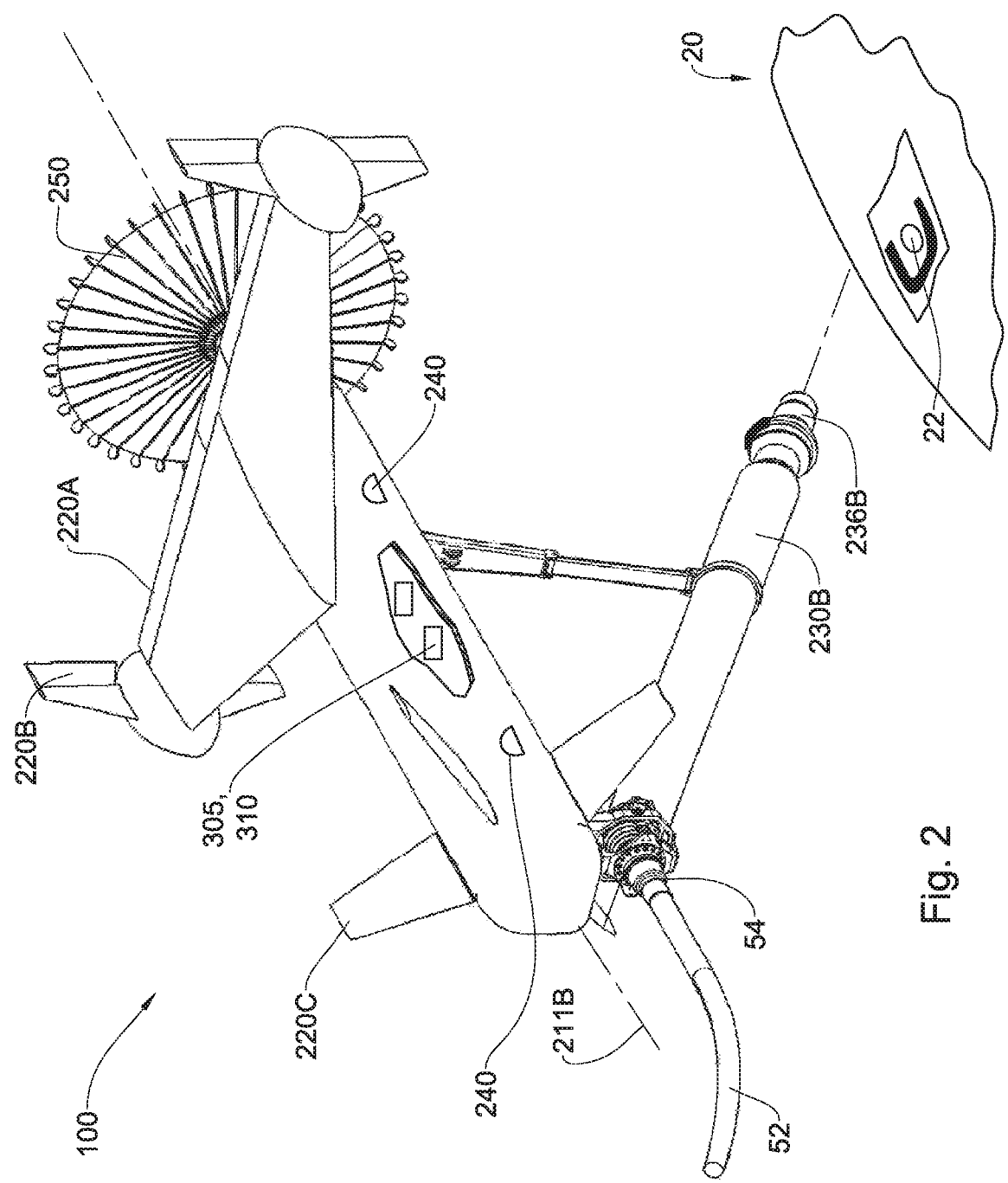
FIG. 2 is an isometric view of an example of a refueling device, in accordance with certain embodiments of the presently disclosed subject matter.

Referring now to FIG. 2, it illustrates one example embodiment of a refueling device in accordance with certain embodiments of the presently disclosed subject matter, generally designated 100, for use with a non-aircraft-fixed in-flight refueling system, for example at least one of the in-flight refueling systems 50 illustrated in FIGS. 1*a* and 1*b*.

The example refueling device 100 is affixed to the aft end 54 of hose 52. The device 100 may have, in some embodiments, a fuel delivery nozzle 236B, (referred to herein interchangeably also as fuel nozzle or simply nozzle) which may engage the receptacle 22 of the receiver aircraft 20. The nozzle 236B of refueling device 100 is configured for and is capable of reversibly engaging with the fuel receptacle 22, and of enabling transfer of fuel between the tanker 12 and the receiver aircraft 20. The nozzle can include any known per se design of such an in-flight refueling nozzle. In some embodiments, the fuel nozzle may be at the end of a boom member 230B, constituting part of the refueling device 100, which may be used to enable the engagement.

The refueling device may include in some embodiments one or mom adjustable aerodynamic control surfaces of various types, which enable and assist in selectively steering the body of the refueling device. (These are referred to herein interchangeably also as control surfaces.) These may include control surfaces 220A, which may be for example elevators, ailerons, and/or elevons; control surfaces 220B, which may be for example rudders; and/or control surfaces 220C, which may be for example canards or vanes. The number of control surfaces of each type may vary. They may be positioned at various locations fore and/or aft along the refueling device, connected to the device at various possible angles. These control surfaces may in some cases move with the aid of actuators, not shown in the figure.

Note that the above example description is but one example representation of the structure and shape of refueling device 100. Note that various example embodiments of such a refueling device, and possible physical structures for such a device, are described in publications WO 2013/102906 A2 (Publication date 11 Jul. 2013) and WO 2013/102903 A2 (Publication date 11 Jul. 2013). See for instance pages 48-84 and drawings referenced there. Therefore the full contents of these publications are incorporated by reference herein where appropriate for appropriate teachings of additional or alternative details, features and/or technical background.

In some examples, the refueling device may have its own propulsion method, e.g. an engine (not shown). In other examples, the refueling device may not include an independent means of propulsion. It may have power, e.g. autonomous from a component on the refueling device, to allow movement and adjustment of the various actuators of control surfaces.

Refueling device 100 may also include in some embodiments one or more sensors of various types, which are indicated in the figure in a generalized way as 240. Sensors are discussed further e.g. with regard to FIG. 3. Refueling device 100 may also include a controller 305 and a data store 310. Example functions of the sensors, the controller and the data store as well as possible locations for placement of these systems, are further detailed herein, with respect to FIG. 3.

In some embodiments, refueling device 100 may further include an airbrakes system, including one or more selectively and reversibly deployable airbrakes 250. The airbrakes may be attached to the refueling device 100. The airbrakes may be moved by actuators or actuation mechanisms (not shown in the figure) connected to refueling device 100. The airbrakes and the actuators may be controlled by controller 305.

Figure 3A:
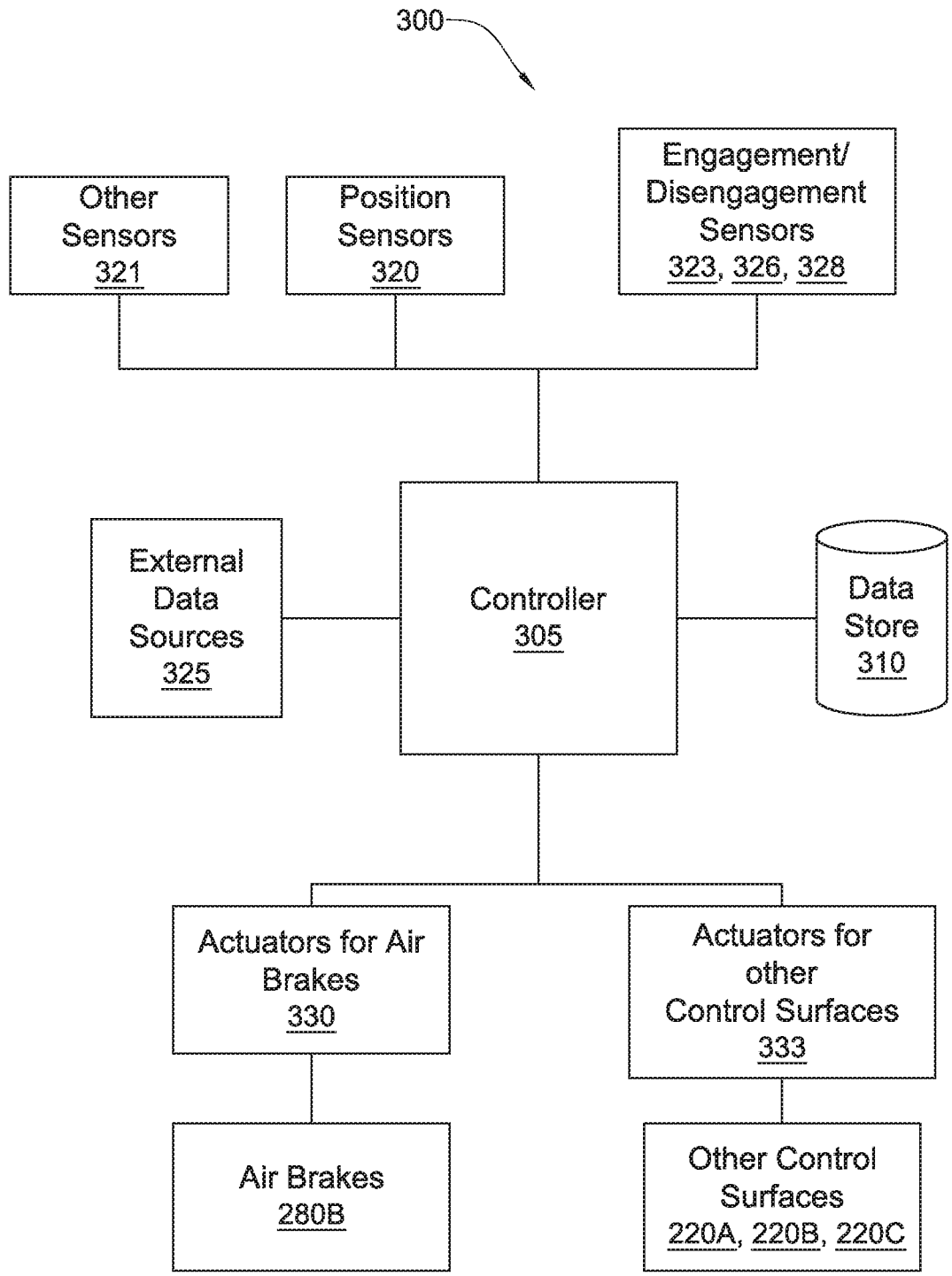
FIG. 3a is a block diagram schematically illustrating a system configured for controlling maneuver of a refueling device, in accordance with certain exemplary embodiments of the presently disclosed subject matter.
Figure 3B:
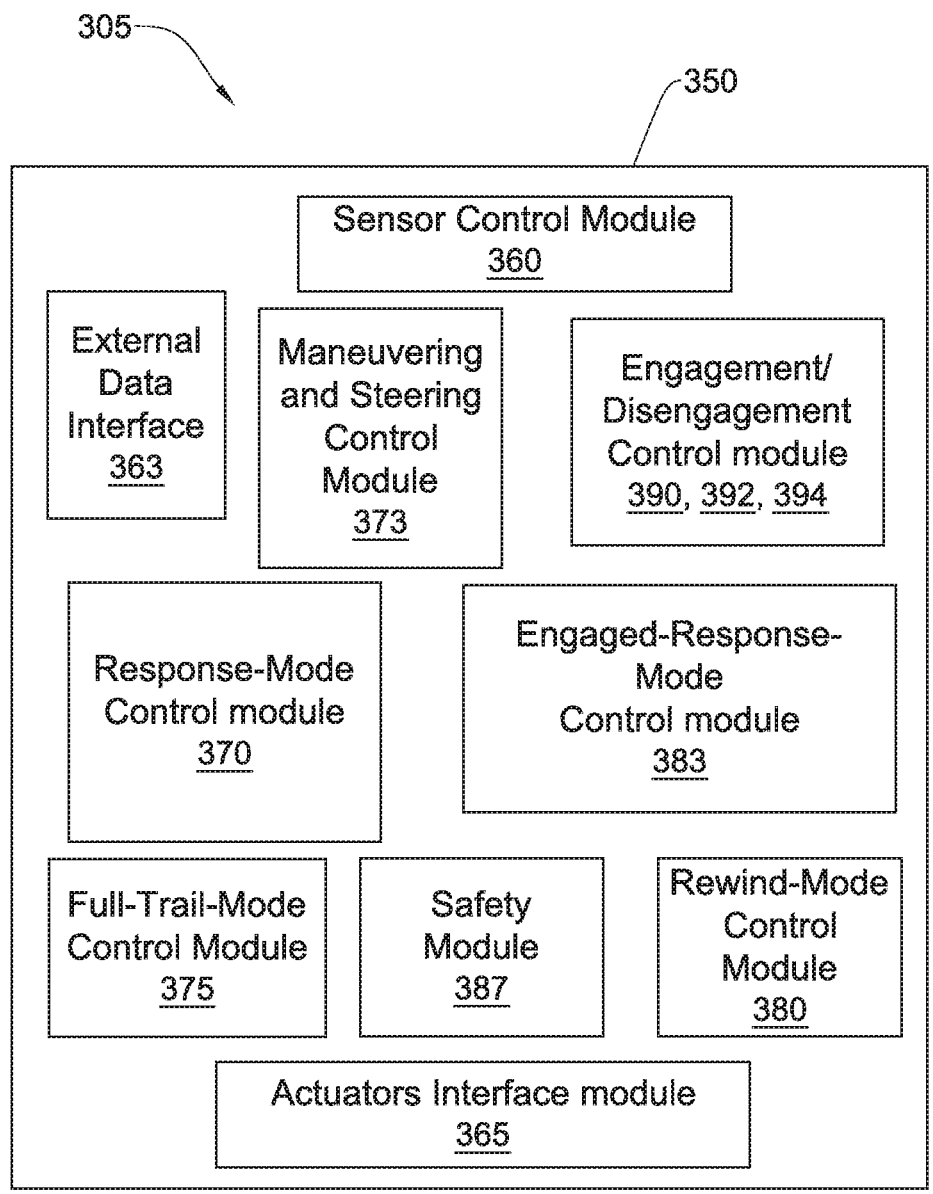
FIG. 3b is a block diagram schematically illustrating processing circuitry configured for controlling maneuver of a refueling device, in accordance with certain exemplary embodiments of the presently disclosed subject matter.
Figure 4A:
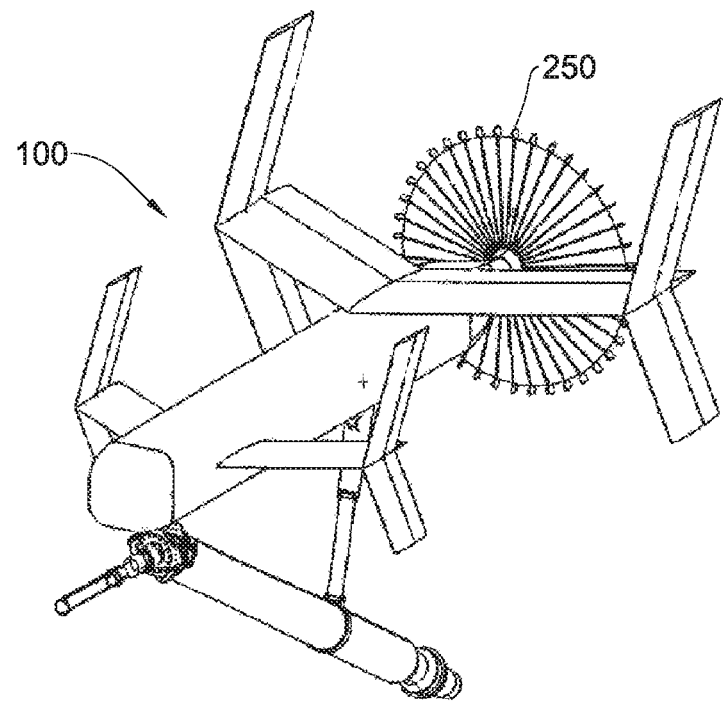
FIGS. 4a and 4b are an isometric view of another example of a refueling device, in accordance with certain embodiments of the presently disclosed subject matter.
Figure 4B:
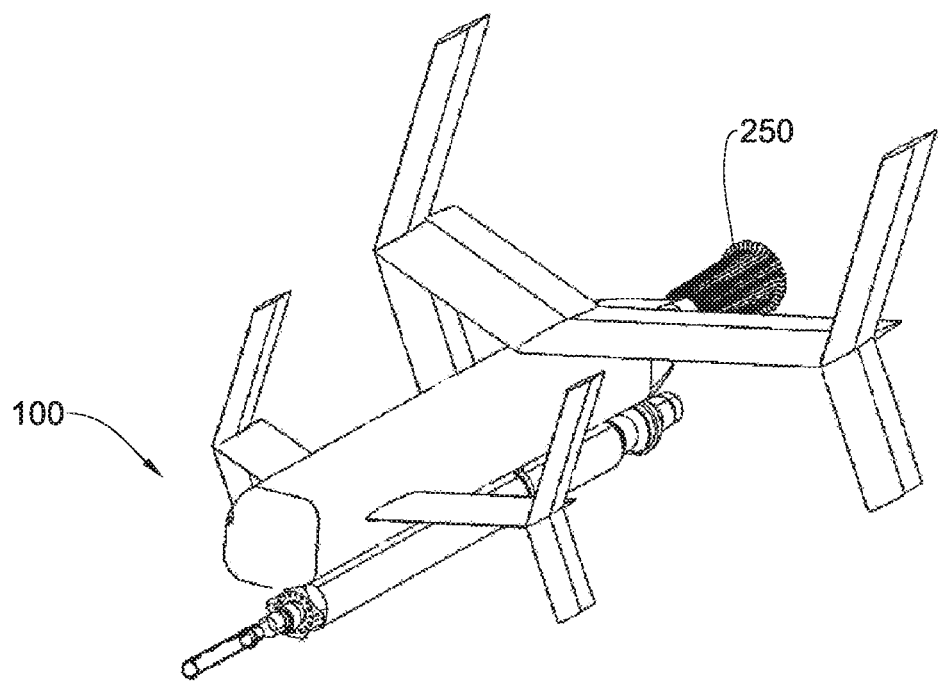

Before turning to FIG. 3, attention is drawn to FIGS. 4*a* and 4*b*, which illustrate one exemplary embodiment of a physical configuration of a refueling device 100 and airbrakes 250, in accordance with certain embodiments of the presently disclosed subject matter. In some embodiments, airbrakes can be configured to selectively induce or generate a drag force on the refueling device 100. In some embodiments, opening the airbrakes may refer to adjusting them so as to increase drag force, and closing the airbrakes may refer to adjusting them so as to decrease drag force.

In the particular embodiment shown in the figures, the airbrake is of a drogue structure 250, for example an umbrella-like form, in which drag is a function of the opening angle. The drogue structure 250 has a closed configuration, in which drogue structure 250 generates minimum drag, and an open configuration, in which drogue structure 250 generates more drag than in the closed configuration, up to a maximum drag. As will be described, in some embodiments, this change of drag force may in turn induce a tension force in the hose 52, which may in turn help to enable the refueling device 100 to move axially fore and aft, along the longitudinal axis of the flight of tanker aircraft 12. FIG. 4*a* illustrates the airbrake substantially in a fully open position, in which the maximum drag force, of which the particular airbrake is capable, is being applied to the refueling device 100. FIG. 4*b* illustrates the airbrake substantially in a fully closed position, in which a very minimal drag force is being applied to the refueling device 100. The airbrakes may be adjusted to continuous intermediate positions or states, that are between those shown in FIGS. 4 and 4b, so as to provide varying levels of drag on a continuum.

Other embodiments of airbrakes are also possible. Also, for simplicity of exposition, the present description herein is with reference to the example of airbrakes whose position is adjusted. These can include, for example, control surfaces that can extend out to varying positions, and/or to be pivoted to different angles of deflection, so as to interfere with the airstream to various degrees, and thus selectively induce a drag force on the refueling device 100. In some embodiments, airbrakes are control surfaces that are opened in all directions, so as to induce drag without causing yaw, roll and/or pitch. Note also that FIG. 4 show a different physical embodiment of refueling device 100 than is shown in FIG. 2. In some embodiments, the airbrakes may be characterized for example as described in the previously-mentioned publication WO 2013/102903 A2, for example in parts of pages 59-61, 64, 71, 78-79 and in related figures. In addition, throughout the present disclosure the term "airbrake" or "airbrakes" may refer to one or more airbrakes, of one or possibly more types, as may be utilized in a particular embodiment.

Though the subject matter is described herein with reference to the specific example of airbrakes, it should be noted that airbrakes are one example of a fore generating arrangement or force inducing arrangement that can be configured to selectively generate or induce forces on the refueling device, thereby inducing forces on the hose, and also to modify the level of those forces. In some embodiments, where the relevant force is drag, such an arrangement may be referred to as a selectively-modifiable drag-modifying arrangement or drag-inducing arrangement. This might include, in addition to for example airbrakes of various types, reverse thrusters which apply a varying force in the direction opposite to the direction A of movement of the tanker 12. Thus, wherever reference is made to adjusting the position of airbrakes, it should be understood to include as well the adjusting of the angle of deflection of airbrakes, and/or the adjusting of the state of, or the configuration of, one or more force generating arrangements that generate or induce or modify forces, such as for example drag.

Turning to FIG. 3, there is now provided a description of certain examples of systems for controlling in-flight refueling.

Reference is now made to FIG. 3a, which is a block diagram schematically illustrating an example system for maneuvering a refueling device, in accordance with certain embodiments of the presently disclosed subject matter. In some examples, spatial control system 300 may include at least one controller 305, in addition to other components.

The controller 305 may in some examples be a computer. It may, by way of non-limiting example, comprise processing circuitry 350 (further detailed herein with regard to FIG. 3b) or PID Controller processing circuitry 8000 (further detailed herein with regard to FIG. 8b). The controller 305 may include a plurality of controllers, possibly in a distributed architecture, which are adapted to independently and/or cooperatively operate to process various data, electrical and/or mechanical inputs (after being converted into electrical or possibly digital form), for controlling the relevant components of spatial control system 300 and for enabling operations related to spatial control system 300 components. In some other examples, the controller 305 can be a fully mechanical system. In some cases multiple instances of controller 305, or of a particular component or module within it, may be utilized for reasons of redundancy and availability. Other components of spatial control system 300 may likewise be implemented as multiple instances, for the same reasons. In some cases, the controller(s) 305, and/or the entire spatial control system 300, can be centrally located in one of, or alternatively can be distributed among more than one of, the refueling device 100 the receiver aircraft 20, the tanker aircraft 12 and/or any other location, including remote locations such as for example a separate airborne/seaborne or land-located system (e.g. on land vehicles, airports and bases). The communication between the various components of the spatial control system 300, and between various components of controller 305 (in cases where it is not located entirely in one location) can be realized by any signaling system or communication components, protocols and modules, and can be wired and/or wireless.

The controller 305 may be operatively coupled or connected to, or associated with, at least one position sensor 320 and can be configured to control the operation of the position sensor 320. This may be a local positioning system, that determines position of the refueling device relative to e.g. the tanker aircraft—e.g. camera or Light Detection And Ranging (LIDAR). In some embodiments, the sensors 320 may be characterized for example as described in the previously-mentioned publication WO 2013/102903 A2, for example in parts of pages 82-85. In some cases, multiple sensors can be utilized, including, for example, a combination of different sensor types, or multiple redundant sensors of the same type. In some embodiments, one or more of the position sensors are able to measure or determine the refueling device's 100 current distance from the tanker aircraft 12 or from component 150, and/or from the receiver aircraft 20, and its position and attitude relative to that of the tanker aircraft and/or that of the receiver aircraft.

It should be mentioned at this point that terms such as "distance from the tanker" or "distance from the HDU component" may be used here for simplicity. However, the distance of interest that is being measured, and the distance to which the controller 305 may try to move the refueling device, may strictly speaking be the distance between a particular point on the refueling device 100 and the point where the hose exits the component 150 or the tanker aircraft 12, as the case may be, for example the point where the hose exits the component or the aircraft into the air.

Similarly, in some embodiments the controller 305 may be operatively coupled or connected to, or associated with, at least one engagement and/or disengagement sensor 323. In some embodiments, sensor 323 detects engagement and/or disengagement between the device 100 and the receptacle 22 of receiver aircraft 20. Note that in some embodiments separate engagement sensors 326 and disengagement sensors 328 may exist.

The controller 305 may be operatively connected or coupled to, or associated with, one or more other sensors 321. Examples of these sensors may include accelerometers, through which refueling device acceleration may be obtained and used as further detailed herein.

The controller 305 may in some embodiments be operatively coupled or connected to, or associated with, one or more data stores, data repositories or memories 310. The data store may include a memory or storage or database, including at least: reference geometrical data of the shape of at least part of each relevant type or model of receiver aircraft 20, in particular the fuel receptacle 22, to assist in maneuvering the device 100 towards receiver aircraft 20. According to examples of the presently disclosed subject matter, the data store 310 can include configuration data related to a refueling volume and an engagement enabling position. The preceding are non-limiting examples of data that may be stored in the data store 310. Some additional examples are further detailed herein. Those skilled in the art will also readily appreciate that, like other components of spatial control system 300, the data stores 310 can be consolidated or divided in another manner, and that data stores, repositories and databases can be shared with other systems or be provided by other systems.

The controller 305 may in some embodiments be optionally operatively coupled or connected to one or more external data sources 325. Non-limiting examples of such external data sources may be systems located on the tanker aircraft 12, on one or more receiver aircraft 20, and/or systems located at another location, including remote locations. Non-limiting examples of data to be exchanged between controller 305 and external data sources 325 may include, among others, desired position of the refueling device 100, current position of the device 100, information concerning various waiting point positions, refueling engagement areas and safe disengagement positions. They may also include indications of changes in the component 150 mode, and/or of entry of receiver aircraft into refueling volumes. These parameters are further detailed herein. Similarly, it is possible that some or all of the sensors 320, 321 and 323, and/or the data store 310, may be located externally to the refueling device, and/or may not be co-located with controller 305, and may communicate with the controller as examples of external data sources 325. In some embodiments, the one-way and/or two-way (as needed) communication between external data sources and each other, and/or between external data sources and for example controller 305 associated with the refueling device 100, may be performed using known wired or wireless communications or signaling systems and protocols, or possibly a combination of the two.

Therefore, whenever the presently disclosed subject matter describes, for example, receipt of an indication of an event or of a change of state, or issuing of a command, in some embodiments this indication or command is provided by external systems or data sources 325, while in other embodiments it may be provided by e.g. the controller, a co-located sensor or co-located data store. Similarly, these indications may, depending on the embodiment, be e.g. provided automatically by systems, or based on a manual command issued by a human operator. A non-limiting list of example parameters and commands that can be provided in such manner includes the following: change of component mode, current position of refueling device, any of the desired positions of refueling device described herein, change or update to the desired position, arrival at desired position, arrival of receiver aircraft at a refueling volume, beginning approach to receiver aircraft, arrival at an engagement enabling position, command to actuate force members so as to engage/disengage, occurrence of engagement/disengagement, and whether or not the refueling device should wait for another receiver aircraft.

The controller 305 may in some embodiments be operatively coupled or connected to, or associated with one or more actuators or actuation mechanisms, and be capable of sending commands, for example to them, whether directly or indirectly. In some embodiments, these actuators include one or more airbrakes actuators 330, which can control, adjust and move one or more airbrakes 250. In some embodiments, these actuators include one or more actuators for other control surfaces 333 which can control, adjust and move one or more other adjustable control surfaces 220A, 220B and/or 220C). In some embodiments, the actuators 330 and 333 may receive electrical signals coming e.g. from controller 305, and convert these commands to mechanical motions of the airbrakes 250 and of at least the other control surfaces 220A-220C. Other implementations may exist for sending commands from a controller for adjusting the state of the airbrakes.

Reference is now made to FIG. 3b, which presents a generalized block diagram schematically illustrating one possible implementation of a controller, in accordance with certain exemplary embodiments of the presently disclosed subject matter. The controller may comprise processing circuitry 350. Processing circuitry 350 may comprise a processor and memory (not shown). This implementation may include at least certain example functional modules usable in a system for controlling maneuver of a refueling device. For example, the processing circuitry 350 may be, in non-limiting examples, a general-purpose computer specially configured for the desired purpose by a computer program stored in a non-transitory computer-readable storage medium. It may be configured to execute several functional modules in accordance with computer-readable instructions.

The processing circuitry 350 may include, in some embodiments, one or more sensor control modules 360. According to some examples of the presently disclosed subject matter, the sensor control module 360 can be configured to utilize and operate at least one of the sensors 320, 321, 323, or multiple instances of any of them, as part of the operation of and control over the refueling process. In some embodiments the sensor control module 360 is configured to operate sensors 320 and/or 321 in order to acquire data that enables, inter alia, repeated determination of various types of spatial and position data as further detailed herein. In some examples, the combination of sensors 320, 321 and/or processing circuitry 350 may be referred to as a data acquisition system.

The processing circuitry 350 may further include, in some embodiments, a maneuvering and steering control module 373. These modules may determine or calculate, and then send, maneuvering and steering commands, e.g. via actuators interface module 365, to actuators 333, so as to adjust control surfaces 220A-220C.

The determination and sending of commands may be done for the purpose of controlling the alignment or attitude of the refueling device 100 and/or of components of it, such as the boom member 230B for example. It also may be done to control the motion along various axes. It is to be noted that steering commands and the alignment commands are also interchangeably referred to herein as maneuvering commands.

The processing circuitry 350 may further include, in some embodiments, a safety module 387. Safety module 387 can be configured to monitor hazardous situations in the refueling process, as further detailed herein. The hazardous situations can be defined, for example, by a set of thresholds and/or parameters and respective safety conditions. Some of these parameters may be stored in the data store 310. For instance, safety module 387 can be configured to monitor that the refueling device 100 does not approach the receiver aircraft 20 or the tanker aircraft 12 (or vice versa) in an unsafe manner.

The processing circuitry 350 may further include, in some embodiments, an engagement/disengagement control module 390. Engagement/disengagement control module 390 can be configured to provide an engagement command to the refueling device 100 for causing the refueling device 100 to engage with the fuel receptacle 22 of the receiver aircraft 20 for performing refueling, and/or to provide a command to the refueling device 100 to disengage from the fuel receptacle 22 of receiver aircraft 20, as further detailed herein. In some embodiments, there may be a separate engagement control module 392 and disengagement control module 394.

The processing circuitry 350 may still further include, in some embodiments, an external data interface 363 for enabling one or more components of the controller to operate in cooperation with external or auxiliary components, units, devices, systems or modules. In some embodiments, these external components are represented by the external data sources 325. For example, the interface 363 can implement various protocols, software languages, drive signals, etc. By way of example, the interface 363 can be used to receive information from the external data sources 325, and/or to operate certain systems on board e.g. one or more of the refueling device 100, the receiver aircraft 20 or the tanker aircraft 12.

The processing circuitry 350 may still further include, in some embodiments, an actuators interface module 365 for enabling one or more components of the controller to control and send commands for adjusting e.g. airbrakes actuators 330 and/or the actuators for other control surfaces 333. This can enable theses actuators to control, adjust and move the airbrakes 250 and/or the other control surfaces 220A-220C.

The processing circuitry 350 may still further include, in some embodiments, a response-mode control module 370, which can enable changes in the force applied to hose 52 for purposes of maneuver of the hose 52 and the refueling device 100. Example details of this functionality will be detailed further herein with regard to most of 1o FIGS. 5 through 14.

The processing circuitry 350 may still further include, in some embodiments, an engaged-response-mode control module 383, which can enable changes in the force applied to hose 52 during the time when the refueling device 100 and the receiver aircraft 20 are engaged. This function may be useful in ensuring that at disengagement the refueling device 100 will move to a safe position with respect to the receiver aircraft 20. Examples of this functionality will be detailed further herein at least with regard to FIGS. 11 and 12.

The processing circuitry 350 may still further include, in some embodiments, a full-trail-mode control module 375, which can control movement during the time when the refueling device 100 and the hose 52 are being deployed by the tanker aircraft 12 at the start of a refueling session. Examples of this functionality will be detailed further herein at least with regard to FIG. 5.

The processing circuitry 350 may still further include, in some embodiments, a rewind-mode control module 380, which can control movement during the time when the refueling device 100 and the hose 52 are being retracted by the tanker aircraft 12 at the end of a refueling session. Examples of this functionality will be detailed further herein at least with regard to FIG. 15.

FIGS. 3*a* and 3*b* illustrate only a general schematic of the system architecture, describing, by way of non-limiting example, one aspect of the presently disclosed subject matter in an informative manner only, for clarity of explanation only. It will be understood that that the teachings of the presently disclosed subject matter are not bound by what is described with reference to FIGS. 3*a* and 3*b*.

Each system component and module in FIG. 3 can be made up of any combination of software, hardware and/or firmware, executed on a suitable device or devices, that perform the functions as defined and explained herein. Equivalent and/or modified functionality, as described with respect to each system component and module, can be consolidated or divided in another manner. Thus, in some embodiments of the presently disclosed subject matter, the system may include fewer, more modified and/or different components, modules and functions than those shown in FIG. 3. To provide one non-limiting example of this, in some examples the functions of module 383 may be combined into module 370. One or more of these components and modules can be centralized in one location or dispersed and distributed over more than one location.

Having described an example tanker system and an example refueling device, as well as possible example systems used to control movement, attention is now turned to example methods that may be used to control movement of the refueling device. Before turning to FIG. 5 and elaboration of such control methods, some possible advantages of using a boomless refueling device and/or such control methods, in accordance with certain example embodiments of the presently disclosed subject matter, will be mentioned. Thus, in hitherto known hose and drogue systems, it may be the case that the drogue is not actively controlled, but rather aligns itself freely in the airflow aft of the tanker. The receiver aircraft 20 is therefore fitted with a probe that is configured for engaging with a receptacle on the drogue. Such a hose and drogue system thus cannot be used by receiver aircraft that have fuel receptacles, but do not have such a probe. Receiver aircraft that do not have a probe may require refueling using a boom-based solution, in which the tanker aircraft or systems attached to it control the process of engagement with the receiver aircraft.

On the other hand, use of a flying boom may in some cases limit the number of receiver aircraft that may be simultaneously refueled, as in some cases only one flying boom can be mounted on a tanker aircraft. In such cases, only one receiver aircraft having fuel receptacles, but not possessing a probe, could be refueled at a time.

A refueling solution that makes use of a boomless refueling device attached to a hose, which may have a boom member with nozzle, such as is described in some embodiments of the presently disclosed subject matter, may in some cases provide a possible advantage of being capable of serving also types of receiver aircraft that are not fitted with a probe, while possibly also being capable of simultaneously refueling multiple instances of such aircraft and/or aircraft that are fitted with a probe. Optionally, a tanker aircraft according to the presently disclosed subject matter can include, in some embodiments, one or two such refueling systems mounted to the wings (e.g. via pods) and additionally include one conventional "flying boom" system in the aft fuselage. Thus, it is readily apparent that existing tanker aircraft already fitted with conventional "flying boom" systems can be retrofitted with refueling systems according to certain embodiments of the presently disclosed subject matter, for example one such refueling system fitted onto each wing, thereby effectively tripling the refueling efficiency/capability of such a tanker aircraft, enabling up to three receiver aircraft having fuel receptacles to be refueled concurrently. Among other financial advantages of such an example configuration are shorter tanker flight times, and/or the need for fewer tankers in the tanker fleet.

In some cases it may be economical to enable such a solution by retrofitting an existing hose-and-drogue fueling system with a boomless refueling device taking the place of the drogue. This may possibly allow re-use of most of the Host Drum Unit or of another similar component, thereby decreasing the overall cost of implementing a boomless refueling solution. In cases where a refueling device is fitted to existing HDUs or similar components, it may be advantageous to make re-use of the existing component features functionalities, and not require that existing functionalities be changed or developed so as to enable use of the boomless refueling device. Such changes might include, for example, the ability of the HDU to control during its "floating" state while waiting for a receiver aircraft, wherein the HDU is neither extending nor retracting the hose in an extensive way. The reuse of existing component features/functionalities may be accomplished, in some embodiments, by associating the control logic, which may control movement and maneuver of the aft end of the hose, for example in the fore and aft direction, with a boomless refueling device rather than with the component 150. This requires an understanding of winding modes of operation of HDUs, as is known in the art.

The modes of operation of Host Drum Units (HDU) for winding and unwinding, as they exist in some implementations known in the art, will now be presented for reference. In many implementations of HDU components, hose and drogue fueling systems, as is well known in the existing art, the component 150, illustrated in FIG. 1b, has at least three (3) modes of control of winding: full-trail mode, rewind mode, and response mode. The component may be configured to selectively enter into, and operate in, each mode. Each mode may possibly be used in different stages of fueling operations.

(a) When the component is configured for or set to full trail mode, it unwinds the hose until substantially its full length. The exact implementation for this deployment may be, as a non-limiting example, to unwind to its full length, or to a defined extent that may be nearly its full length as the stop point, i.e. the "deployment length". This may be referred to as the hose's "full trail".

(b) When set to rewind mode, the component retracts or rewinds the hose until it is substantially fully rolled up back to or into the drum component.

(c) When set to response mode, the component attempts to maintain a reference forte or tension on the non-rigid hose 52. This reference force can be determined in various known per se manners. In some non-limited examples known in the art, the level or value of this reference force may be determined as follows: the HDU component includes or is associated with force sensors. At completion of full trail deployment, the component will obtain or measure the force that is being applied to the hose at that point in time. This force may be a function of, for example, the altitude of the hose and the speed of movement of the tanker. The component may then calibrate the reference force to be equal to this measured force. In other cases the reference force may be, for example, pre-defined by the manufacturer or by an operator, or can, for example, be set or configured by an operator or a system during a flight mission. When the drum detects a decrease in the tension, it may begin to retract, pull in or tighten the hose. Conversely, when this same component detects an increase in the tension, it may begin to extend or release or feed out the hose. This mode may, in some embodiments, enable the drum to ensure that there is not too much slack on the hose. HDU behavior is known in the art. Possible use of these modes in some embodiments of the presently disclosed subject matter will be detailed in the following discussion. As described further herein, it should be noted that, while in some embodiments the component 150 may attempt to maintain a substantially constant reference force, in some embodiments the controller 305, may successfully control the position of the refueling device even if e.g. the component 150 is maintaining the reference force with a large tolerance, such that the force cannot be considered substantially constant.

It should be noted that this description of HDU component 150 modes, which include both full trail and rewind modes, is an example only. The presently disclosed subject matter is applicable as well, in embodiments where the full trail mode and/or the rewind mode of operation do not exist in the component 150.

It should also be noted that, although the description below is with regard to, for example, an HDU or drum, they may be seen as examples of a hose winding system or a hose winding component, and that the presently disclosed subject matter is similarly applicable to other types and implementations of systems and components that are configured to wind and unwind a hose.

Figure 5A:
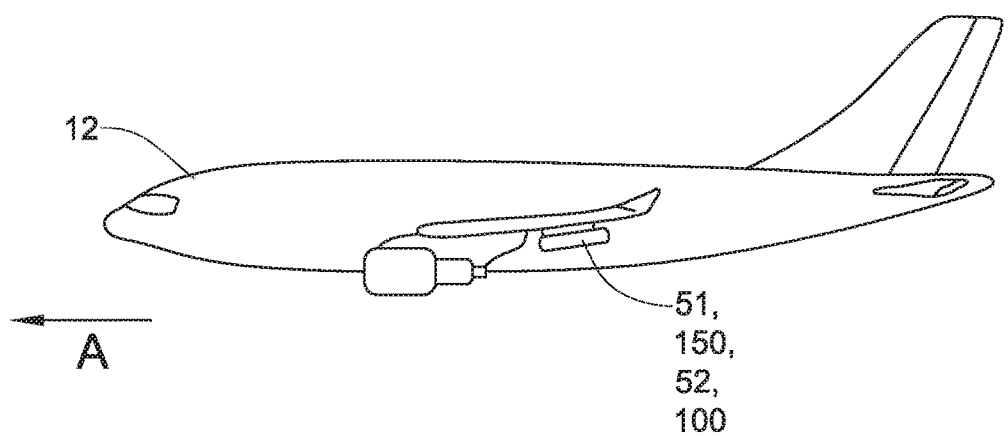
FIGS. 5a to 5c illustrate a generalized example scenario of maneuver of a refueling device, in accordance with certain embodiments of the presently disclosed subject matter.
Figure 5B:
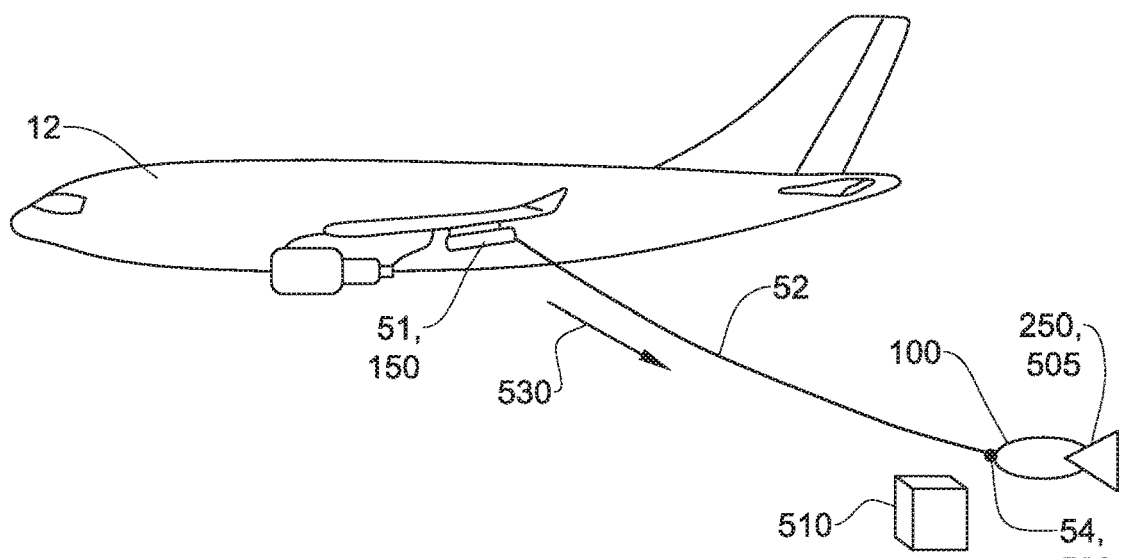

Turning now to FIG. 5, there is illustrated an example scenario for deploying a hose with boomless fueling, in accordance with certain embodiments of the presently disclosed subject matter. In FIG. 5a, the tanker aircraft 12 is flying in the direction A. In this illustration, the example embodiment is a pod 51 attached under the wing. In the pod is stored a component 150. The hose 52 is rolled up, and the hose and the refueling device 100 are stored in or adjacent to the component. The refueling operation has not yet begun. Turning to FIG. 5b, in this example it has been decided to begin a refueling operation such as described in general with respect to FIGS. 1a and 1b. In the embodiment shown in FIG. 5b, the component 150 has been instructed to change to full trail mode. The component may release the hose 52 to its "full trail", so that it extends (530) e.g. along a fore and aft axis with respect to the tanker aircraft 12, aft of the tanker. The maneuvering and steering control module 373 may, during this deployment, control the refueling device 100 so that its attitude (e.g. pitch, yaw, and/or roll) may be that defined as the initial trail position of the device. When deployment of the hose ends, that is the hose has been deployed so that it is at its deployment length, the aft end 54 of the hose may be at a point in space 520, at a particular spatial disposition relative to the tanker aircraft. This point may be called in some embodiments the "full trail point" or "initial trail point". The refueling device 100 may be attached to the hose at aft end 54. Also shown is a virtual or imaginary volume of space 510, located in a particular disposition with respect to the tanker, known in some embodiments as a refueling volume. In some embodiments the refueling volume 510 plays a role in the fueling process, as further detailed herein. In some embodiments, the movement to initial trail point may be characterized for example as described in the previously-mentioned publication WO 2013/102903 A2, for example in parts of pages 116-119. The preceding is a non-limiting example description of such movement. Note also that full-trail mode of component 150 is optional.

Figure 16A:
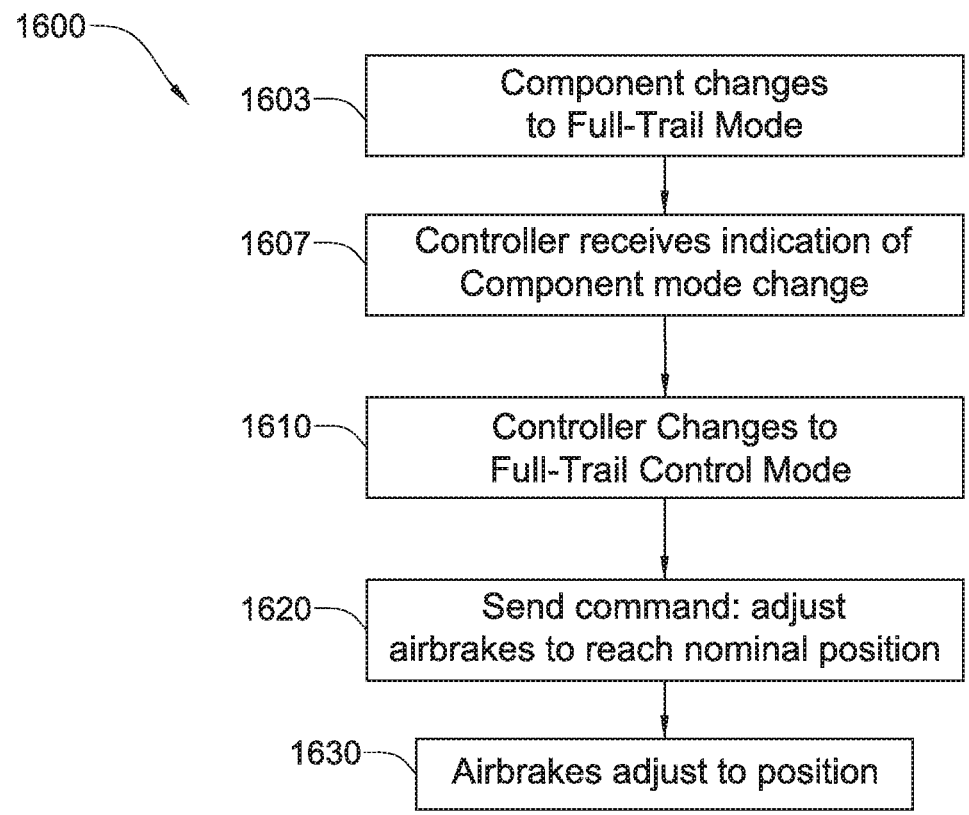
FIGS. 16a to 16b illustrate generalized flowcharts of example simplified sequences of operations carried out for maneuver of a refueling device, in accordance with certain embodiments of the presently disclosed subject matter.

Turning now to FIG. 16a, it illustrates a generalized flow chart, in accordance with certain exemplary embodiments of the presently disclosed subject matter. One possible behavior of the fueling device in the case of full trail mode is shown, as flow 1*o* chart 1600. In some embodiments, the controller 305, for example, may be configured to selectively operate in different modes of control. In response to the component 150 changing 1603 to full trail mode, the controller 305 associated with refueling device 100 receives an indication 1607 of this change to full trail mode, and itself changes 1610 to operate in a "full trail control mode" that supports HDU component full trail mode. Upon this change in controller mode, in some embodiments the controller 305, e.g. using its full-trail-mode control module 375, may send commands 1620 for adjusting the state of one or more force generating arrangements, e.g. airbrakes 250, such that when full-trail deployment is completed and the component 150 changes to its response mode, the airbrakes have reached and are in a defined state, e.g. in a "middle nominal position" 505. That is, that the airbrakes will be in a position, deflection or state, such that when the component 150 is in response mode, the airbrakes are at a nominal state so as to be able adjust in either direction (e.g. to open or close more, to increase or decrease the drag) to a sufficient degree that will enable the refueling device to maneuver to a desired position (using methods as detailed further herein with regard to FIGS. 6, 7, 8a and 8b). This middle position of the airbrakes may vary, depending on for example the speed of tanker aircraft 12. In some embodiments this middle position may be approximately 50% open. The state or position of the airbrakes during the full-trail deployment, before the deployment is completed, may be additionally adjusted to assist in controlling the rate of the deployment of the hose by the component 150. In step 1630 the airbrakes may adjust to that defined position 505.

It is noted that the teachings of the presently disclosed subject matter are not bound by the flow chart illustrated in FIG. 16a. The illustrated operations can occur out of the illustrated order. Similarly, some of the operations or steps can be integrated into a consolidated operation or can be broken down to several operations, and/or other operations may be added. It is also noted that whilst the flow chart is described with reference to system elements that realize them, such as for example controller 305, this is by no means binding, and the operations can be performed by elements other than those described herein.

Figure 5C:
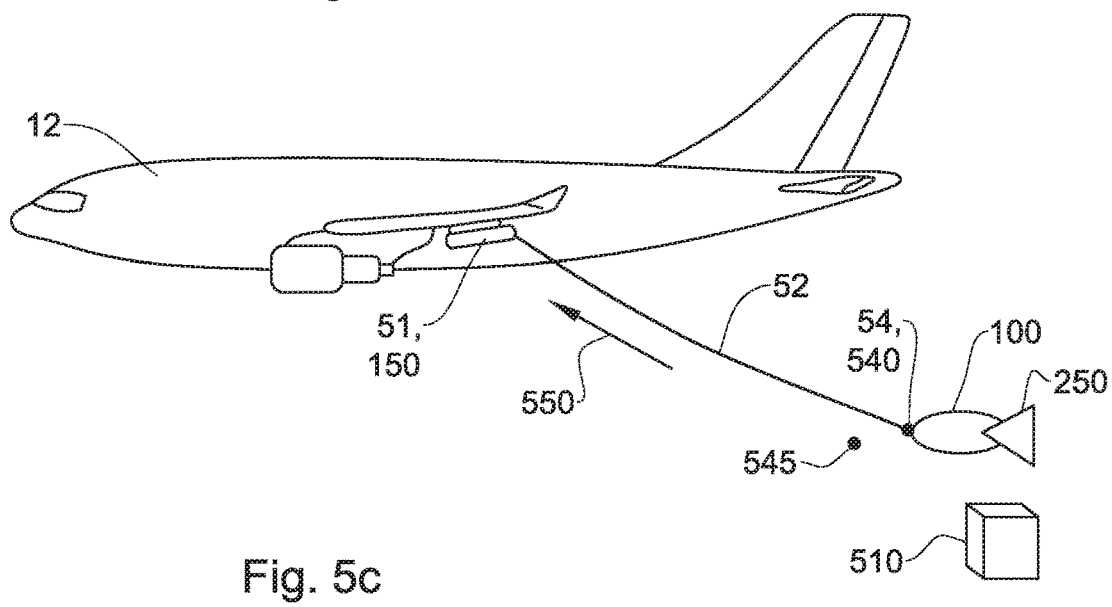

Reverting to FIG. 5c, in some embodiments, it may be desired that the refueling device 100 move forward of the full trail point 520, to arrive substantially at a position 540, relative to the position of the tanker aircraft 12, that is forward and above the refueling volume 510. This position 540 may be a distance, e.g. in the fore-and-aft axis, from the component 150, or possibly from another point on the tanker aircraft. The refueling device may wait at this initial waiting point 540, for receiver aircraft to arrive and be refueled. The value of this waiting point position may be a function of the characteristics of the refueling device 100 and of the particular type of receiver aircraft 20. The value of the initial waiting point 540, that is its position relative to that of the component 150 and the tanker aircraft 12, may be determined or obtained in various ways. As one non-limiting example, it may be a pre-defined value. As another non-limiting example, the value of the waiting point may be determined by an external data source 325, and communicated to the controller 305 using the external data interface 363. Point 540 may be referred to as an initial waiting point, since other waiting points are further detailed herein. In some embodiments, the controller 305 may obtain the data concerning this waiting point 540, in response to receiving an indication 1333 that the component 150 changed to its response mode. It should be noted that other desired positions relevant to the presently disclosed subject matter may in some embodiments be determined and signaled in a similar way. In order to move forward from full trail point 520 to initial waiting point 540, the component 150 may retract 550 the hose 52, thus moving the refueling device forward towards the tanker.

Attention is now drawn to FIGS. 6 and 7, which illustrate movement scenarios, in accordance with certain embodiments of the presently disclosed subject matter. These figures illustrate how, in some embodiments, the movement forward from, for example, a full trail point 520, to a position substantially equal to a waiting point 540, may be accomplished. In order to achieve this, in some embodiments the component 150 may automatically change to response mode operation upon or in response to an indication of reaching the full trail point 520. In some embodiments, in conjunction with this change in mode, the component 150 may determine, the reference force level that it will attempt to maintain on the hose 52 while in response mode. In some embodiments, in response to the component 150 changing to its response mode, the controller 305 associated with refueling device 100 receives an indication of this change, and itself changes to a "response control mode" that supports component 150 response mode. Controller 305, e.g. using response-mode control module 370, may in some embodiments control the maneuver methods illustrated in FIGS. 6 and 7. The initial waiting point 540 is set to constitute the desired position of the fueling device, to which it should maneuver.

Figure 6A:
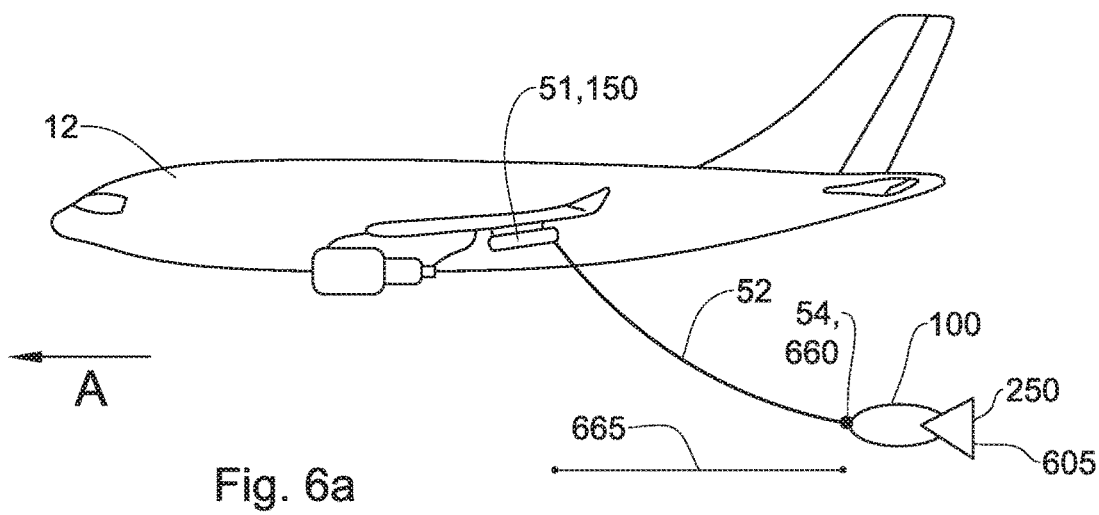
FIGS. 6a to 6c illustrate a generalized example scenario of maneuver of a refueling device movement, in accordance with certain embodiments of the presently disclosed subject matter.
Figure 6B:
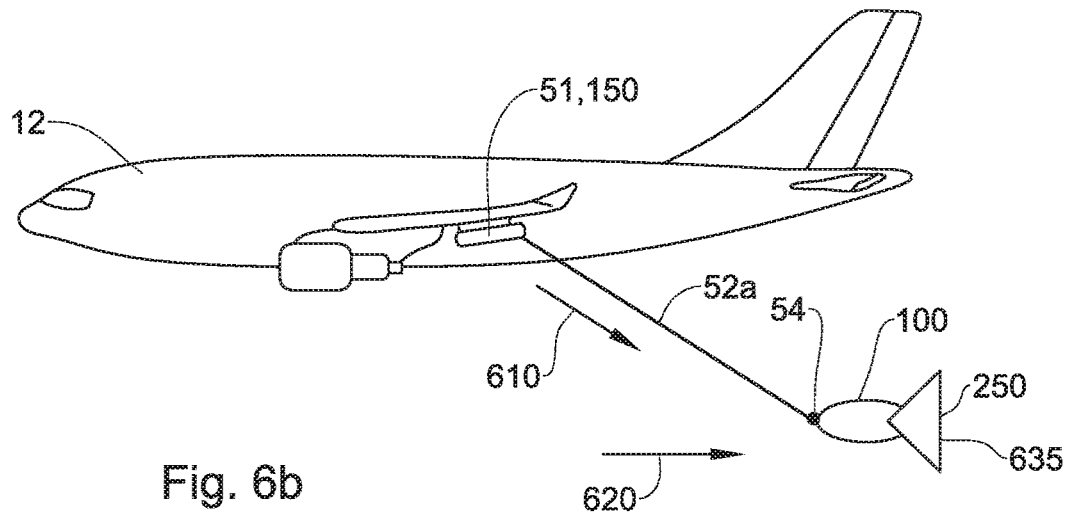

Turning to FIG. 6, they illustrate a possible method of moving the refueling device further away from the tanker, for example in the fore and aft axis, according to some exemplary embodiments of the presently disclose subject matter. Turning to FIG. 6a, at the start of the movement the refueling device 100 is positioned such that the aft end 54 of the hose is located at point 660, at a particular position relative to the tanker 12. The distance from point 660 to the component is shown as 665. In some embodiments, one or more of the position sensors may be able to measure or determine the position 600 of refueling device 100 relative to the tanker aircraft 12 or to component 150. The hose 52 has some slack. The airbrake 250 is open to a certain extent 605. The current position 660 may be nearer to the component 150, in the fore and aft axis, than is the desired position, in this case the initial waiting point 540. Turning to FIG. 6b, the controller 305 may have sent commands for adjusting, for example, the airbrake actuators 330 to adjust airbrakes 250 to a more open deflection or position 635. This is an example of sending a command for adjusting the state of one or more force generating arrangements that are attached to the refueling device. This opening of the airbrakes may cause an increase in the drag force 620 imposed on refueling device 100, which may induce an increase on the tension force applied by the refueling device 100 on the hose 52a. For purposes of illustration, hose 52a is shown in FIG. 6b as having only a small amount of slack, because of the increased tension.

Figure 6C:
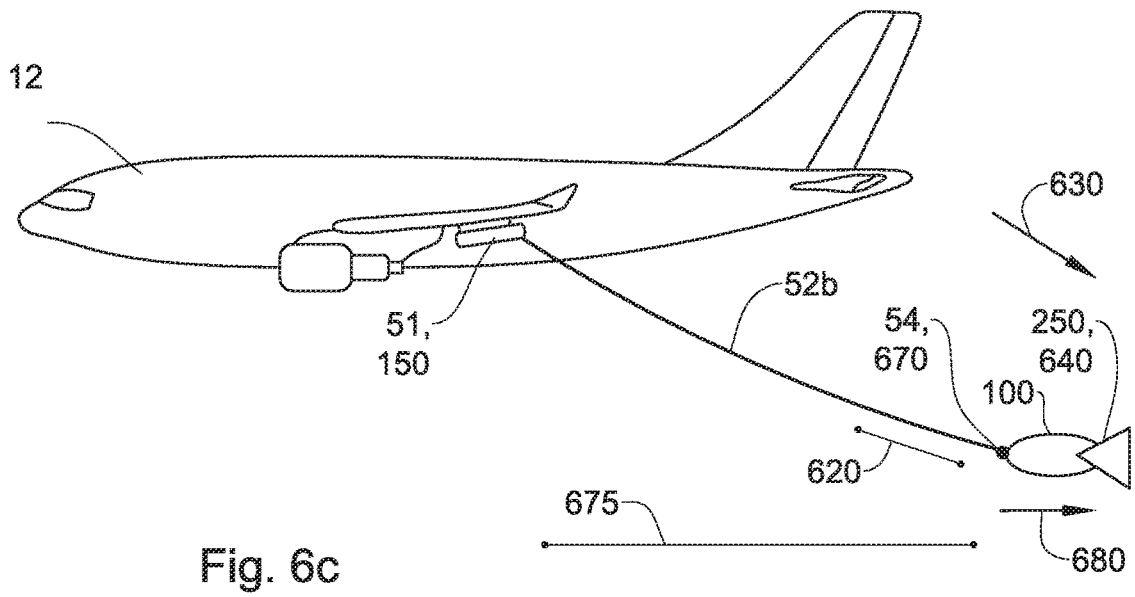

Because component 150 is in response mode, in some embodiments it may be configured to attempt to maintain a reference level of tension force on the hose 52a. As the tension increases, in some embodiments the component detects this increase in a known per se manner and responds by feeding out 610 more hose, that is extending the hose 52a. This may increase the slack in the hose and thus decrease the tension, so as to restore the reference level of tension, and maintain the reference force on the hose. Turning to FIG. 6c, a possible end result of this action is illustrated. The hose 52b has been extended. Its length is greater than that of the hose in state 52a, by an amount 620. The aft end 54 of the hose is now at a point 670, which is further from the component 150 than was point 660. The distance from point 670 to the component is shown as 675. The refueling device 100 has thus moved further away 630 from the HDU component and from the HDU component's connection to the tanker aircraft 12. Refueling device 100 has moved aft from the tanker in the fore and aft axis. The distance between the refueling device and the aircraft has been increased. As the refueling device 100 has approached point 670, the controller 305 has commanded the adjustment of airbrakes 250 to be in a less open position 640, the drag force on the refueling device has been reduced 680, and the tension on hose 52*b* has thus been reduced to be substantially at the reference level. The component 150 at this stage thus may have no need to further extend the hose 52*b*. In some embodiments, the control system takes advantage of the component's 150 response feature to move the refueling device 100 further aft, away from the component.

Figure 7A:
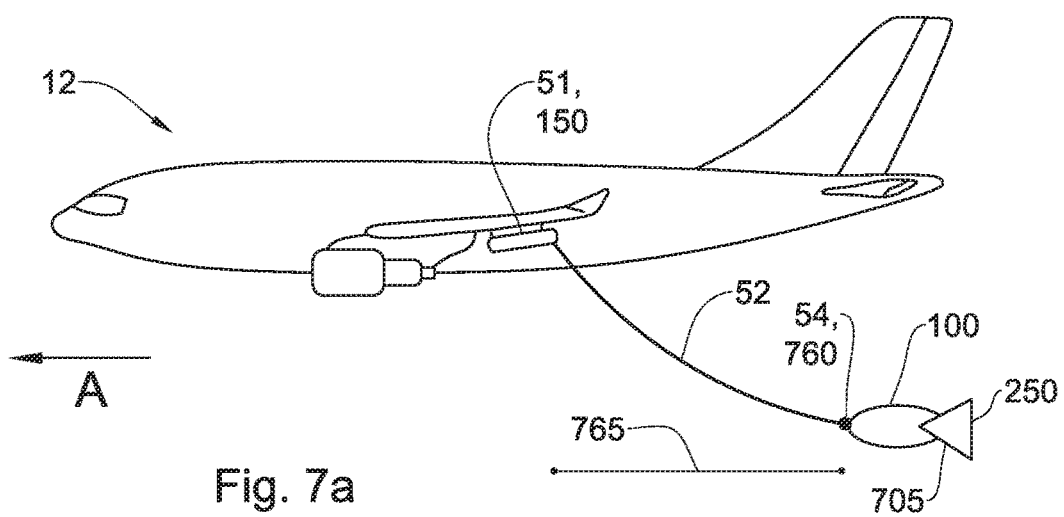
FIGS. 7a to 7c illustrate a generalized example scenario of maneuver of a refueling device, in accordance with certain embodiments of the presently disclosed subject matter.
Figure 7B:
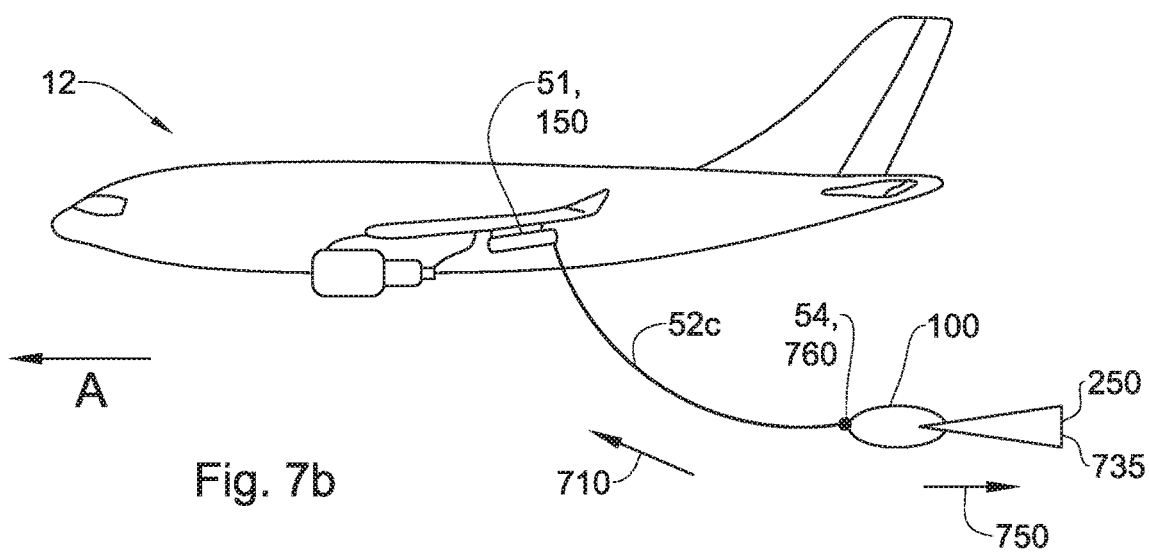

Turning to FIG. 7, they illustrate a possible method of moving the refueling device closer to the tanker, for example fore and aft, according to some exemplary embodiments of the presently disclosed subject matter. Turning to FIG. 7*a*, at the start of the movement the refueling device 100 is positioned such that the aft end 54 of the hose 52 is located at point 760, at a particular position relative to the tanker 12. The distance from point 760 to the component is shown as 765. The hose 52 may have some slack. The airbrake 250 is open to a certain extent 705. The current position 760 may be further from the component 150, in the fore and aft axis, than is the desired position, in this case the waiting point 540. Turning to FIG. 7*b*, the controller 305 may have sent or issued commands for adjusting the airbrake actuators 330 to adjust airbrakes 250 to a more closed position 735. This is an example of sending a command for adjusting the state of one or more force generating arrangements that are attached to the refueling device. This closing movement of the airbrakes may cause a decrease in the drag force 750 imposed on refueling device 100, which may induce a decrease on the tension force applied by the refueling device on the hose. For purposes of illustration, hose 52*c* is shown in FIG. 7*b* as having an increased amount of slack, because of the decreased tension.

Figure 7C:
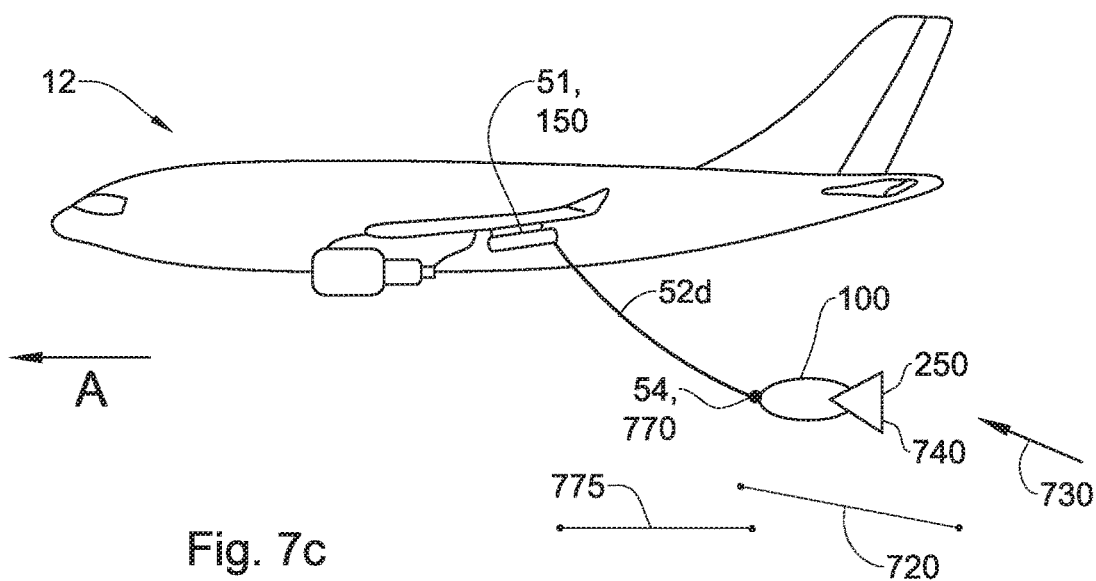

Because the component 150 is in response mode, in some embodiments it may be configured to attempt to maintain a reference level of tension force on the hose 52*c*. As the tension decreases, in some embodiments the component 150 detects this decrease in a known per se manner and responds by pulling in the hose to some degree, that is retracting 710 the hose 52*c*. This may decrease the slack in the hose and thus increase the tension, so as to restore the reference level of tension, and maintain the reference force on the hose. Turning to FIG. 7*c*, a possible end result of this action is illustrated. The hose 52*d* has been retracted. Its length is shorter than that of the hose in state 52*c*, by an amount 720. The aft end 54 of the hose is now at a point 770, which is closer to the component 150 than was point 760. The distance from point 770 to the component is shown as 775. The refueling device 100 has thus moved 730 to be closer to the component and to the component's connection to the tanker aircraft 12. Refueling device has moved forward towards the tanker in the longitudinal/axial (fore and aft) axis. The distance between the refueling device and the aircraft has been decreased. As the refueling device has approached point 770, the controller 305 has commanded the adjustment of airbrakes 250 to be in a more open position 740, and the tension on hose 52*d* has thus been increased to be substantially at the reference level. The component 150 at this stage thus may have no need to further extend the hose 52*d*. In some embodiments, the control system takes advantage of the component's 150 response feature to move the refueling device 100 further forward, closer to the component 150.

In some embodiments, the actions and movements illustrated in FIGS. 6 and 7 may be referred to, in a general sense, as control of fueling device maneuver while the component 150 is in response mode. Reverting again to FIG. 5*c*, it can be seen that one sample embodiment of a method has been disclosed for moving the refueling device 100 forward 550 to a waiting point 540. Using the methods illustrated in FIG. 7 and FIG. 6, the controller may send commands for adjusting airbrakes 250, attached to refueling device 100, to a more open and/or closed position as needed, so as to change (for example, increase or decrease) the force imposed on refueling device 100, which may induce a change (for example, increase or decrease) in the tension force applied by the refueling device 100 on the hose, thereby causing the aircraft component to detect the changed force on the hose, and to possibly change the length of the hose (for example, extend or retract it) so as to maintain a reference force on the hose, thereby changing (for example, increasing or decreasing) the distance between the refueling device and the aircraft. An end result is to maneuver the aft end 54 of the hose (and thus the refueling device 100) backward or forward to reach the desired initial waiting point 540. To the extent that the refueling device 100 has not yet reached point 540, but was aft of it, the methods of FIG. 7 cause the hose to retract and the fueling device to move closer to the HDU component. To the extent that the refueling device 100 "over-shoots" waiting point 540, and moves forward of that point in the direction of the component, the methods of FIG. 6 cause the hose to extend and the fueling device to move away from the component 150, and aft in the direction of point 540. Thus in this example embodiment the controller 305 alternately induces retraction and extension of the hose, as needed, by means of adjusting the airbrakes, so as to finally reach initial waiting point 540. Note that this control of maneuver back and forth may be performed using the existing functionality of component 150. The presently disclosed subject matter is not limited to the implementation of component 150 described in FIGS. 6 and 7.

FIGS. 6 and 7 describe an example method of obtaining desired and current positions, determining, based on at least these positions, whether to extend or to retract the hose, and sending a command for adjustment of the airbrakes so as to change the force on the refueling device and thus on the hose, thereby causing the component 150 to detect the change in the force on the hose, and to change the length of the hose 52, so as to maintain the reference force on the hose, and thereby changing the distance between the refueling device and the aircraft. These steps may be performed repeatedly, possibly in a continuous fashion, until the difference between the current position and the desired position of said refueling device is within, e.g. the absolute value of the deviation is at or below, a defined threshold. More details concerning such thresholds is provided further herein regarding FIG. 8*a*.

Note that in some embodiments, the adjusting of airbrakes 250, as described for example with respect to FIGS. 6 and 7, so as to alternately induce retraction and extension of hose 52 may be continuously performed, even after reaching a desired position such as (for example) initial waiting point 540, or even after reaching a point sufficiently close to point 540 to be considered an appropriate waiting point. This continuation of the control of the fore and aft movement by, for example, controller 305, perhaps using its response-mode control module 370, may be performed, for example, to maintain the position of the refueling device 100 at the initial waiting point 540. A need to continually maintain the position of refueling device at point 540 may arise, for example, among other possible reasons, due to wind gusts that might blow the refueling device away from point 540 after the refueling device had already reached that point. Another non-limiting example reason might be maneuvers performed by the tanker 12 that cause the tension on the hose 52 to change, thus causing the component 150 to respond by changing the length of the hose, and thus changing the relative position of hose aft end 54 to no longer be at the desired initial waiting point 540. Other reasons may exist to continue to maintain the position. In at least this sense, the processes described with reference to FIGS. 6 and 7 may in some embodiments be seen as providing continuous control of movement or maneuver, for example along the fore and aft axis. The illustration in FIG. 5c of movement of the refueling device 100 to a single defined waiting point 540, is only one case of moving to a waiting point. If the mission requires moving from the full train point 520, using for example response-mode control module 370, to a set of more than one waiting point, e.g. a sequential series of waiting points, the methods of FIGS. 6 and 7 may be applicable to each such additional waiting point. Similarly, if during maneuver from point 520 to the waiting point 540 (or alternatively to any one of a set of waiting points), a determination is made (one or more times) that a different position 545 should serve as the waiting point, the methods of FIGS. 6 and 7 may be applicable, with the simple addition of updating the desired waiting point (one or more times on a selective basis as needed) during the process, to have that value of that changed waiting point 545. Similarly, if the refueling device 100 substantially reaches the desired waiting point 540, and, after that, for example, it is determined that the waiting point should be changed to e.g. position 545, the methods of FIGS. 6 and 7 may be applicable, with desired position changed, such that the newly determined waiting point 545 serves as the desired new position of the refueling device. In all of the above example cases, the new value 545 of the waiting point constitutes the new value of desired position of the refueling device. Such a determination of different or updated or additional or newly determined position of the waiting point could be made, in response to an indication of a change in the waiting point parameter. Other reasons may exist to contain to move to a new desired position. In at least all of the above situations, the updated, additional or newly determined waiting point may be referred to in some cases as a changed or updated waiting point.

The foregoing discussions, with respect to at least the movement of other control surfaces, continuous adjustment of airbrakes to maintain a desired position, movement to a set of points, and updating of a fueling device's desired position during maneuver in response to an indication of a change in the value of the desired position, so that the changed value of the desired position constitutes the desired position of the fueling device, have been described for purposes of exposition with regard to initial waiting point 540. However, these same techniques and concerns may in some cases be applicable also to other waiting points, and to other desired positions, further detailed herein.

FIG. 5c describes an example embodiment of a method of, in response to an indication that component 150 changed to a response mode (whereby the component is configured to maintain the reference force on the hose), obtaining at least one waiting point position at which the refueling device 100 will await arrival of at least one receiver aircraft, and, with respect to each one of these waiting point positions, setting the waiting point position to constitute the desired position of the refueling device, and performing the methods described e.g. with regard to FIGS. 6 and 7 in respect of the waiting point position, and in case of an indication of an update in the waiting point position performing those methods in respect of the updated waiting point position.

It should be noted that during the motion described in FIG. 5, in certain embodiments various adjustable control surfaces 220A, 220B, and/or 220C may have also been adjusted, by means of their actuators 333, so as to control the motion and disposition in axes other than the longitudinal or fore and aft axis, so as to prevent sideslip, roll, patch or yaw. The commands to perform these adjustments may be performed for example by alignment commands sent by the maneuvering and steering control module 373, and may have been determined based on information provided by the data acquisition system. These adjustments may be performed, as well, during maneuver to other desired positions, further detailed herein.

FIGS. 6 and 7 describe one aspect of the presently disclosed subject matter in an informative manner only, by way of non-limiting example, for clarity of explanation only. It will be understood that that the teachings of the presently disclosed subject matter are not bound by what is described with reference to FIGS. 6 and 7.

Figure 8A:
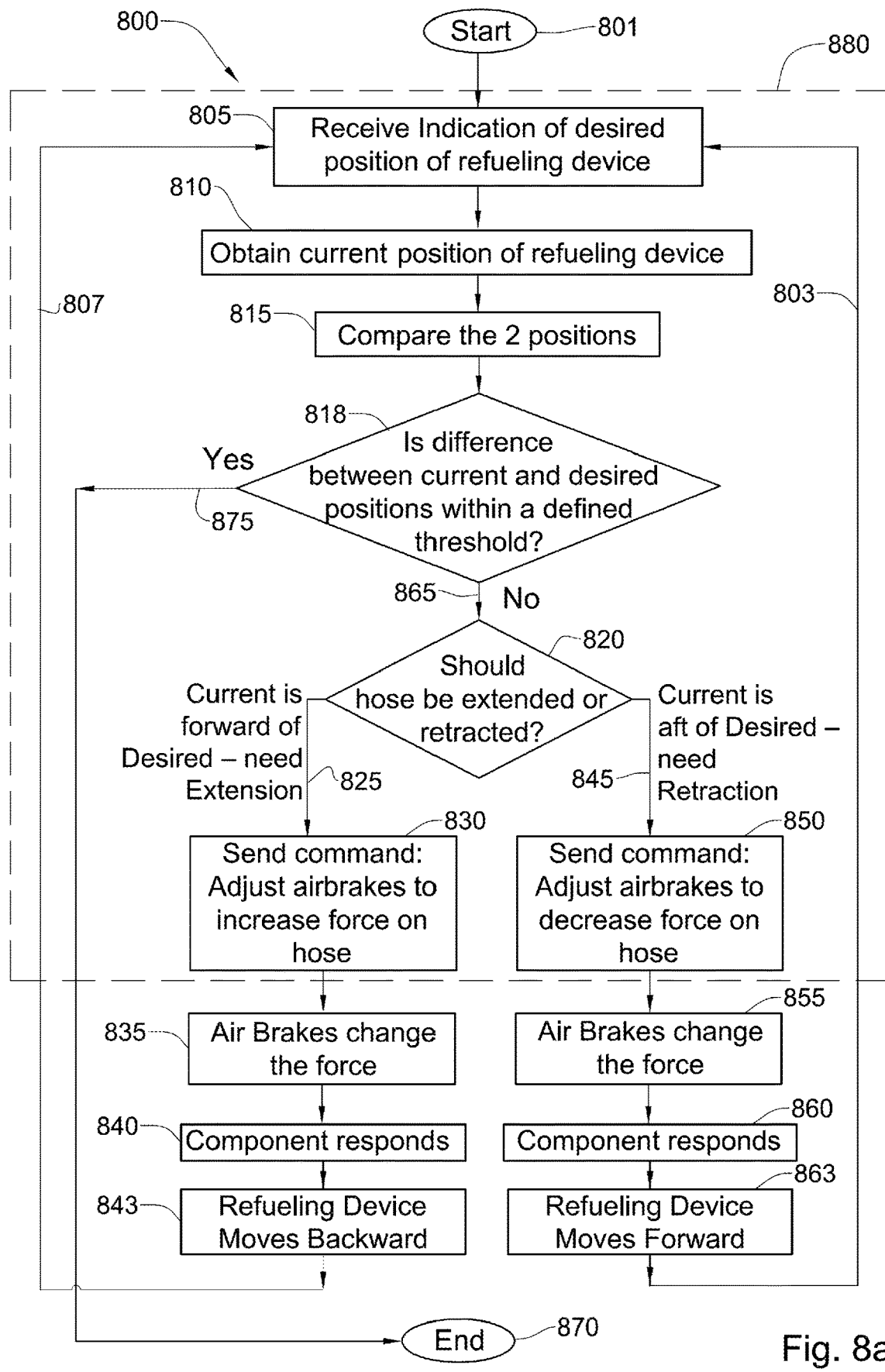
FIG. 8a illustrates a flowchart of an example generalized sequence of operations carried out for maneuvering a refueling device to a desired position, in accordance with certain embodiments of the presently disclosed subject matter.

Turning to FIG. 8a, there is illustrated one example of a generalized flow chart diagram of control of fueling device movement while the HDU component is in response mode, in accordance with certain embodiments of the presently disclosed subject matter. In some embodiments, the flow presented accomplishes the actions and movements of a refueling device that is attached by means of a non-rigid hose to a component of an aircraft, as illustrated in FIGS. 6 and 7. In some embodiments, one or more steps of FIG. 8a may be performed automatically. The flow and functions illustrated in FIG. 8a may for example be implemented in processing circuitry 350, and may make use of modules described with regard to FIG. 3b.

The flow starts at 801. In step 805, the response-mode control module 370 may obtain, or receive an indication of, the desired position of the refueling device. The desired position may be referred interchangeably herein also as required position, commanded position, desired spatial disposition, destination or desired location. It may set that obtained or determined position to be the value of a parameter "desired position". In the example case of the movement already described in FIG. 5, this may be substantially the same as a waiting point position such as initial waiting point position 540. As further detailed herein, various other categories of desired positions may exist. Non-limiting examples of other desired positions, to which the method illustrated in the flow of FIG. 8a may attempt to maneuver, include: updated waiting point positions (including updated initial waiting point position), position of a receptacle located on a receiver aircraft, updated position of the receptacle, safe disengagement position, updated safe disengagement position, post-disengagement position, updated post-disengagement position, and final waiting point position. In some embodiments the indication of desired position may be determined autonomously by controller 305, while in others it may be communicated from external data source 325 via external data interface 363.

In step 810, the response-mode control module 370 may obtain, or receive an indication of, the current position of the fueling device. This may in some embodiments be provided by the position sensors 320, via the sensor control module 360, or again may be communicated from an external data source.

In step 815, response-mode control module 370 may compare the desired position and the current actual position, and determines the nature of the deviation between the two. In step 818 the result of step 815 may be evaluated by response-mode control module 370, to check against the following criterion: to determine whether the difference between the current position and the desired position of said refueling device is within a defined threshold, e.g. that the absolute value of the difference is at or less than the threshold, that is whether or not the refueling device has substantially reached the desired position or destination.

The response-mode control module 370 may of course be configured to have a tolerance value for the deviation, such that if the deviation is within the defined threshold or tolerance range of acceptable variation or deviation, the current and desired positions of the refueling device may be considered to be substantially the same, and the determination at step 818 may be "Yes" 875. The value of this tolerance or threshold may be application specific, possibly dictated by the design of the various mechanical systems, and may be a requirement that serves as an input to control system design. This tolerance value may be different for different stages of motion occurring during the refueling process, that is for different categories of desired positions, at least some of which are detailed herein. As one example, the tolerance for the criterion of "reaching a waiting position" may be larger than that required to enable engagement between the nozzle of the refueling device and the receptacle on the receiver aircraft (discussed further herein with regard to FIG. 9). Similarly, the tolerance required for engagement may in turn be dependent on the geometry and size of the particular receptacle, and thus may e.g. be a function of the model or type of the particular receiver aircraft and receptacle, and of the particular nozzle. In turn, the tolerance requirements may for example drive the choice of position sensors to be used in an embodiment, in that a more accurate (though possibly more costly) sensor may be required to enable achieving a lower threshold in the difference between desired and current position, and a cost versus accuracy tradeoff decision would be part of the design. Thus the threshold used for control of maneuver to each category of desired position, may be determined by the person skilled in the art on a case by case basis using methods known in the art. In some embodiments, one or more of the threshold values may be predefined, and may for example be stored in data store 310. In some embodiments, one or more of the threshold or tolerance values may be updated during the maneuver to the desired position. In some non-limiting example embodiments, the tolerance or threshold for reaching a waiting point may be plus/minus ½ (half) meter. In some non-limiting example embodiments, the tolerance or threshold for reaching the receptacle of the receiver aircraft may be plus/minus 5 centimeters. In some non-limiting example embodiments, the threshold may be zero.

In response to the determination at step 818 being Yes, that the criterion was met, flow arrows 875, the procedure discussed in the flow diagram FIG. 8a may be considered to have ended, at step 870.

In some embodiments, the criterion of "the difference between the current position and the desired position of said refueling device is within a defined threshold" may not mean that an instantaneous arrival at the desired position is sufficient, but rather that the fueling device has remained in a position located within the defined tolerance of the desired position for a substantial time interval. This time interval may be as a defined number of seconds or minutes, as relevant to the particular application and the nature of the particular desired spatial disposition which flow 800 is attempting to reach. The selection of the time interval may be determined by the person skilled in the art on a case by case basis using methods known in the art. For other types of desired positions, the refueling device 100 may for example be expected to wait at the destination for occurrence of an event (e.g. arrival of a receiver aircraft 20), and to continuously control and adjust the airbrakes so as maintain that position until the event occurs. In such a case, the looping process as shown in flow 800 may continue until the event occurs.

Similarly, if during maneuver to a desired position point (e.g. waiting point 540 as a non-limiting example), or alternatively to any one of a set of desired positions, a determination is made (one or more times) that a new or changed position (e.g. updated waiting point 545 as a non-limiting example) should serve as the desired position, the methods of FIGS. 6 and 7 and 8a may be applicable, with the simple addition of updating the desired position (one or more times on a selective basis as needed) during the process, to have the value of that new desired position. The changed new value of the desired position constitutes the desired position of the refueling device 100. The updated desired position may be referred to in some cases as a changed desired position.

In response to the determination in step 818 being No, that the criterion was not met, that the difference between the current position and the desired position of said refueling device is not within a defined threshold, then the flow continues 865 to decision 820. A determination may be made by response-mode control module 370, based on at least the current position and the desired position of the fueling device, whether to extend or retract the hose 52. This may be achieved, for example, by comparing the current actual position of the refueling device 100 and the desired position, and determining whether the current position is forward or aft of the desired position.

In response to a determination that the refueling device requires extension, i.e. that the current position is forward of the desired position, flow 825, then steps may be taken to release/extend the hose. In response to a determination that the refueling device requires retraction (flow 845, discussed further on), then steps may be taken to retract the hose.

Returning to step 825, in some embodiments response-mode control module 370 may in step 830 send or issue commands for adjusting airbrakes actuators 330 to adjust the one or more airbrakes 250 so as to increase drag on the refueling device and thus increase the tension force on hose 52. This command may in some embodiments be sent via the actuators interface module 365.

In step 835 the actuators may cause the airbrakes to change the force on the refueling device, and thus on the hose. In step 840 the component 150 may detect the increase in tension force, and may react to it by beginning to release/extend the hose. This may occur because the component is in its response mode of operation, and is configured to selectively maintain a reference force on the hose. In step 843, this extension of the hose may cause the refueling device 100 to move aft or rearward or backward with respect to the position of the component 150 and of the tanker aircraft 12. This may increase the distance between the refueling device and the aircraft. In step 807, the process may begin again, looping back to step 805, in which the desired position of the fueling device is again obtained. As discussed elsewhere in the presently disclosed subject matter, in some embodiments the desired position may change for various reasons. Note that steps 830, 835, 840 and 843 may be considered an example of sending a command for adjusting the state of one or more force generating arrangements that are attached to the refueling device, so as to increase the force on the hose, thereby causing the aircraft component to detect the increased force and to extend the hose so as to maintain a reference force on the hose, thereby increasing the distance between the refueling device and the aircraft.

In response to a determination in decision step 820 that the refueling device requires retraction, i.e. that the current position of the refueling device 100 is aft of the desired position, flow 845, then steps may be taken to retract the hose. In some embodiments the response-mode control module 370 may in step 850 send or issue commands for adjusting airbrakes actuators 330 to adjust the one or more airbrakes 250 so as to decrease drag on the refueling device and thus decrease the tension force on hose 52. This command may in some embodiments be sent via the actuators interface module 365.

In step 855 the actuators may cause the airbrakes to change the force on the refueling device, and thus on the hose. In step 860 the HDU component 150 may detect the decrease in tension force, and may react to it by beginning to retract the hose. This may occur because the component is in its response mode of operation, and is configured to selectively maintain a reference force on the hose. In step 863, this retraction of the hose may cause the refueling device 100 to move forward with respect to the position of the component 150 and of the tanker aircraft 12. This may decrease the distance between the refueling device and the aircraft. In step 803, the process may begin again, looping back to step 805, in which the desired position of the fueling device is again obtained. Note that steps 850, 855, 860, and 863 may be considered an example of sending a command for adjusting the state of one or more force generating arrangements that are attached to the refueling device, so as to decrease the force on the hose, thereby causing the aircraft component to detect the decreased force and to retract the hose so as to maintain a reference force on the hose, thereby decreasing the distance between the refueling device and the aircraft.

The looping back of the process 807, and 803, may thus continue repeatedly, and perform the steps shown repeatedly, continually changing the force on the hose and thus changing the distance between the refueling device and the aircraft, until the difference between the current position and the desired position of said refueling device is within a defined threshold, that is the current and desired positions of the refueling device are substantially the same, and thus the refueling device may have reached its destination, at step 818, and the loop is exited in steps 875 and 870. FIG. 8a illustrates an example embodiment of obtaining a desired position and the current position of a refueling device 100, determining based on at least the desired and current positions of the refueling device whether to extend or to retract the hose, and based on the determination sending a command for adjusting the state of one or more force generating arrangements so as to change the force on the hose 52, thereby causing the component 150 to detect this change in the force on the hose and to change the length of the hose (for example, to extend or retract it), so as to maintain the reference force on the hose, and thereby either changing the distance between the refueling device and the aircraft (for example, increasing or decreasing it), and performing this repeatedly until the difference between the current position and the desired position of said refueling device is within a defined threshold.

It should also be noted that, while in some embodiments the component 150 may attempt to maintain a substantially constant reference force, in some embodiments the response-mode control module 370, may successfully control position of the refueling device even if e.g. the component 150 is maintaining the reference force with a large tolerance, such that the force cannot be considered substantially constant. The flow detailed in FIG. 8a (and similarly with regard to FIG. 8b, detailed further herein), may adjust the airbrakes position or deflection in a continuous manner, so as to bring the current position and desired position to within a defined threshold or tolerance of each other, and thus may compensate for inaccuracies or fluctuations in the reference force being maintained by the component 150.

Note also that FIG. 8a shows dashed-line rectangle 880, which denotes those steps in the above flow which in some embodiments are performed internal to controller 305, for example within processing circuitry 350. The steps that are not within this rectangle, e.g. 835, 840, 843, 855, 860, 863, might not occur within the controller, but indicate reactions to the actions performed by the actuators 330 and airbrakes 250, the component 150, and/or the refueling device 100.

It should also be noted that, merely for purposes of a simple exposition, FIG. 8a illustrates one example of a control process, one which begins with a step 801, "start", and which terminates with a step 870, "end". In some embodiments, there may not in fact be a clear-cut end point 870 to the process. For example, as has been explained elsewhere in the current subject matter, in some embodiments the controller 305 may not end its function upon arriving at the desired position, but instead may function to continuously maintain the desired position once it is reached. Similarly, in some embodiments it may be that upon reaching a desired position, indication of a changed or updated desired position may be received, and thus the controller may at that point in time function to enable movement of the refueling device 100 to the newly indicated desired position, e.g. for reasons mentioned earlier in the presently disclosed subject matter. Similarly, in some embodiments it may be that the controller 305 was given a set of more than one desired positions to reach, possibly as a function of time, and thus upon reaching a desired position, the controller may then function to enable movement of the refueling device 100 to another desired position. Some example reasons were presented with regard to FIGS. 6 and 7. In some embodiments, for reasons similar to those presented regarding ending step 870, there may not in fact be a clear-cut start point 801 to the process.

It should also be noted that extension or retraction of the hose, in response to increased forces induced as a result of adjusting e.g. the airbrakes 250, may in some cases have the effect of also causing a movement of the hose end, and of the refueling device, in axes other than that of the tanker aircraft 12 flight, e.g. vertically and/or in an axis transverse to the flight (left and right). The refueling device may additionally comprise control systems that control movement along those other axes, and such control systems may deal with these effects using known per se techniques.

The logic shown in the FIG. 8a could for example be implemented as software and/or firmware in a computer, as hardware, or as any combination thereof, executed on a suitable device or devices, that perform the functions as defined and explained herein, whether located on the fueling device, on the tanker, on a receiver aircraft, on a separate airborne/seaborne or land-located system, split among any of them, or various other configurations.

Note also that the step-by-step of the flow logic in FIG. 8*a* is presented merely to provide a simple exposition of one possible process. It is noted that the teachings of the presently disclosed subject matter are not bound by the flow chart illustrated in FIG. 8*a*. The illustrated operations can occur out of the illustrated order. For example, operations 805 and 810 shown in succession can be executed substantially concurrently, or in the reverse order. Similarly, some of the operations or steps can be integrated into a consolidated operation (e.g. steps 840 and 860), or can be broken down to several operations, and/or other operations may be added. Another example of this is that the flow chart shows two decisions or determinations 818 and 820 serially, preceded by a comparison step 815, merely for ease of exposition. In some embodiments, for example, the comparison and the decision points could be combined, that is one question could be asked, with multiple possible answers including for example: current is forward of desired and extension is required, current is substantially equal to desired, current is aft of desired and retraction is required. It is also noted that whilst the flow chart is described with reference to system elements that realize them, such as for example modules of processing circuitry 350, this is by no means binding, and the operations can be performed by elements other than those described herein.

Figure 8B:
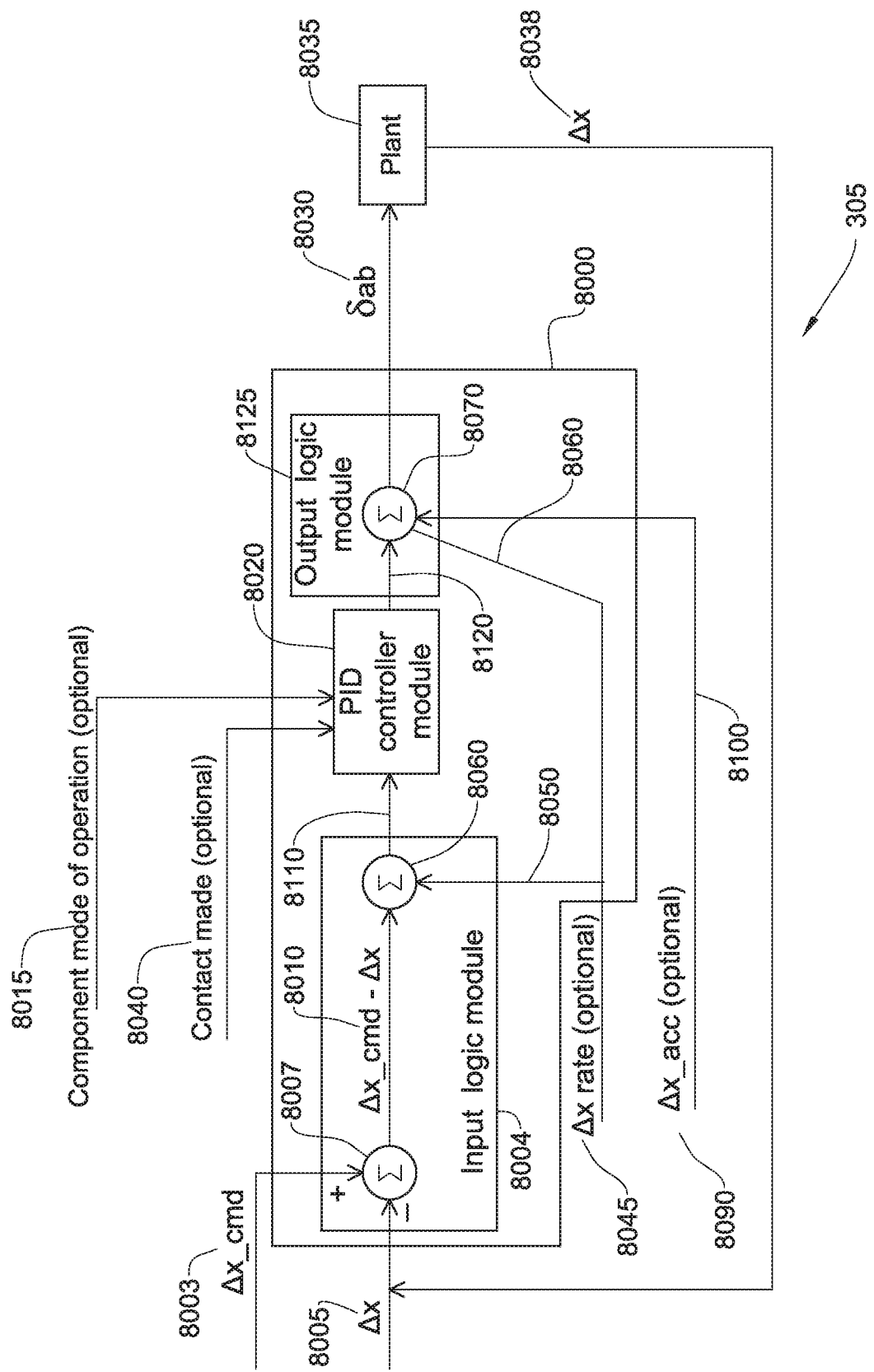
FIG. 8b schematically illustrates generalized processing circuitry configured for controlling maneuver of a refueling device to a desired position, in accordance with certain exemplary embodiments of the presently disclosed subject matter.

Attention is now drawn to FIG. 8*b*, which illustrates a possible implementation of a controller using a Proportional Integral Derivative (PID) controller, in accordance with certain exemplary embodiments of the presently disclosed subject matter. FIG. 8*b* describes one example embodiment of controller 305. In some embodiments, the controller implementation described herein may accomplish the actions and movements illustrated in FIGS. 6 and 7. Note that the gain for the derivative may be set to zero. Note that in other example implementations, control logic may be implemented using a Proportional Integral (PI) controller. Note that the concepts of PID controller and P controller per se are known in the art. For simplicity of exposition, the description below is written with reference to a PID controller, and can apply, mutatis mutandis, to a PI controller as well.

Controller 305 may, in some non-limiting examples, comprise PID controller processing circuitry 8000. PID controller processing circuitry 8000 may comprise a processor and memory (not shown). PID controller processing circuitry 8000 may, in some examples, comprise input logic module 8004, PID controller module 8020, and output logic module 8125. 8000 may in some non-limiting examples be a computer specially constructed for the desired purposes.

Delta-x-command (shown in the figure as delta-x-cmd 8003) may refer to the obtained desired position of the refueling device 100 relative to the tanker aircraft 12, and in some embodiments may be analogous to the output of step 805. As indicated already, this information may in some embodiments be obtained input logic module 8004 from the external data sources 325. In other embodiments (not illustrated in the figure), the determination of the desired position may occur internal to input logic module 8004. In some embodiments, the value of delta-x command may change as the desired position is updated and is input to input logic module 8004. One non-limiting example is when an updated waiting point is determined. Other examples are similar to the situations described with regard to FIGS. 6 and 7, and FIG. 8*a*. Thus 8003 may be an example embodiment of obtaining the desired position of the refueling device.

Non-limiting examples of desired positions that may constitute the desired position Delta-x-command 8003, to which the method illustrated in the flow of FIG. 8*b* may attempt to maneuver, include, as non-limiting examples: waiting point positions such as initial waiting point position, updated waiting point positions (including updated initial waiting point position), position of a receptacle located on a receiver aircraft, updated position of the receptacle, safe disengagement position, updated safe disengagement position, post-disengagement position, updated post-disengagement position, and final waiting point position.

Delta-x 8005 may refer to the obtained current position of the refueling device 100 relative to the tanker aircraft 12 or component 150, obtained by input logic module 8004, and in some embodiments may be analogous to the output of step 810. 8005 is an example embodiment of obtaining the current position of the refueling device.

Subtracting 8007 these two parameters gives 8010, the difference between delta-x-command and delta-x. This difference may be, for example, calculated or measured by input logic module 8004, or may be obtained from other components of the control system 300. The input of this difference into the PID controller module 8020 is shown as 8110. 8007, 8010, 8110 may function as an example embodiment of determining whether or not the difference between the current position and the desired position of the refueling device is within (e.g. the absolute value of the deviation is at or below) a defined threshold, that is the current position and the desired position of the refueling device are substantially the same, and thus whether or not there is a need to continue adjusting airbrakes. In some embodiments, they may be analogous to steps 815, 818 of FIG. 8*a*. 8007, 8010 and 8110 may also be an example embodiment of determining, based on at least the current position and the desired position of the refueling device, whether to extend or to retract the hose. In some embodiments, they may be analogous to steps 820, 825, 845 of FIG. 8*a*.

PID controller module 8020 may process this input 8110, provided for example by input logic module 8004, to determine whether to extend or retract or the hose, and to determine or calculate the value of the desired deflection or adjustment of the airbrakes 250. This may sent as output 8120 to output logic module 8125. Output logic module 8125 may in some embodiments send a command delta-ab, the desired deflection 8030, to the actuators 330 to adjust the airbrakes, and in some embodiments may be analogous to steps 830 and 850 of FIG. 8*a*. 8030 may thus be an example of sending a command for adjusting the state of one or more force generating arrangements.

Plant 8035 may refer to the characteristics and dynamics of all of, or some of, the particular refueling device, actuators, airbrakes or other force generating arrangements, other control surfaces, the hose and the HDU component 150, including this component's 150 characteristic of attempting, when e.g. in its response mode, to main a reference force on the hose. The dynamics of these particular systems may drive how the plant behaves and responds to the command 8030. Note that as the airbrakes that are attached to the refueling device are adjusted, this may change the force on the refueling device (e.g. either increase or decrease it), and thus may change the force on the hose (e.g. increase or decrease it). As the component 150 may detect this change in the force, this may cause the component 150 of the tanker aircraft to extend or to retract the hose 52, so as to maintain the reference force on the hose. The result of the plant may be a movement of the refueling device 100, thereby either changing the distance between the refueling device and the aircraft (e.g. increasing or decreasing it), and thus a changed value 8038 of current position delta-x. In some embodiments, the plant 8035 may be analogous to steps 835, 840, 843, 855, 860, 863 of FIG. 8*a*.

Gain coefficients for the PID controller may be determined and tuned for each "plant". e.g. for each particular combination of types of refueling devices, hoses, HDU and similar components, tanker aircraft and receiver aircraft, using known per se control design techniques. In some embodiments, the coefficient values for each combination of systems may be stored in data store 310, and PID controller module 8020 would be provided with, and would use of, the relevant values for each refueling situation.

FIG. 8*b* also shows that the changed value of the current position 8038 functions is fed back, as the updated value of 8005 as e.g. measured by sensors, and that it is again compared 8007 to the desired position delta-command-x 8003. Thus the calculated difference 8010, in some cases performed by input logic module 8004, thus may in turn change, thus providing a changed input to PID controller module 8020. This may in turn possibly cause again an adjustment 8030 of the airbrakes. This feedback may, in some embodiments, be analogous to steps 803, 807 of FIG. 8*a*. The determination of whether to extend or retract the hose, and the resulting adjusting of the airbrakes, thus changing the force on the hose and thus changing the distance between the refueling device and the aircraft, may thus be performed repeatedly, in a continuous fashion controlled by PID Controller processing circuitry 8000. Thus, in this example the variable being controlled may be the airbrakes position, deflection or state; and the input to the PID Controller module 8020, which in turn is affected by the value of the controlled variable, may be the error in the refueling device position, for example the position of the refueling device compared to its desired position.

Note that when the criterion is met of the difference 8010 between the current position and the desired position of said refueling device being within a defined threshold, the PID controller module 8020 may at that point determine that no change in the length of the hose is required, and 8020 may thus not output 8120 a desired deflection of the airbrakes. The PID Controller processing circuitry 8000 may in some embodiments attempt to reduce the error 8010, 8110 between desired and current position towards zero. Further discussion regarding choice of threshold values is detailed herein further regarding FIG. 8*a*.

FIG. 8*b* illustrates an example embodiment of obtaining a desired position and the current position of a refueling device 100, determining based on at least the desired and current positions of the refueling device whether to extend or to retract the hose, and based on the determination sending a command for adjusting the state of one or more force generating arrangements, so as to change the force on the hose 52, thereby causing the component 150 to detect this change in the force on the hose and to either extend or retract the hose, so as to maintain the reference force on the hose, and thereby changing the distance between the refueling device and the aircraft, and performing this repeatedly until the difference between the current position and the desired position of said refueling device is within a defined threshold.

Additional parameters may optionally be input to the PID Controller processing circuitry 8000, in certain embodiments. For example, the estimated current velocity or rate of movement of refueling device 100, shown as delta-x-rate 8045, may be input. In certain embodiments, this may be input to input logic module 8004 (8050, 8060), and/or to output logic module 8125 (8060, 8070). As another example, the estimated current acceleration of refueling device 100, shown as delta-x-acc 8090, may be another optional input, instead of or in addition to delta-x-rate 8045. In certain embodiments, this may typically be input to the output logic module 8125 (8100, 8070). In some embodiments, it may be input to the input logic module 8004 (not shown). The acceleration may in some cases be obtained from one or more sensors 321, e.g. accelerometers. Alternatively, the parameters 8045, 8090 may be calculated or determined within PID controller processing circuitry 8000 based on raw data, or may be obtained from external data sources 325. The use of these velocities and/or accelerations as inputs to be considered may in some embodiments enable a more refined control, possibly reducing or preventing lag in response, and oscillations of the airbrakes. These parameters may factor into and impact the determination whether to extend or retract the hose, and/or the determination by how much to adjust the airbrakes. Note that in some embodiments, the current velocity and current acceleration may similarly be factored into the determinations made in the process described in the flow of FIG. 8*a*. e.g. in steps 815, 818, 830 and/or 850, and those determinations may be made based also on one or both of these inputs, although these factors are not shown in FIG. 8*a* for reasons of simplicity. It should also be noted that each input shown in the PID controller processing circuitry 8000 may in some embodiments be adjusted by factors and/or offsets, as is done in known per se control systems.

In some embodiments the PID controller processing circuitry 8000 may be used to control the movement of refueling device 100 also in the cases where the component is operating in full-trail or rewind mode. In such a case, there may be an additional optional input 8015 to PID controller module 8020, providing an indication of the current component winding mode 8015 (e.g. full trail, response and/or rewind). As further detailed herein, in full trail and rewind modes the controller may command the airbrakes to adjust in support of those modes. The role of the optional "contact made" indication switch 8040 is further detailed herein. This indication of engagement 8040 may in some cases change the values of the gain coefficients. In some embodiments, these optional inputs may be obtained from external data sources 325.

Each system component and module in FIG. 8*b* can be made up of any combination of software, hardware and/or firmware, executed on a suitable device or devices, that perform the functions as defined and explained herein. Equivalent and/or modified functionality, as described with respect to each system component and module, can be consolidated or divided in another manner. Thus, in some embodiments of the presently disclosed subject matter, the system may include fewer, more, modified and/or different components, modules and functions than those shown in FIG. 8*b*. One or more of these components can be centralized in one location or dispersed and distributed over more than one location. Similarly, in some cases multiple instances of a particular component may be utilized, for reasons of redundancy and availability, and in some cases the plurality of component instances can be cooperatively operated.

Thus, in some cases, controller components, such as described by example with respect to FIG. 8*b*, may be located on-board the refueling device 100, the receiver aircraft 20, the tanker aircraft 12 and/or another location, including remote locations. In some cases, the components can be distributed between the refueling device 100 and/or the receiver aircraft 20, and/or the tanker aircraft 12 and/or another location, including remote locations.

FIG. 8b describes one aspect of the presently disclosed subject matter in an informative manner only, by way of non-limiting example, for clarity of explanation only. It will be understood that that the teachings of the presently disclosed subject matter are not bound by what is described with reference to FIG. 8b. It should also be noted that, in some embodiments, PID or PI controller logic could also be used in a mechanical implementation of controller 305.

Having now described example methods and systems for controlling movement of a refueling device 100, attention is now turned to additional examples of refueling device 100 movement. Attention is drawn to FIG. 9, which illustrates a scenario of controlled maneuver of a fueling device, in accordance with certain exemplary embodiments of the presently disclosed subject matter. A refueling device 100 waits at a waiting point 540. In some embodiments the component 150 is in its response mode. A receiver aircraft 30 may have been waiting at a distance for the refueling device 100 to reach its waiting point 540, and possibly to be located stably at that position 540. The receiver aircraft may then approach 905 the tanker aircraft 12; it is shown in the figure for example as receiver aircraft 20. The receiver aircraft 20 may maneuver so as to position or place its receptacle 22 within the pre-determined virtual volume of space 510, located in a particular disposition with respect to the tanker, known in some embodiments as a refueling volume, an air refueling envelope, an engagement area, an engagement volume or an engagement region. This refueling volume may be the location in which the receiver receptacle is supposed to remain, e.g. for safety reasons, during the transfer or communication of fuel between the two aircraft. Though refueling volume 510 is shown in the figures as a cube, for purposes of illustration, it could in some examples be a sphere or other shape. In some embodiments, the refueling volume 510 may be characterized for example as described in the previously-mentioned publication WO 2013/102903 A2, for example in parts of pages 101-108.

Once the receiver aircraft arrives at the engagement area/refueling volume, and is positioned in such a way that the receptacle is stabilized within refueling volume 510, that is that an engagement area specification condition has been met, fueling operations for the particular receiver aircraft may begin. In some embodiments, it may be considered unsafe to the receiver aircraft 20, to the receiver's crew, and/or to the in-flight refueling system 50, for the refueling device 100 to approach the receiver aircraft 20 until the receptacle's disposition in the refueling volume 510 is stable. In some embodiments, a determination that such stabilization has occurred, and that such an engagement ara specification condition has been met, may, for example, be performed autonomously by the controller 305, or for example may be communicated to the controller.

In response to an indication that the receiver aircraft meets such an engagement area specification condition, a determination may now be made that the refueling device 100 should approach the receiver aircraft 20 for purposes of engagement and refueling. In some examples the controller 305 may obtain or determine the position of the receptacle 22, and set the receptacle position to constitute the desired position of the refueling device. The refueling device 100 may then begin maneuver 910 away from the waiting point 540 towards the receiver aircraft 20, making use of control surfaces 220A, 220B, and/or 220C, so as to possibly bring its fueling nozzle 236B substantially to one or more engagement enabling positions in close proximity with the fueling receptacle 22, and then possibly have the nozzle selectively engage, or connect with, or mate with, the receptacle, e.g. in response to an engagement command. In some embodiments, the engagement could be accomplished, for example, by mechanical means initiated by the receiver aircraft 20 or by the refueling device 100, well known in the existing art. In some embodiments, the engagement enabling position, may be characterized for example as described in the previously-mentioned publication WO 2013/102903 A2, for example in parts of pages 101-108.

Control of this approaching movement, sending maneuvering and steering commands so as to arrive at an engagement enabling position, to align the spatial disposition of the nozzle with the receptacle, and/or to engage, may in some embodiments be performed by response-mode control module 370, the maneuvering and steering control module 373 and/or engagement/disengagement control module 390, 392, as well as by actuators interface module 365. Example embodiments of control and steering methods and systems, to accomplish the approach to the receiver aircraft 20 up to and including engagement and refueling, as well as example tools and sensors that may be utilized to accomplish such methods, are described in WO 2013/102903 A2 (Publication date 11 Jul. 2013), for example in parts of pages 99-114, 119-133, 133-130, 139-140, and in related figures. Example methods and systems for engaging the nozzle and the receptacle, using force generating arrangements or clamps, are described, for example, in parts of pages 78-81. Example methods and spatial control systems for control of moving and positioning the boom member, so as to enable engagement, are described e.g. in pats of pages 66-68. In general, this publication also describes use of adjustable control surfaces e.g. 220A, 220B, 220C, to maneuver the refueling device 100 and adjust its position and attitude along the various axes. Therefore the full contents of this publication are incorporated by reference herein where appropriate for appropriate teachings of additional or alternative details, features and/or technical background.

In order to enable the refueling device's 100 approach to the receiver aircraft 20, in some embodiments there may be a need to extend the hose 52, and/or possibly to retract it, so as to achieve for example the desired longitudinal (fore and aft) position of the refueling device relative to the tanker aircraft 12. In some embodiments, the process described with regard to any of FIGS. 6, 7, 8a and/or 8b may be utilized to enable to achieve this movement of the hose, and to enable, possibly in conjunction with controlled adjustment of control surfaces 220A, 220B, and/or 220C as described above, approach of the nozzle 236B to the receptacle 22 up to and including engagement. In such cases, the controller may obtain the position of the receptacle 22 on receiver aircraft 20, and may set it to constitute the desired position 930 for the refueling device 100 to reach. Note that in some embodiments, during the approach of the refueling device to the receiver aircraft 20, the value of the parameter "desired position" 930 may be updated 940 one or more times, as the receptacle's position changes relative to the tanker aircraft 12, as the receiver aircraft may be more or less successful in maintaining an exactly constant disposition relative to the tanker aircraft during its formation flight. In some embodiments, this change may be reflected in for example the control processes exemplified in FIGS. 8a and/or 8b, for example in step 805 and/or in 8003. In response to an indication of such a an update in the receptacle position, these control processes may update the value of e.g. "desired position" 930, 805, 8003, so that the updated receptacle position 940 constitutes the desired position 805, 8003, and the process described with regard to any of FIGS. 6, 7, 8a and/or 8b may be performed in respect of this updated receptacle position. Note also that in some embodiments, the controller may obtain the refueling device's 100 current position 810, 8005 relative to the receiver aircraft, making use of one or more of the position sensors 320.

Figure 9:
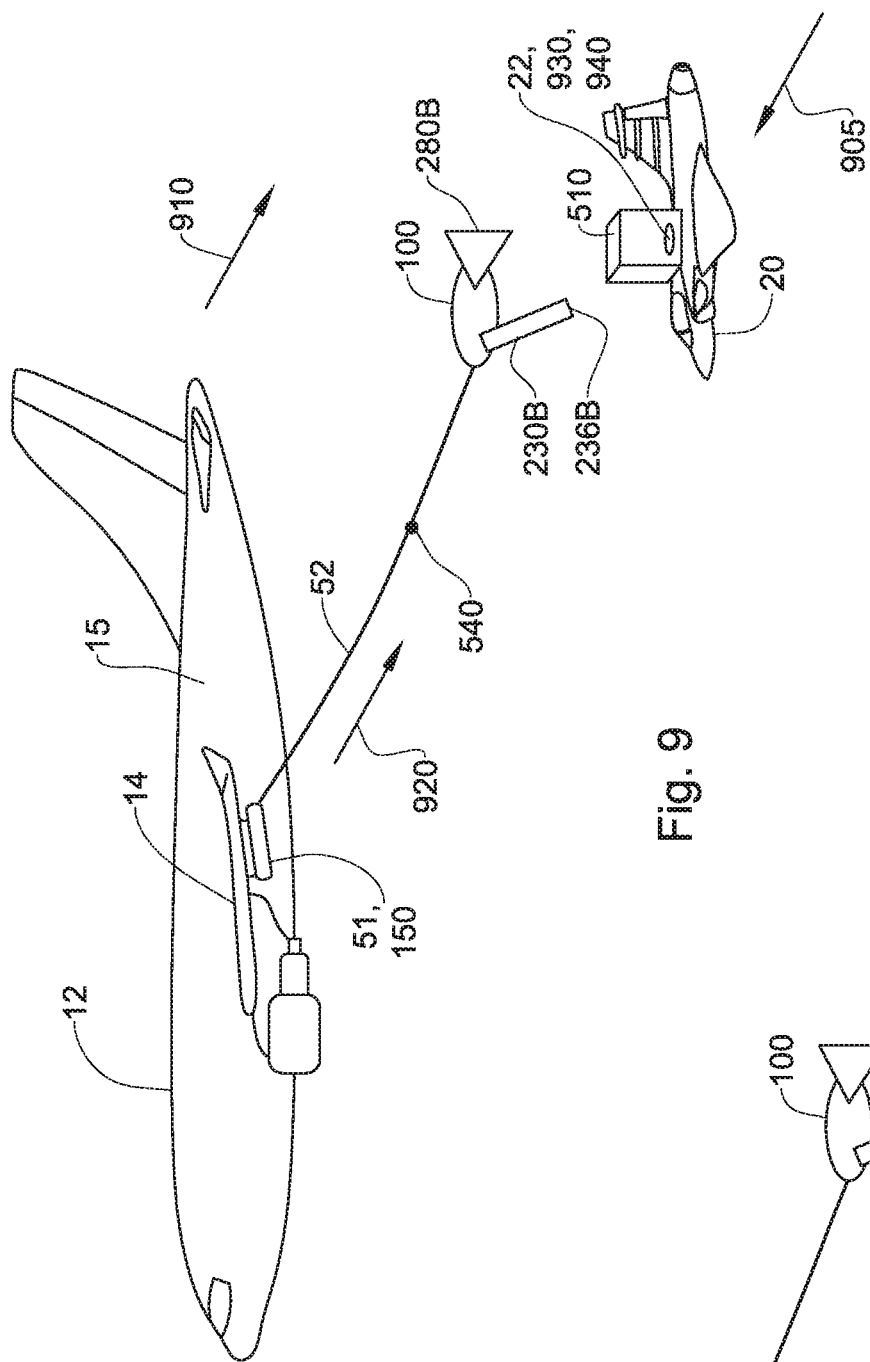
FIG. 9 illustrates a generalized example scenario of maneuver of a refueling device, in accordance with certain embodiments of the presently disclosed subject matter.

FIG. 9 describes an example of, in response to an indication that at least one receiver aircraft meets an engagement area specification condition (e.g. an indication of arrival of such a receiver aircraft in an refueling volume), obtaining the position of the receptacle located on the receiver aircraft, setting the position of the receptacle to constitute the desired position of the refueling device, and performing the methods of any of FIGS. 6, 7, 8a and/or 8b in respect of the receptacle position, and, in case of an indication of an update in the receptacle position, performing the methods of any of FIGS. 6, 7, 8a and/or 8b in respect of the updated receptacle position, e.g. for the purpose of reaching and then engaging the receptacle.

Figure 10:
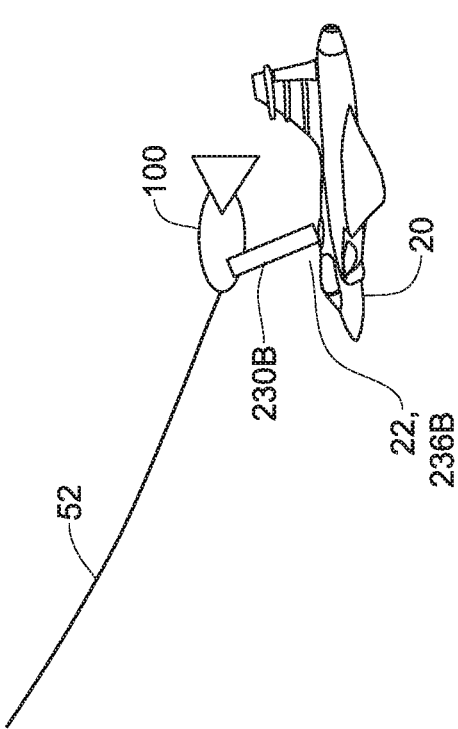
FIG. 10 illustrates an example scenario of maneuver of a refueling device, in accordance with certain embodiments of the presently disclosed subject matter.

Attention is now drawn to FIG. 10, which illustrates a possible scenario of engagement of a fueling device with a fuel receptacle, in accordance with certain exemplary embodiments of the presently disclosed subject matter. Refueling device 100 is engaged with the receptacle 22 of the receiver aircraft 20, e.g. by means of boom member 230B and fuel nozzle 236B. In the example embodiment illustrated in FIG. 10, the receptacle, and thus the engagement point, is positioned on the upper side of the receiver's fuselage, aft of the canopy. The refueling device may be connected by the fueling hose 52 to a component 150 (not shown) attached to a tanker aircraft (not shown), thereby enabling transfer of fuel from the tanker aircraft to the receiver aircraft.

Figure 11A:
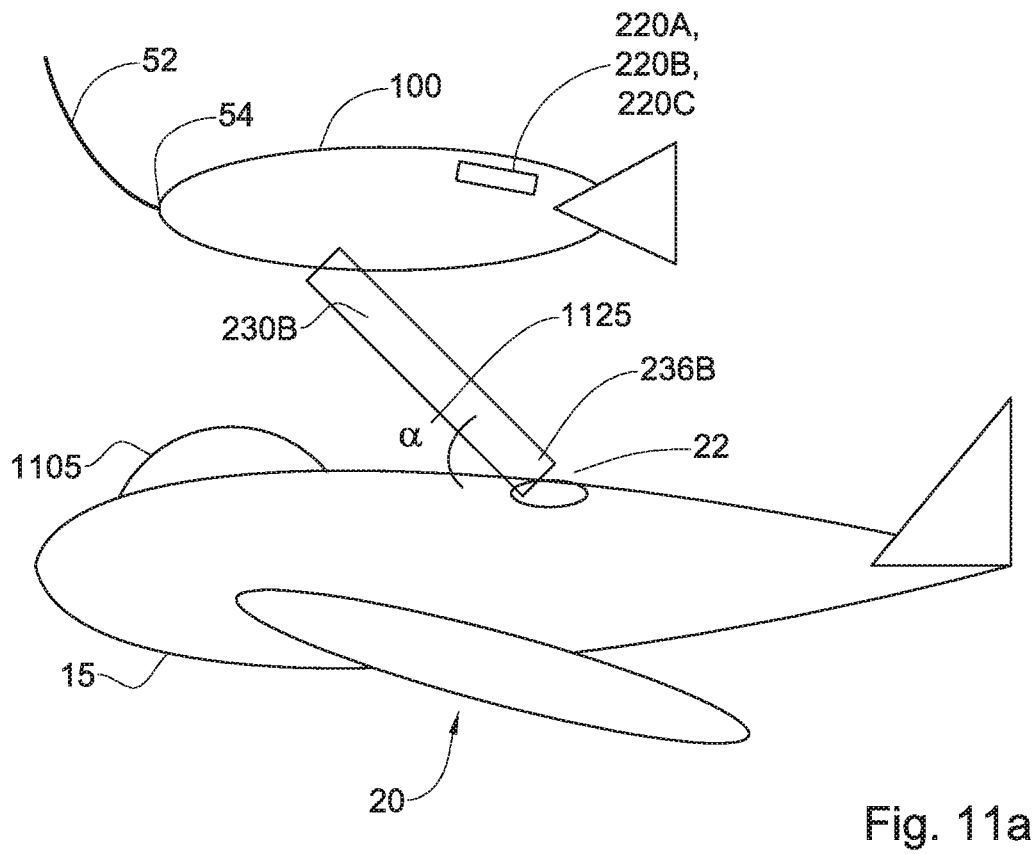

Attention is now drawn to FIG. 11, which illustrate a scenario of controlled maneuver of a fueling device, in accordance with certain exemplary embodiments of the presently disclosed subject matter. Turning to FIG. 11a, an example schematic representation of a fueling device engaged with a receiver aircraft is illustrated. The refueling device 100 is engaged with the receiver aircraft 20 at the receptacle 22. In some embodiments, the nozzle 236B is mechanically captured to the receptacle, and may be unable to normally disconnect nor disengage while in this state. In certain embodiments, various control surfaces 220A, 220B and/or 220C, as well as possibly airbrakes 250, may be adjusted by commands sent from controller 305. These adjustments may in some cases be performed to maintain proper alignment of the fueling device, for example maintain the pitch angle alpha 1125 between parts of the refueling device 100 (e.g. the boom member 230B) and the fuselage 15 of the receiver aircraft in a predefined range that is considered safe. In some embodiments, control of these adjustments may be performed by the maneuvering and steering control module 373, as well as by actuators interface module 365.

Figure 11B:
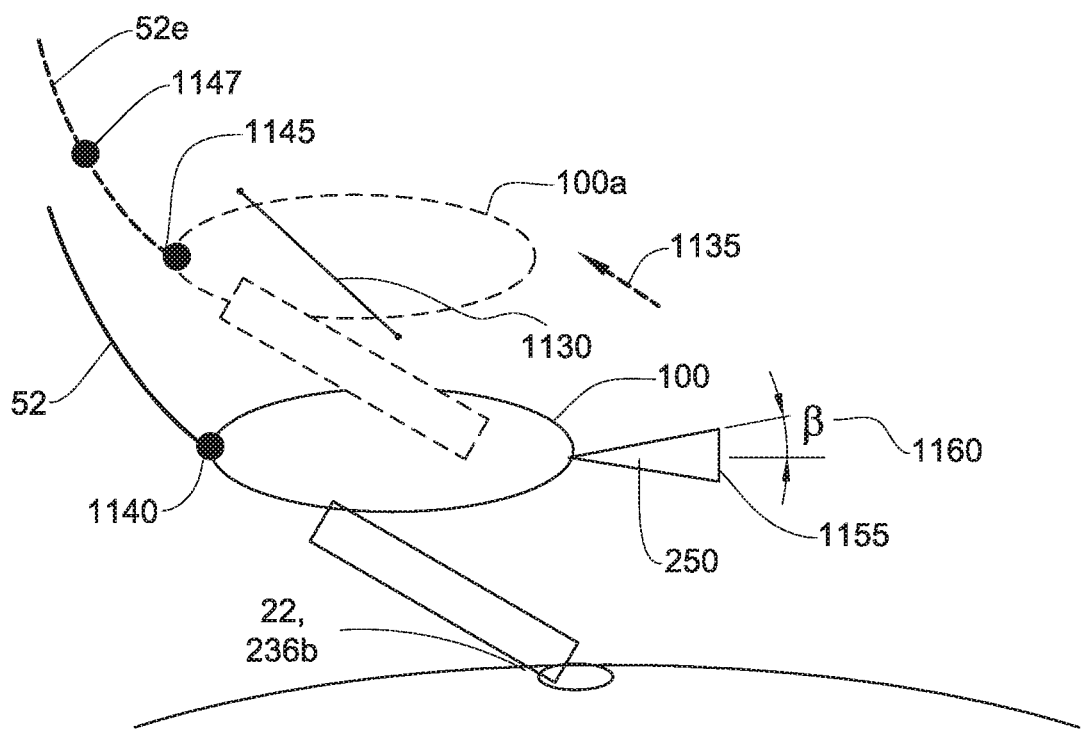

Turning to FIG. 11b, an example schematic representation of control of a refueling device while engaged with a receiver aircraft is illustrated. In some embodiments of the current subject matter, it may be desirable that when disengagement occurs, the refueling device should move away as soon as possible from the receiver aircraft in a safe direction, towards a safe disengagement position 1145 that is a safe distance from the receiver aircraft. In some embodiments, this safe disengagement position 1145 may be a certain distance 1130 ahead of and above the fueling device's position while engaged to the receiver 20. Since in some cases the refueling device 100 may undergo a whipping motion at the end of the hose 52 upon disengagement, it may be desirable that a "jump" or sudden quick movement to a safe position occur, so as to prevent the fueling device, and/or possibly the hose, from striking the canopy or fuselage of the receiver aircraft during such whipping, thus possibly endangering the aircraft and/or its crew. Note that in some embodiments, controller 305 may send commands for adjusting the other control surfaces e.g. 220A, 220B, 220C, to adjust to a position such that, upon disengagement, the aerodynamics of the refueling device 100 may cause it to lift and move to roughly the desired safe position point above the receiver aircraft. This safe disengagement position may for example be a pre-defined value configured in the data repository 310.

In some embodiments, where the component 150 is in its response mode, it may be desirable that the tension continuously applied to the hose 52 be decreased, so that upon disengagement the component will detect the decreased tension and will apply a force on the hose so as to retract it to substantially the safe disengagement position. As illustrated in FIG. 11b, upon disengagement, it may be desirable that the refueling device 100 will move 1135 from its position during engagement to a new safe position 100a. Similarly, aft end 54 of hose 52 would move from point 1140 to point 1145, and hose 52 would move to position 52e. In order to decrease the tension to the required level, the controller 305 may in some embodiments send a command to keep the airbrakes 250 in a relatively closed position.

In some embodiments the component 150 is in its response mode, and the process described with regard to any of FIGS. 6, 7, 8a and/or 8b may be utilized to enable to achieve this desired movement to the safe disengagement position. This can be achieved in some embodiments by setting the safe disengagement position to constitute the desired position of point 54 on the refueling device, and applying the process described with regard to any of FIGS. 6, 7, 8a and/or 8b in respect of the safe disengagement position. In some embodiments the safe disengagement position 1145 may be a defined offset 1130 from the engaged hose aft end point 1140, which corresponds to the current position of the refueling device while engaged. The current position is then aft of the desired location, and the controller 305 may in some embodiments instruct that the airbrakes 250 be kept in a position 1155 that is not open by more than a certain angle beta 1160. In some example embodiments beta 1160 may be approximately 30 degrees.

Were the refueling device 100 not engaged with the receptacle 22, such a closing of the airbrakes would decrease the drag, decrease the tension on hose 52, cause the component 150 to detect the decreased force on the hose and to retract the hose so as to maintain the reference force, and thereby cause the refueling device 100 to move forward from point 1140 towards the safe disengagement point 1145, thereby decreasing the refueling device's distance from the tanker aircraft, as has been explained in detail with reference to FIG. 7 and FIGS. 8a and 8b. However, as the nozzle 236B and receptacle 22 are mechanically engaged, the tension force level on hose 52 does not drop. The loop 803 of e.g. FIG. 8a, or 8038 of FIG. 8b, may in this case occur continuously without end, and the controller 305 may continue to command the airbrakes to not be open 1155 more than an angle beta 1160, for as long as the refueling device 100 is engaged with the receiver aircraft 20 since the refueling device is held fast and is unable to bring the difference between the current position and the desired position of said refueling device within a defined threshold, per for example steps 818 leading to 875. (in the embodiment of the controller illustrated in FIG. 8*b*, it might be said that in the engaged control situation, the difference 8010 between delta-x-command 8003 and delta-x 8015 is unable to reach zero.)

Note also that the value of the safe disengagement position 1145 may in some cases be changed to an updated safe disengagement position 1147 based on e.g. analysis of data regarding flight conditions, or for example based on an instruction originating from a human operator. In such cases, in response to an indication of such an update to the safe disengagement position, an update may be performed so that the changed or updated safe disengagement position 1147 may constitute the parameter "desired position", and the process described with regard to any of FIGS. 6, 7, 8*a* and/or 8*b* may be applied in respect of the safe disengagement position 1147.

The logic that may be applied during the engaged state may in some embodiments be performed by an engaged-response-mode control module 383. In some embodiments, use of this module 383 occurs in response to an indication that engagement has occurred. In other example embodiments, the functions of module 383 may be combined into the response-mode control module 370. Indication of the change to engaged state may be sent to controller 305 by engagement/disengagement sensors 323, 326.

Note that in some embodiments, the indication of an engagement event may be an input to step 805 of FIG. 8*a*, wherein desired position is indicated. Note that in some embodiments, "contact made" indication 8040 in FIG. 8*b* may serve as an indication of engagement state (e.g. engaged or not engaged), and may be an input to the PID controller module 8020. Switch 8040 may also be referred to as an indication of engagement, or an engagement indication switch. Similarly, in some embodiments the indication of engagement 8040, in the case of engagement, may also signal to PID controller processing circuitry 8000 that the desired position of the fueling device delta-x-command 8003 should be changed, for example, to be equal to the safe disengagement position.

FIG. 11*b* describes an example of, in response to an indication of engagement of the refueling device and the receptacle, obtaining a safe disengagement position, setting the safe disengagement position to constitute the desired position of the refueling device, and performing the methods of any of FIGS. 6, 7, 8*a* and/or 8*b* in respect of the safe disengagement position, and in case of an indication of an update in the safe disengagement position performing the methods of any of FIGS. 6, 7, 8*a* and/or 8*b* in respect of the updated safe disengagement position, for the purpose of reaching and then engaging the receptacle.

Note also that the relatively open position of the airbrakes may cause the refueling device 100 to pitch forward, and thus the spatial control system 300 may make use of the other control surfaces 220A, 220B and/or 220C to compensate and restore the desired pitch, using control systems methods known in the art.

It is to be noted that throughout the refueling process, safety module 387 may monitor certain parameters, for example parameters that relate to the spatial dispositions between any two or more of the following: the receiver aircraft 20, the refueling device 100 and the tanker aircraft 12, possibly in comparison to predefined reference thresholds or parameters or ranges, to identify possible hazardous situations. In some cases, when safety module 387 identifies a hazardous situation, it can be configured to instruct, for example maneuver and steering control module 373 and/or engagement/disengagement module 390, 394 to provide commands for steering and/or disengagement.

Attention is now drawn to FIG. 12, which illustrate a scenario of maneuver of a fueling device, in accordance with certain exemplary embodiments of the presently disclosed subject matter. The situation illustrated is one in which disengagement between refueling device 100 and receiver aircraft 20 has occurred. In some embodiments, disengagement may be controlled by engagement/disengagement control module 390, 394. In some embodiments, disengagement criteria and a disengagement process may be characterized for example as described in the previously-mentioned publication WO 2013/102903 A2, for example in parts of pages 114-116.

Figure 12A:
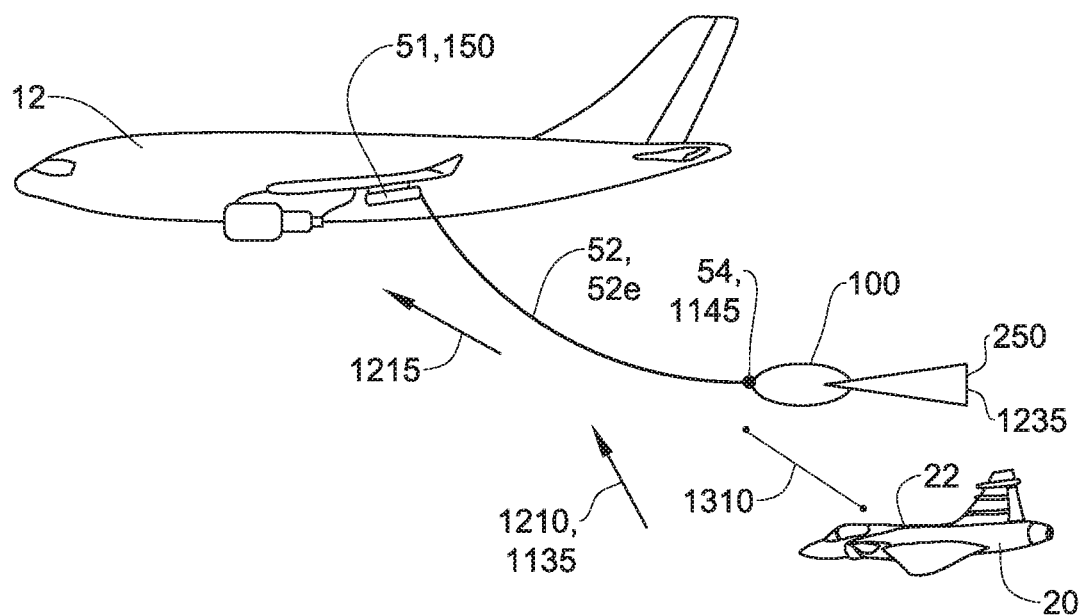
FIGS. 12a to 12b illustrate a generalized example scenario of maneuver of a refueling device, in accordance with certain embodiments of the presently disclosed subject matter.

Turning to FIG. 12*a*, possible behavior during disengagement is illustrated. Airbrakes 250 may have already been set to a relatively closed position 1235, at an angle smaller than angle beta 1160, during the engaged state. As the refueling device 100 is no longer mechanically held to the receiver aircraft 20, the force applied to the hose by the receiver aircraft may drop to zero or near-zero. Similarly, the decreased drag imposed by the airbrakes may cause the tension on hose 52 to be at a very low or decreased level compared to the reference tension force. In some embodiments the component 150 is in its response mode. The component 150 thus may detect the decreased tension force and may respond by retracting 1215 the hose to a position 52*e* so as to maintain the force on the hose at the reference level. This retraction may in some embodiments cause the refueling device to move 1210, as it had attempted to do unsuccessfully 1135 during the engaged state. This retraction may cause the aft end 54 of the hose to move to safe disengagement position 1145, in some cases by the defined offset 1130. In some cases, the speed of this movement or "jump" may be high, due to the large force applied by the component 150 on the hose which experienced a substantial sudden drop in tension force upon disconnection from the receptacle.

In some embodiments, the controller 305 may receive an indication that disengagement has occurred. Indication of the change to disengaged state may be sent to controller 305 by engagement/disengagement sensors 323, 328. In some embodiments, where in engaged mode control of movement was performed by engaged-response-mode control module 383, indication that disengagement has occurred may trigger use of response-mode control module 370 for control purposes.

Note that in some embodiments, the indication of a disengagement event may be an input to step 805 of FIG. 8*a*, wherein the new desired position is indicated. Note that in some embodiments, engagement indicator switch 8040 in FIG. 8*b* may serve as an indicator switch of engagement state (e.g. engaged or not engaged), and may be an input to the PID controller module 8020.

Figure 12B:
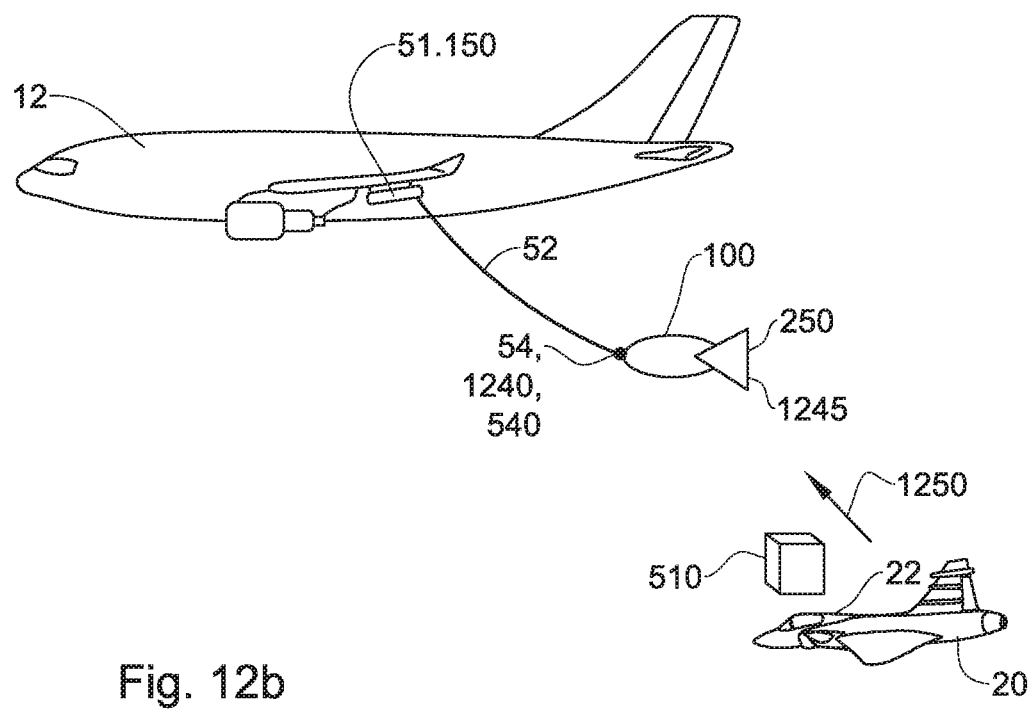

Turning to FIG. 12*b*, control of movement after completion of disengagement is illustrated. In some embodiments, the controller 305 may be configured so that in response to disengagement, the destination or desired position of the refueling device 100 is a post-disengagement waiting point position 1240. This could be the substantially the same as the initial waiting position 540, or alternatively a different position. In some embodiments post-disengagement waiting point position 1240 may be ahead of and above the virtual refueling volume 510. Post-disengagement waiting point position 1240 may or may not be the same as the safe disengagement position 1145. Post-disengagement waiting point position 1240 may function as a waiting point position of the refueling device 100 for the next receiver aircraft. Note that in some cases, the controller 305 will only succeed in controlling the movement of the refueling device after a period of e.g. several seconds, since, as described above, the refueling device may "jump" towards the safe disengagement position 1145 rapidly, possibly before the controller 305 is able to respond and apply control.

In some embodiments, the process described with regard to any of FIGS. 6, 7, 8a and/or 8b may be utilized to enable to achieve this movement 1250 towards post-disengagement waiting point position 1240. The controller 305 may obtain the post-disengagement waiting point position, and set it to constitute the desired position, e.g. as described regarding step 805 or delta-x-cmd in 8003. It may perform the process described with regard to any of FIGS. 6, 7, 8a and/or 8b in respect of this post-disengagement waiting point position. The airbrakes 250 may be adjusted continuously until being in airbrakes position 1245 as the refueling device 100 reaches substantially the post-disengagement waiting point position 1240.

Similarly, in some embodiments there may more than one post-disengagement waiting point position. For example, there may be a set of more than one post-disengagement waiting point positions 1240 to which the refueling device 100 should move, and/or the desired post-disengagement waiting point position may change or be updated during the maneuver, similar to that as described regarding initial waiting point 540. In response to an indication of any such update in the post-disengagement waiting point position, the control processes described with regard to any of FIGS. 6, 7, 8a and/or 8b may be performed in respect to the updated post-disengagement waiting point position, wherein the updated post-disengagement waiting point position is set to constitute the desired position.

It should also be noted, that all waiting points, and desired positions, described herein are examples only, and others may exist in some embodiments.

As will be further detailed herein, once the refueling device arrives at one or more post-disengagement waiting point positions 1240, a cyclical process of providing refueling services to one or more other receiver aircraft may be performed, for the purpose of refueling them all, if they exist. This cycle may include e.g. waiting, approaching, engaging, fueling, disengaging and moving to a post-disengagement waiting point position 1240. The position of waiting point 1240 in some examples may not be the same for all of the cycles, that is for the servicing of each receiver aircraft 20. Thus, FIG. 12b describes an example of, in response to an indication of disengagement of the refueling device and the receptacle, obtaining at least one post-disengagement waiting point position, and, in respect of each of these post-disengagement waiting point positions, setting it to constitute the desired position of the refueling device, and performing the methods of any of FIGS. 6, 7, 8a and/or 8b in respect of that post-disengagement waiting point position, for the purpose of refueling all of at least one receiver aircraft.

Figure 15A:
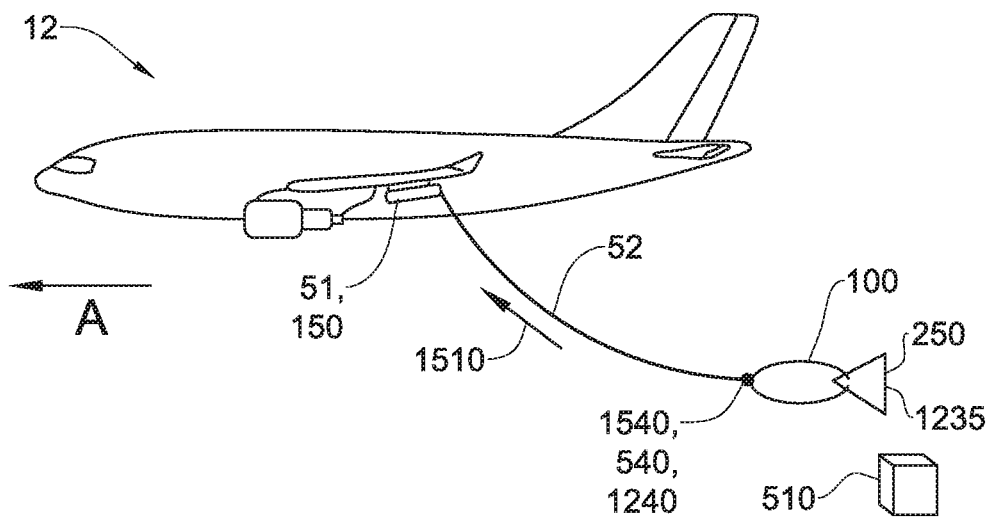
FIGS. 15a to 15b illustrate a generalized example scenario of maneuver of a refueling device, in accordance with certain embodiments of the presently disclosed subject matter.

Turning now first to FIG. 15, there is illustrated an example scenario for rewinding a hose with refueling device attached, in accordance with certain embodiments of the presently disclosed subject matter. Turning to FIG. 15a, the tanker aircraft 12 is flying in the direction A. In this illustration, the example embodiment is a pod 51 attached under the wing. In the pod is stored a component 150. The refueling device 100 may be positioned at a waiting point position 1540, relative to the position of the tanker aircraft, that is forward and above the refueling volume 510. As the tanker aircraft may in some cases be about to end refueling operations for a certain set of receiver aircraft, this waiting point may be referred to as a final waiting point position 1540. In some embodiments, this final waiting point position 1540 may be substantially the same as one of the intermediate post-disengagement waiting point positions 1240 at which the refueling device previously awaited arrival of receiver aircraft. In some embodiments, this final waiting point position 1540 may be substantially the same as the initial waiting point position 540.

A determination or decision may in some cases be made to change the component's 150 winding operational mode to rewind mode, to rewind the hose and cease waiting for receiving aircraft. The component may retract or rewind 1510 the hose 52 until it is substantially fully rolled up back to or into component 150, in some embodiments located within pod 51. Note that rewind mode of component 150 is optional.

Figure 16B:
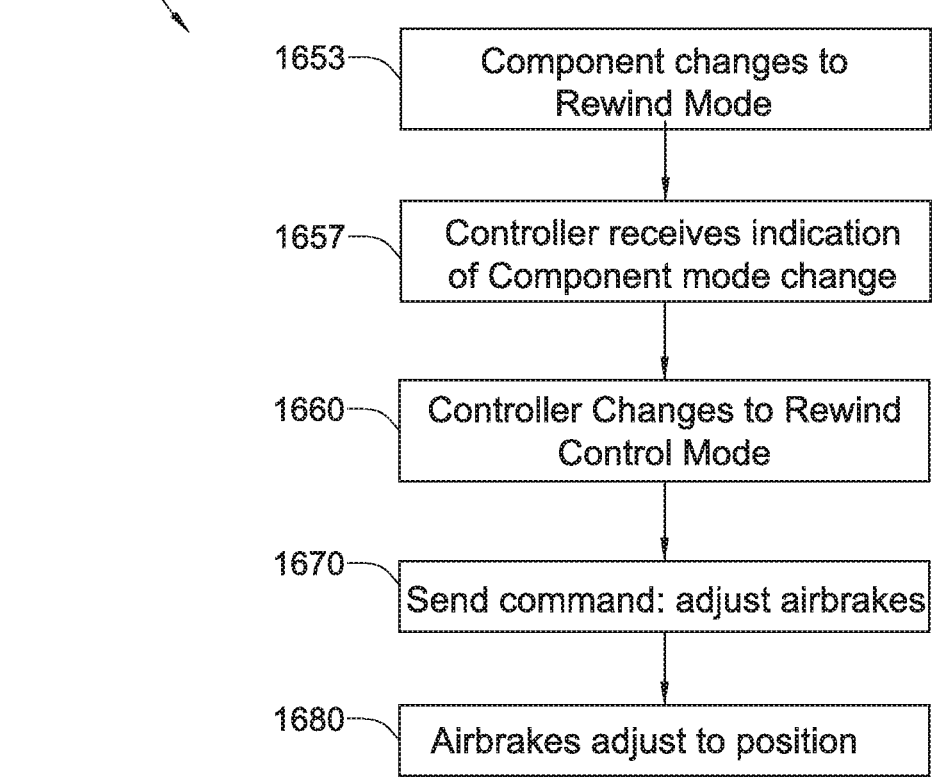

Turning now to FIG. 16b, it illustrates a generalized flow chart, in accordance with certain exemplary embodiments of the presently disclosed subject matter. One possible behavior of the fueling device in the case of rewind mode is shown, as flow chart 1650. In response to the component 150 changing 1653 to rewind mode, the controller 305 of refueling device 100 receives an indication 1657 of this change to rewind mode, and itself changes 1660 to a "rewind control mode" that supports component's 150 rewind mode. Upon this change in controller mode, in some embodiments the controller, e.g. using its rewind-mode control module 380, may send a command 1670 for adjusting the state of one or more force generating arrangements (e.g. airbrakes 280B). In some embodiments the state or position 1505 of the airbrakes during the rewind, may be adjusted to assist in controlling the rate of the rewinding of the hose by the component 150. In step 1680 the airbrakes may adjust as commanded.

For simplicity of explanation, the above discussion assumed that upon making a decision to rewind the hose and cease waiting for receiver aircraft, the controller 305 will first cause movement to a final waiting point position 1540, and then the component 150 switches over to its rewind mode. In some cases, in response to a decision to cease waiting for receiver aircraft, the component may immediately change to rewind mode, and begin a process such as described with reference to FIG. 16b, without the refueling device first being maneuvered to a final waiting point position 1540.

It is noted that the teachings of the presently disclosed subject matter are not bound by the flow chart illustrated in FIG. 16b. The illustrated operations can occur out of the illustrated order. Similarly, some of the operations or steps can be integrated into a consolidated operation or can be broken down to several operations, and/or other operations may be added. It is also noted that whilst the flow chart is described with reference to system elements that realize them, such as for example controller 305, this is by no means binding, and the operations can be performed by elements other than those described herein.

Figure 15B:
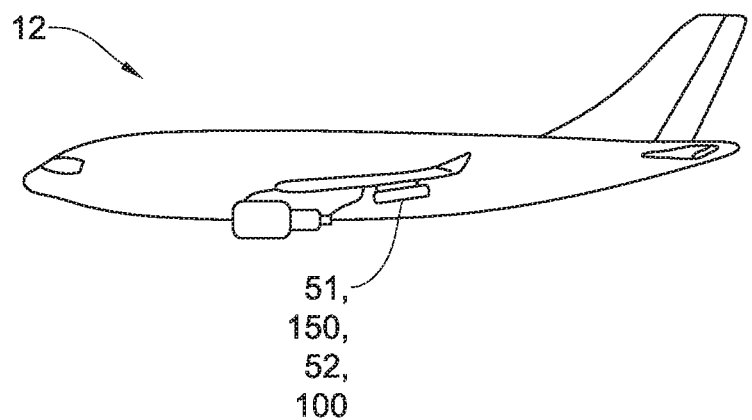

Turning to FIG. 15b, it illustrates an embodiment where the hose 52 may be in a rolled-up state after completion of rewind, and the hose and the refueling device 100 are stored in or adjacent to the component 150. Component 150 may be stored in pod 51, attached or integral to tanker aircraft 12.

Before continuing, it should be noted at this point, that for simplicity of exposition, "desired position" and "current position" of the refueling device 100, for example as described with reference to steps 805 and 810, have been described in terms of a single point on the body of refueling device 100, e.g. points 540, 545, 930, 940, 1145, 1147, 1240, 1540. In fact, at various stages of movement control, the control system 300 may attempt to move a different point or part of the refueling device to its desired position, rather than always performing determinations with respect to the same identical point on the body of refueling device 100. As a non-limiting example of this, desired positions such as the waiting points 540, 545, 1145, 1147, 1240 and 1540 have been described with reference to aft end 54 of the hose, which represents the point at which refueling device 100 connects to hose 52, while other desired positions such as points 930, 940 have been described with respect to nozzle 236B, located at one end of boom member 230B, which may be located at a different part of the body of refueling device 100. In addition, the control method may consider the position of more than one single point on the body of the refueling device when making control decisions.

Having described example scenarios of control of refueling device 100 maneuver, attention is now turned to example scenarios of a fueling mission. Attention is drawn to FIG. 13, which illustrates an example of a generalized sequence of operations carried out for performing one possible scenario of an airborne refueling mission, in accordance with certain embodiments of the presently disclosed subject matter. In step 1305 of scenario 1300, a tanker aircraft 12 may be in the general location of one or more receiver aircraft, and a decision may be made by a human operator or system to begin refueling operations. The tanker aircraft may have a fueling device 100 that is attached by means of a non-rigid hose 52 to a component 150.

In step 1310, the component's 150 mode of winding operation may be changed to full trail mode, or alternatively may already be in that mode. Note that in all cases of changing modes, the determination and indication to change the mode may in some embodiments be internal to the component, or may be communicated by another system or human operator. In step 1315, the controller 305 associated with refueling device 100 may change to its full trail control mode, for example by activating full-trail-mode control module 375, in response to the component change of mode.

In step 1320, the component 150 may extend the hose 52 to its full trail, thus moving also the fueling device 100. In some embodiments, this action may be performed substantially as described with reference to FIGS. 5a and 5b, and/or FIG. 16a, and point 520. This step is optional.

In step 1330, the component 150 may switch over to its response mode of winding. In step 1333 the controller 305 associated with refueling device 100 may receive an indication of this component mode change. In step 1335, in response to this indication that the component changed to response mode, whereby it is configured to maintain a reference force on the hose, the controller may itself switch over to its response control mode, for example by activating response mode control module 370.

In step 1340, the controller may obtain at least one initial waiting point position move to this initial waiting point, or set of waiting points, and await arrival of at least one receiver aircraft. In some embodiments, this movement may be performed substantially as described with reference to FIG. 5c and point 540. In some embodiments, the process described with regard to any of FIGS. 6, 7, 8a and/or 8b may be utilized to enable refueling device 100 to achieve this movement to initial waiting point 540. The process described in these figures, and with regard to steps 1333, 1335 and 1340, may be considered an example of a controller responding to an indication that the component changed to a response mode, by obtaining at least one waiting point position at which the fueling device will await arrival of at least one receiver aircraft, and in respect of each one of these waiting point positions, setting the waiting point position to constitute the desired position of the fueling device, and performing the steps or applying the controls described in FIG. 8a or 8b in respect of that waiting point position, and in case of an indication of an update in the waiting point position, setting the updated waiting point position to constitute the desired position of the fueling device and performing the steps or applying controls in respect of the updated waiting point position.

In step 1350, which is a very generalized step, or more receiver aircraft may be refueled. A determination may be made that no more receiver aircraft are waiting for refueling by this tanker aircraft 12. At this point in time, the refueling device 100 may be located at final waiting point 1540. More expanded detail on possible actions in step 1350 is detailed further herein with respect to FIG. 14.

In step 1360, the HDU component 150 may change over to its rewind mode of winding. In step 1365 the controller 305 may respond to the change in the component 150 mode by itself changing over mode to its rewind control mode, for example by activating rewind-mode control module 380. In step 1370, the component rewinds the hose, along with the refueling device 100, back to or into itself. In some embodiments, this movement may be performed substantially as described with reference to FIGS. 15a and 15b, and/or FIG. 16b. This step is optional.

Upon completion of rewind, at step 1380, the fueling operation may have ended for this particular fueling system 50.

It should be noted that this flow, which shows full trail and rewind modes of the component 150, is an example only. The presently disclosed subject matter is applicable as well, in embodiments where the full trail mode and/or the rewind mode of operation do not exist in the component 150.

Figure 14:
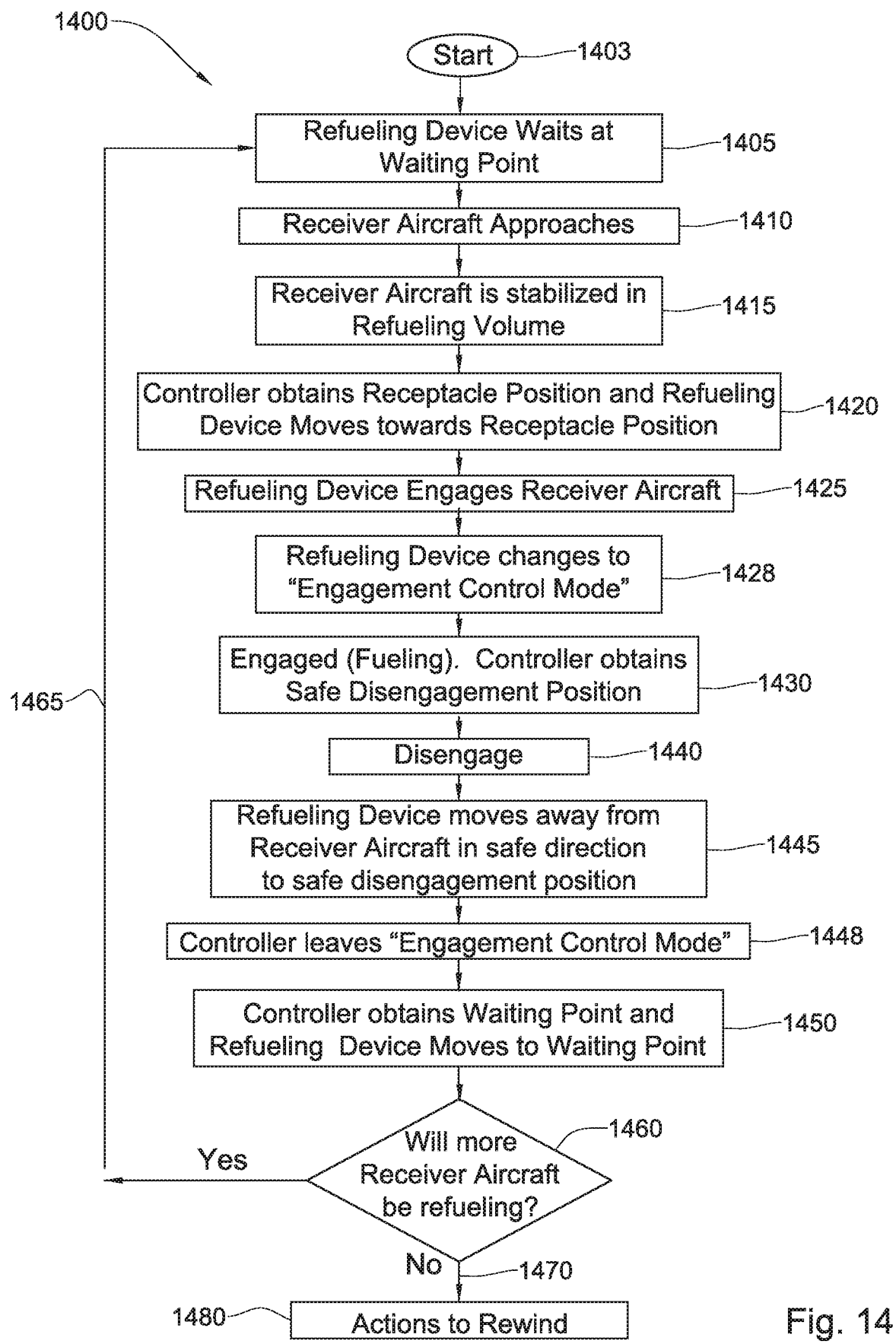
FIG. 14 illustrates a generalized flowchart illustrating of an example simplified sequence of operations carried out for maneuver of a refueling device, in accordance with certain embodiments of the presently disclosed subject matter.

Attention is now drawn to FIG. 14, which illustrates an example generalized sequence of operations carried out for performing one possible scenario within an air-to-air refueling mission, in accordance with certain embodiments of the presently disclosed subject matter. In some embodiments, the flow 1400 of FIG. 14 may describe an expanded view of the step 1350. The flow may start at 1403.

In step 1405, the refueling device 100 may be waiting at a waiting point. In some example embodiments this may be the initial waiting point 540, while in other example embodiments this may be an intermediate post-disengagement waiting point 1240. In step 1410, a receiver aircraft 20 may approach the tanker, and may in some embodiments maneuver so that its receptacle 22 is within the refueling volume 510. In step 1415, it may be determined, for example by the controller 305, that the receiver aircraft has arrived in, and possibly is stabilized within, the refueling volume 510.

In step 1420, in response to an indication of this arrival of the receiver aircraft in the refueling volume, the controller may obtain the position of the receptacle located on the receiver aircraft, and may set this position to constitute the desired position of the refueling device. The refueling device may then move towards the receptacle position of receiver aircraft 20. In step 1425 the fueling device may have drawn near enough to receiver 20, and may engage with receptacle 22 located on the receiver. e.g. by means of nozzle 236B. In some embodiments these maneuver and actions may be performed substantially as described with reference to FIG. 9.

In some embodiments, the process described with regard to any of FIGS. 6, 7, 8a and/or 8b may be utilized to enable the refueling device 100 to achieve the movement to the receptacle position as described with regard to step 1420, e.g. repeatedly performing the steps or applying the controls described with respect to FIG. 8a or 8b, in respect of the position of the receptacle, and performing them in respect of any updated receptacle position, in case of an indication of such update or change in the receptacle position. In such cases each updated receptacle position will constitute the desired position. As exemplified in step 1425, the step 1420 may be performed for the purpose of reaching and then engaging the receptacle.

In step 1428, the refueling device 100, for example via the controller 305 associated therewith, may in some embodiments respond to an indication of engagement by changing to a mode so as to control movement while in engaged state. In some examples, this may be accomplished by means engaged-response-mode control module 383. In step 1430, the refueling device 100 and receiver aircraft 20 are engaged, and fueling may occur. In some embodiments the controller 305 may control its attitude with respect to the fuselage and canopy of receiver aircraft, possibly as described with regard to FIG. 11a.

In some embodiments, during step 1430, in response to the indication of engagement of the refueling device and the receptacle, the controller 305 may obtain a safe disengagement position, and set the safe disengagement position to constitute the desired position of the fueling device. It may in step 1430 repeatedly perform the steps or apply the controls described with respect to FIG. 8a or 8b, in respect of the safe disengagement position, for the purpose of controlling the airbrakes 250 so as to prepare for movement to this safe disengagement position 1145. In case of case of an indication of an update in the safe disengagement position, these steps or controls will be performed in respect of the updated or changed safe disengagement position, which will constitute the desired position. In certain embodiments these controls may be performed substantially as described with reference to FIG. 11b. In some embodiments, the process described with regard to any of FIGS. 6, 7, 8a and/or 8b may be utilized to enable the refueling device 100 to achieve the above-described preparation for movement to safe disengagement position 1145.

In step 1440 disengagement between the refueling device and the receiver aircraft may occur, whether planned (e.g. at completion of fueling the particular receiver aircraft), or possibly unplanned, e.g. due to some malfunction. In step 1445 the refueling device may move away from the receiver aircraft 20 in a safe direction, towards the safe disengagement point 1145.

In step 1448, in some embodiments the controller 305 associated with the refueling device 100 may leave the special mode or configuration associated with the engagement state. In step 1450, the controller may obtain one or more waiting points, e.g. post-disengagement waiting point positions, and refueling device 100 may move to the waiting point. In some embodiments, this movement may be performed to enable waiting for the approach of another receiver aircraft 20. In some embodiments, the disengagement, and/or change of mode or state, and/or a movement to a waiting point may be performed substantially as described with reference to FIGS. 12a and 12b. In some embodiments, a waiting point reached may be post-disengagement waiting point 1240.

In some embodiments, the process described with regard to any of FIGS. 6, 7, 8a and/or 8b may be utilized to enable to achieve this movement 1450 towards the waiting point. For example, the controller 305 may, in response to an indication of disengagement of the refueling device and the receptacle, obtain at least one post-disengagement waiting point position, and may set this position to constitute the desired position of the refueling device. It may repeatedly perform the steps or apply the controls described with respect to FIG. 8a or 8b, in respect of the post-disengagement waiting point, and perform them as well for any additional, updated or changed post-disengagement waiting points. These post-disengagement waiting points will constitute waiting points in the sense described with regard to, for example, points 540 and 1240, and each in turn will constitute the desired position.

Note that a purpose of that described in FIG. 14 is to refuel all receiver aircraft that are to be refueled by the fueling system in this mission. Thus the steps described in this figure may be performed for each next receiver aircraft within the set of all such receiver aircraft. In a trivial case, there may be only one such receiver aircraft, and thus in some cases there may be no "next" receiver aircraft. A determination 1460 may be made whether or not additional receiver aircraft 30 have not refueled but are waiting to approach the tanker aircraft 12 and undergo refueling. If the result of the determination is "Yes", that is additional receiver aircraft should connect to the particular instance of fueling system 50, the process may in some embodiments loop back 1465 to step 1405, and the fueling device may wait at an appropriate post-disengagement intermediate waiting point 1240 (or possibly move through a set of points and wait), for the next receiver aircraft to approach the refueling volume 510. The position of waiting point 1240 in some examples may not be the same for all of the loops, that is for the servicing of each receiver aircraft.

If, on the other hand, the result of the determination is "No", that is no additional receiver aircraft are to refuel by means of the particular deployed refueling device 100, then flow 1470 may be followed, and actions 1480 may be taken to rewind the hose 52 and refueling device 100. In some embodiments, step 1480 may be performed substantially as described with regard to steps 1360, 1365 and/or 1370 of FIG. 13. Note that it is possible that the refueling system 50 may be used in some cases to fuel only one receiver aircraft, in which case loop 1465 does not occur at all.

Figure 13:
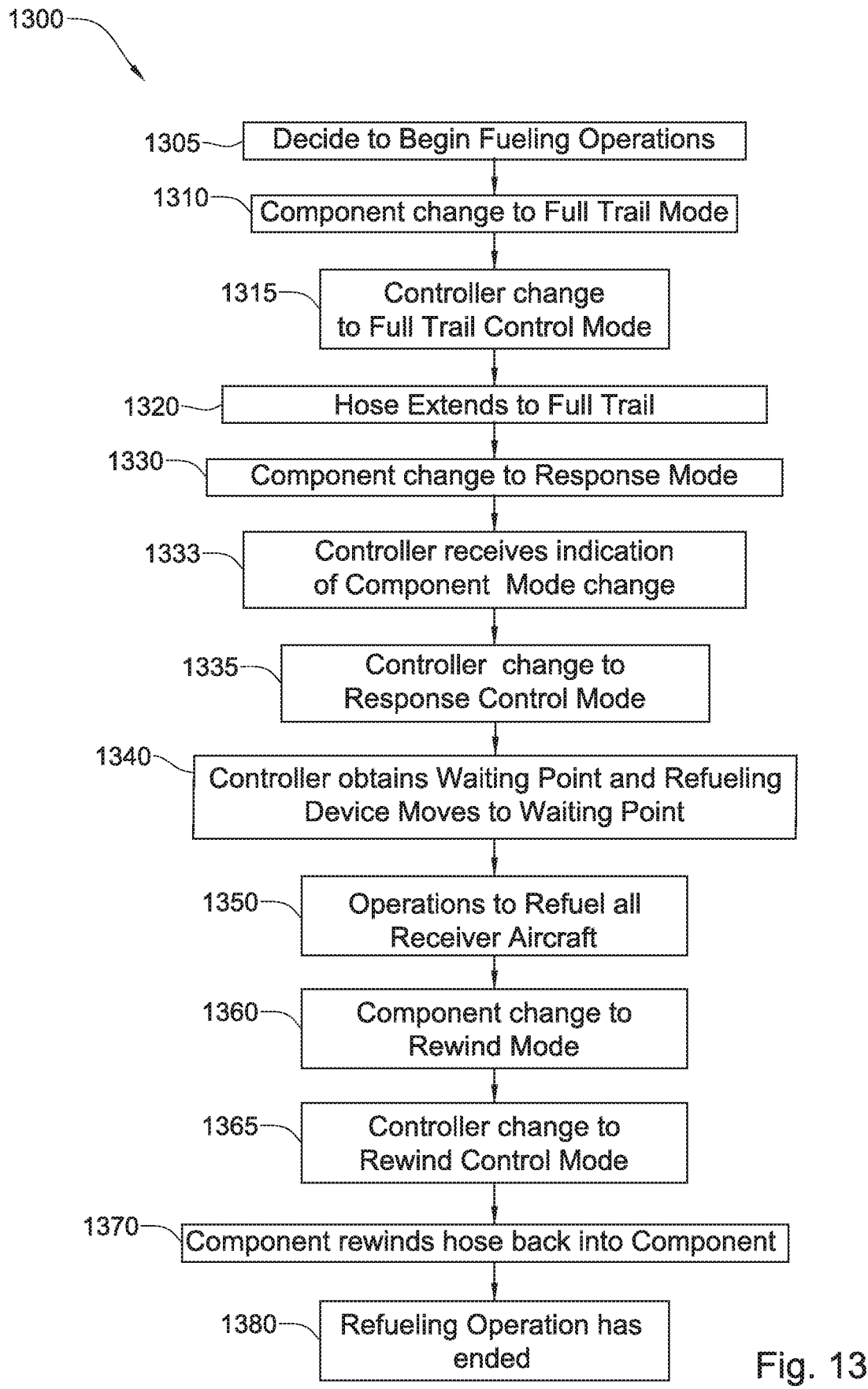
FIG. 13 illustrates a generalized flowchart of an example simplified sequence of operations carried out for maneuver of a refueling device, in accordance with certain embodiments of the presently disclosed subject matter.

Note that FIGS. 13 and 14 describe an example method of maneuvering a refueling device, using processes or methods described with regard to any of FIGS. 6, 7, 8a and/or 8b to desired positions that include, as non-limiting examples: waiting point positions such as initial waiting point position, updated waiting point positions (including updated initial waiting point position), position of a receptacle located on a receiver aircraft updated position of the receptacle, safe disengagement position, updated safe disengagement position, post-disengagement position, updated post-disengagement position, and final waiting point position.

It is noted that the teachings of the presently disclosed subject matter are not bound by the flow charts illustrated in FIGS. 13 and 14. The illustrated operations can occur out of the illustrated order. For example, operations 1310 and 1315 shown in succession can be executed substantially concurrently or in the reverse order. This applies also, for example, to steps 1450 and 1460. Similarly, some of the operations or steps can be integrated into a consolidated operation or can be broken down to several operations, and/or other operations may be added. It is also noted that whilst the flow chart is described with reference to system elements that realize them, such as for example controller 305 comprising processing circuitry 350, this is by no means binding, and the operations can be performed by elements other than those described herein.

In embodiments of the presently disclosed subject matter, fewer, more and/or different stages than those shown in FIGS. 5 to 16 can be executed. In embodiments of the presently disclosed subject matter one or more stages illustrated in FIGS. 5 to 16 can be executed in a different order and/or one or mom groups of stages may be executed simultaneously.

In the claims that follow, alphanumeric characters and Roman numerals used to designate claim elements are provided for convenience only, and do not imply any particular order of performing the elements.

It should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the spirit of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter may be, at least partly, a suitably programmed computer. Likewise, the presently disclosed subject matter contemplates a computer program product being readable by a machine or computer, for executing the method of the presently disclosed subject matter or any part thereof. The presently disclosed subject matter further contemplates a non-transitory machine-readable or computer-readable memory tangibly embodying a program of instructions executable by the machine or computer for executing the method of the presently disclosed subject matter or any part thereof. The presently disclosed subject matter further contemplates a non-transitory computer readable storage medium having a computer readable program code embodied therein, configured to be executed so as to perform the method of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A system capable of controlling maneuver of a refueling device, comprising: a controller, associated with said refueling device,
   wherein said refueling device is capable of being attached by means of a non-rigid hose to a component of an aircraft,
   wherein the component is configured to selectively operate in a plurality of modes, the plurality of modes comprising a response mode,
   wherein said component is configured, when in the response mode, to maintain a reference force on the hose,
   wherein the refueling device comprises a nozzle configured for engagement with a receptacle located on a receiver aircraft,
   wherein said controller comprising a processing circuitry which is configured in a situation where the component is in the response mode, to repeatedly perform the following method of extension and retraction in a continual manner,
   until a difference, between a current position of said refueling device and a desired position of said refueling device, is within a defined threshold,
   wherein the desired position comprising at least one of a waiting point position, an updated waiting point position, and an engagement enabling position;
   (a) obtain the desired position, in a direction fore and aft;
   (b) obtain the current position, in the direction fore and aft, utilizing at least one position sensor associated with the refueling device;
   (c) determine, based on at least the current position and the desired position, whether to extend or retract the hose,
      wherein responsive to the current position being forward of the desired position, the determination is to extend the hose,
      wherein responsive to the current position of the refueling device being aft of the desired position, the determination is to retract the hose;
   (d) in response to the determination being to extend the hose, send a command for adjusting the state of one or more force generating arrangements, which are attached to the refueling device, so as to increase a force on the hose,
      the increase in the force causing said component of the aircraft to perform the following:
         (i) detect the increased force; and
         (ii) extend the hose so as to maintain the reference force on the hose, thereby increasing the distance between the refueling device and the aircraft in the direction fore and aft; and
   (e) in response to the determination being to retract the hose, send a command for adjusting the state of the one or more force generating arrangements, so as to decrease the force on the hose,
      the decrease in the force causing said component of the aircraft to perform the following:
         (i) detect the decreased force; and
         (ii) retract the hose, so as to maintain the reference force on the hose, thereby decreasing the distance between the refueling device and the aircraft in the direction fore and aft,
   thereby facilitating at least one of: movement of the refueling device, in the direction fore and aft, to one of the waiting point position and the updated waiting point position; movement of the refueling device, in the direction fore and aft, from one of the waiting point position and the updated waiting point position to the engagement enabling position.

2. The system of claim 1, wherein said controller is further configured to: in response to an indication of an update in said desired position, perform said steps (a) to (e) in respect of said updated desired position.

3. The system of claim 1, wherein said controller is further configured to: repeatedly perform said steps (a) to (e), for at least one of the following desired positions: a position of a receptacle located on the receiver aircraft, an updated position of the receptacle, a safe disengagement position, an updated safe disengagement position and an at least one post-disengagement waiting point position.

4. The system of claim 3, wherein said receptacle is a fuel receptacle.

5. The system according to claim 3, wherein said safe disengagement position is the current position of the refueling device adjusted by an offset.

6. The system according to claim 1, wherein said controller is further configured to:
   i) in response to an indication that said component changed to a response mode, whereby said component is configured to maintain said reference force on the hose, obtain at least one waiting point position at which the refueling device will await arrival of at least one receiver aircraft;
   ii) in respect of each one of the at least one waiting point positions:
      A. set the waiting point position to constitute the desired position of the refueling device;
      B. perform the repeated method of extension and retraction in a continual manner of claim 1 in respect of the waiting point position, and in case of an indication of an update in said waiting point position, setting said updated waiting point position to constitute the desired position of the refueling device and performing the repeated method of extension and retraction in a continual manner in respect of said updated waiting point position,
   iii) in response to an indication that one of at least one receiver aircraft meets an engagement area specification condition, obtain the position of a receptacle located on said receiver aircraft, set said position of the receptacle to constitute the desired position of the refueling device, and perform the repeated method of extension and retraction in a continual manner in respect of said position of the receptacle, and in case of an indication of an update in said position of the receptacle, set said updated position of the receptacle to constitute the desired position of the refueling device and perform the repeated method of extension and retraction in a continual manner in respect of said updated position of the receptacle, for the purpose of reaching and then engaging said receptacle;
   iv) in response to an indication of engagement of the refueling device and the receptacle, obtain a safe disengagement position, and setting said safe disengagement position to constitute the desired position of the refueling device;
   v) perform the repeated method of extension and retraction in a continual manner in respect of said safe disengagement position, and in case of an indication of an update in said safe disengagement position, set said updated safe disengagement position to constitute the desired position of the refueling device and perform the repeated method of extension and retraction in a continual manner in respect of said updated safe disengagement position; and
   vi) in response to said indication of disengagement of the refueling device and the receptacle, perform, for each next receiver aircraft of at least one receiver aircraft:
      A. obtain at least one post-disengagement waiting point position;
      B. perform said steps (ii) to (v), wherein each one of said at least one post-disengagement waiting point position constitutes each one of said at least one waiting point positions;
   thereby facilitating refueling of one or more receiver aircraft.

7. The system according to claim 1, wherein said aircraft is a tanker aircraft, said hose is a fuel hose, said refueling device includes a fuel delivery nozzle and said refueling device is capable of engaging and refueling said receiver aircraft.

8. The system of claim 1, wherein said determination is provided by one of a Proportional Integral (PI) Controller and a Proportional Integral Derivative (PID) controller, comprised in the processing circuitry.

9. The system according to claim 1, wherein the controller receives as input at least one of: the desired position of the refueling device; the current position of the refueling device; a rate of movement of said refueling device; an acceleration of said refueling device; an indication of engagement state; and an indication of current component winding mode.

10. A spatial control system, comprising:
   the system according to claim 1;
   at least one of:
      a data store coupled to said controller,
      one or more position sensors coupled to said controller;
      one or more engagement sensors coupled to said controller;
      one or more external data sources coupled to said controller;
      said one or more force generating arrangements;
      actuators for said one or more force generating arrangements coupled to said controller and coupled to said one or more force generating arrangements;
      one or more other adjustable control surfaces; and
      one or more actuators for said one or more other adjustable control surfaces coupled to said controller and coupled to said one or more other adjustable control surfaces.

11. The system according to claim 1, wherein said determining whether to extend or retract said hose, is based also on at least one of the current velocity of the refueling device and the current acceleration of the refueling device.

12. The system according to claim 1, wherein said adjusting the state of the force generating arrangements is performed while factoring at least one of the current velocity of the refueling device and the current acceleration of the refueling device.

13. The system according to claim 1, wherein said refueling device is unmanned.

14. The system according to claim 1, wherein said refueling device does not include an independent means of propulsion.

15. The system according to claim 1, wherein the method is performed autonomously by the refueling device.

16. The system of claim 15, wherein the method is performed for one or more additional receiver aircraft, thereby facilitating refueling of one or more receiver aircraft.

17. The system of claim 1, wherein the plurality of modes comprises a full trail mode and a rewind mode.

18. The system of claim 1, wherein the method of extension and retraction in a continual manner comprises performance of alternating extension and retraction.

19. A non-transitory program storage device readable by a computer tangibly embodying computer readable instructions executable by the computer to perform a method of controlling maneuver of a refueling device that is attachable by means of a non-rigid hose to a component of an aircraft,
   wherein the component is configured to selectively operate in a plurality of modes, the plurality of modes comprising a response mode,
   wherein said component is configured, when in the response mode, to selectively maintain a reference force on the hose,
   wherein the refueling device comprises a nozzle configured for engagement with a receptacle located on a receiver aircraft;
   in a situation where the component is in the response mode, to repeatedly perform the following method of extension and retraction in a continual manner,
   until a difference, between a current position of said refueling device and a desired position of said refueling device, is within a defined threshold,
   wherein the desired position comprising at least one of a waiting point position, an updated waiting point position, and an engagement enabling position:
   (a) obtaining the desired position, in a direction fore and aft;
   (b) obtaining the current position, in a direction fore and aft, utilizing at least one position sensor associated with the refueling device;
   (c) determining, based on at least the current position and the desired position, whether to extend or retract the hose,
      wherein responsive to the current position being forward of the desired position, the determination is to extend the hose,
      wherein responsive to the current position of the refueling device being aft of the desired position, the determination is to retract the hose;
   (d) in response to the determination being to extend the hose, send a command for adjusting the state of one or more fore generating arrangements, which are attached to the refueling device, so as to increase a force on the hose,
      the increase in the force causing said component of the aircraft to perform the following:
         (i) detect the increased force; and
         (ii) extend the hose so as to maintain the reference force on the hose, thereby increasing the distance between the refueling device and the aircraft in the direction fore and aft; and
   (e) in response to the determination being to retract the hose, send a command for adjusting the state of the one or more force generating arrangements, so as to decrease the force on the hose,
      the decrease in the force causing said component of the aircraft to perform the following:
         (i) detect the decreased force; and
         (ii) retract the hose so as to maintain the reference force on the hose, thereby decreasing the distance between the refueling device and the aircraft in the direction fore and aft,
      thereby facilitating at least one of: movement of the refueling device, in the direction fore and aft, to one of the waiting point position and the updated waiting point position; movement of the refueling device, in the direction fore and aft, from one of the waiting point position and the updated waiting point position to the engagement enabling position.

20. A method of controlling maneuver of a refueling device, comprising:
   (I) providing the refueling device that is attached by means of a non-rigid hose to a component of an aircraft,
      wherein the component is configured to selectively operate in a plurality of modes, the plurality of modes comprising a response mode,
      wherein said component is configured, when in the response mode, to selectively maintain a reference force on said hose,
      wherein the refueling device comprises a nozzle configured for engagement with a receptacle located on a receiver aircraft;
   (II) providing a controller, associated with said refueling device, the controller comprising a processing circuitry; and
   (III) in a situation where the component is in the response mode, repeatedly performing the following method of extension and retraction in a continual manner, utilizing the processing circuitry;
   (a) obtaining the desired position, in the direction fore and aft;
   (b) obtaining the current position, in the direction fore and aft, utilizing at least one position sensor associated with the refueling device;
   (c) determining, based on at least the current position and the desired position, whether to extend or retract the hose,
      wherein responsive to the current position being forward of the desired position, the determination is to extend the hose,
      wherein responsive to the current position of the refueling device being aft of the desired position, the determination is to retract the hose;
   (d) in response to the determination being to extend the hose, send a command for adjusting the state of one or more force generating arrangements, which are attached to the refueling device, so as to increase a force on the hose,
      the increase in the force causing said component of the aircraft to perform the following:
         (i) detect the increased force; and
         (ii) to extend the hose so as to maintain the reference force on the hose, thereby increasing the distance between the refueling device and the aircraft in the direction fore and aft; and
   (e) in response to determination being to retract the hose, send a command for adjusting the state of the one or more force generating arrangements, so as to decrease the force on the hose,
      the decrease in the force causing said component of the aircraft to perform the following:
         (i) detect the decreased force; and
         (ii) retract the hose so as to maintain the reference force on the hose, thereby decreasing the distance between the refueling device and the aircraft in the direction fore and aft,
   thereby facilitating at least one of movement of the refueling device in the direction fore and aft, to one of the waiting point position and the updated waiting point position; movement of the refueling device, in the direction fore and aft, from one of the waiting point position and the updated waiting point position to the engagement enabling position.

* * * * *

UNITED STATES PATENT AND TRADEMARK OFFICE
CERTIFICATE OF CORRECTION

| | |
|---|---|
| PATENT NO. | : 11,919,655 B2 |
| APPLICATION NO. | : 16/621573 |
| DATED | : March 5, 2024 |
| INVENTOR(S) | : Ido Meidad |

It is certified that error appears in the above-identified patent and that said Letters Patent is hereby corrected as shown below:

In the Claims

Claim 1 – Column 50, Line 17 - "and an engagement enabling position;" should read as --- and an engagement enabling position: ---

Claim 19 – Column 53, Line 37 - "more fore generating" should read as --- more force generating ---

Claim 20 – Column 54, Line 20 - "utilizing the processing circuitry;" should read as --- utilizing the processing circuitry: ---

Signed and Sealed this
Eleventh Day of June, 2024

*Katherine Kelly Vidal*

Katherine Kelly Vidal
*Director of the United States Patent and Trademark Office*